US009684536B2

(12) United States Patent
Yamauchi et al.

(10) Patent No.: US 9,684,536 B2
(45) Date of Patent: Jun. 20, 2017

(54) SCHEDULING METHOD AND SCHEDULING SYSTEM

(71) Applicant: FUJITSU LIMITED, Kawasaki-shi, Kanagawa (JP)

(72) Inventors: Hiromasa Yamauchi, Usakos (NA); Koichiro Yamashita, Hachioji (JP); Takahisa Suzuki, Yokohama (JP); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 14/175,248

(22) Filed: Feb. 7, 2014

(65) Prior Publication Data

US 2014/0157280 A1    Jun. 5, 2014

Related U.S. Application Data

(63) Continuation of application No. PCT/JP2011/068204, filed on Aug. 9, 2011.

(51) Int. Cl.
*G06F 9/46*     (2006.01)
*G06F 9/50*     (2006.01)

(52) U.S. Cl.
CPC .............. *G06F 9/46* (2013.01); *G06F 9/5061* (2013.01); *G06F 9/5088* (2013.01);
(Continued)

(58) Field of Classification Search
CPC ........ G06F 9/46; G06F 9/5088; G06F 9/5094; G06F 9/5061; G06F 2209/505; Y02B 60/142
(Continued)

(56) References Cited

U.S. PATENT DOCUMENTS 6,006,248 A    12/1999   Nagae
2005/0050544 A1   3/2005   Saito et al.
(Continued)

FOREIGN PATENT DOCUMENTS

JP    7-282013    10/1995
JP    8-115304    5/1996
(Continued)

OTHER PUBLICATIONS

International Search Report mailed Sep. 6, 2011, in corresponding International Application No. PCT/JP2011/068204.
(Continued)

*Primary Examiner* — H S Sough
*Assistant Examiner* — Kimberly Jordan
(74) *Attorney, Agent, or Firm* — Staas & Halsey LLP

(57) ABSTRACT

A scheduling method includes determining whether priority of an application to be activated is of a given priority, the determining being performed by a first data processing apparatus that is included in a first group having at least one data processing apparatus; transferring to a second data processing apparatus that is included in any one among a second group and the first group, a predetermined function of the first data processing apparatus so as to execute the application by the first data processing apparatus, the transferring being performed when the priority of the application is of the given priority, and the first and the second groups being among a plurality of groups that each includes at least one data processing apparatus; and placing the application in an execution queue of the first data processing apparatus, when the priority of the application is not the given priority.

12 Claims, 48 Drawing Sheets

(52) U.S. Cl.
CPC ...... *G06F 9/5094* (2013.01); *G06F 2209/505* (2013.01); *Y02B 60/142* (2013.01)

(58) Field of Classification Search
USPC .................................................. 718/103, 105
See application file for complete search history.

(56) References Cited

U.S. PATENT DOCUMENTS

| | | | | |
|---|---|---|---|---|
| 2007/0022426 A1* | 1/2007 | Steinder | ................. | G06F 9/505 |
| | | | | 718/104 |
| 2008/0040720 A1* | 2/2008 | McKenney | ........... | G06F 9/4881 |
| | | | | 718/103 |
| 2010/0299472 A1 | 11/2010 | Tanaka et al. | | |
| 2011/0161964 A1* | 6/2011 | Piazza | ................. | G06F 9/4881 |
| | | | | 718/102 |

FOREIGN PATENT DOCUMENTS

| | | |
|---|---|---|
| JP | 9-44463 | 2/1997 |
| JP | 10-78937 | 3/1998 |
| JP | 2004-164255 | 6/2004 |
| JP | 2006-261949 | 9/2006 |
| JP | 2007-241394 | 9/2007 |
| JP | 2009-110195 | 5/2009 |
| JP | 2010-27062 | 2/2010 |
| JP | 2010-272076 | 2/2010 |

OTHER PUBLICATIONS

PCT International Preliminary Report on Patentability mailed Feb. 20, 2014 in corresponding International Application No. PCT/JP2011/068204.

\* cited by examiner

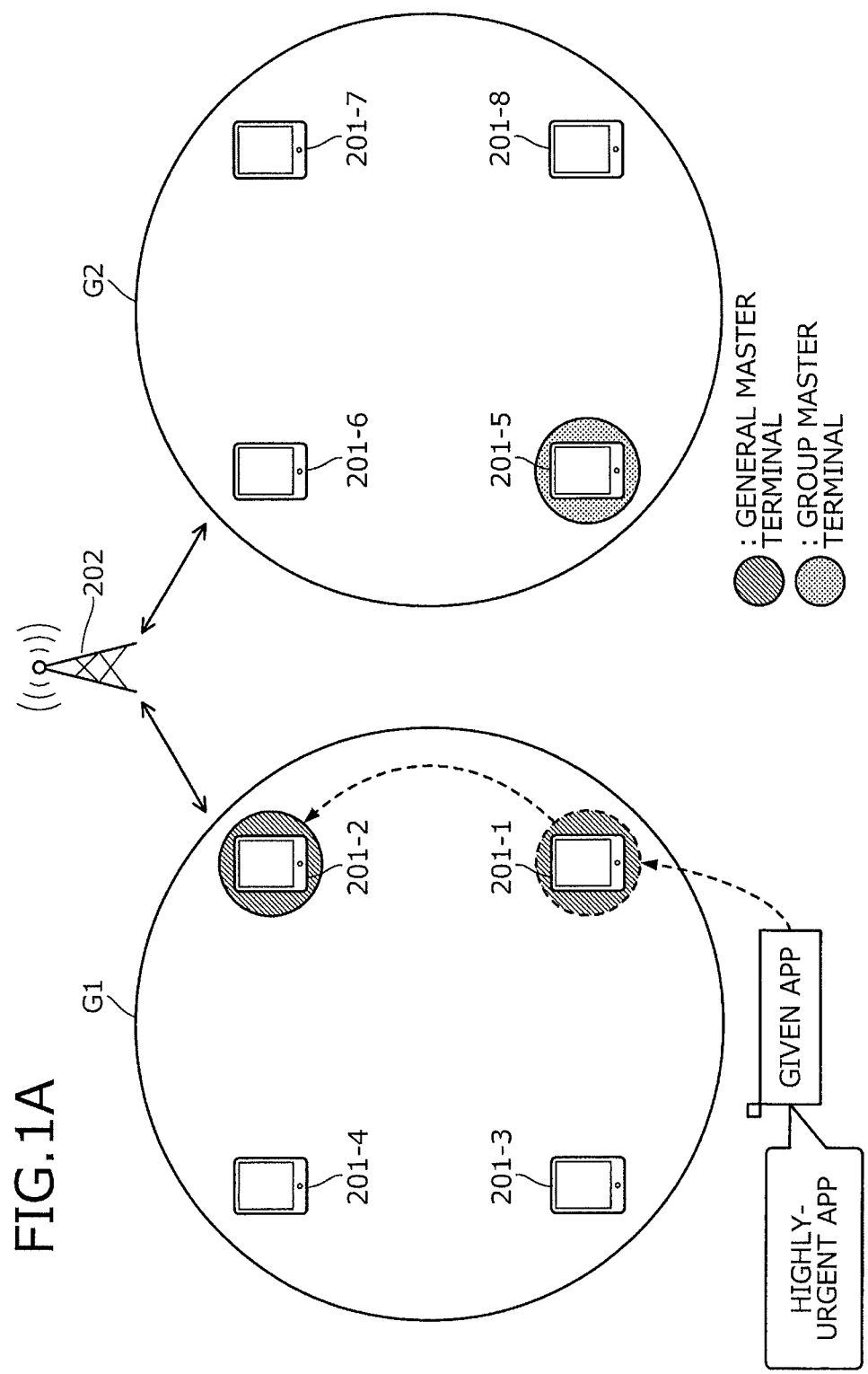

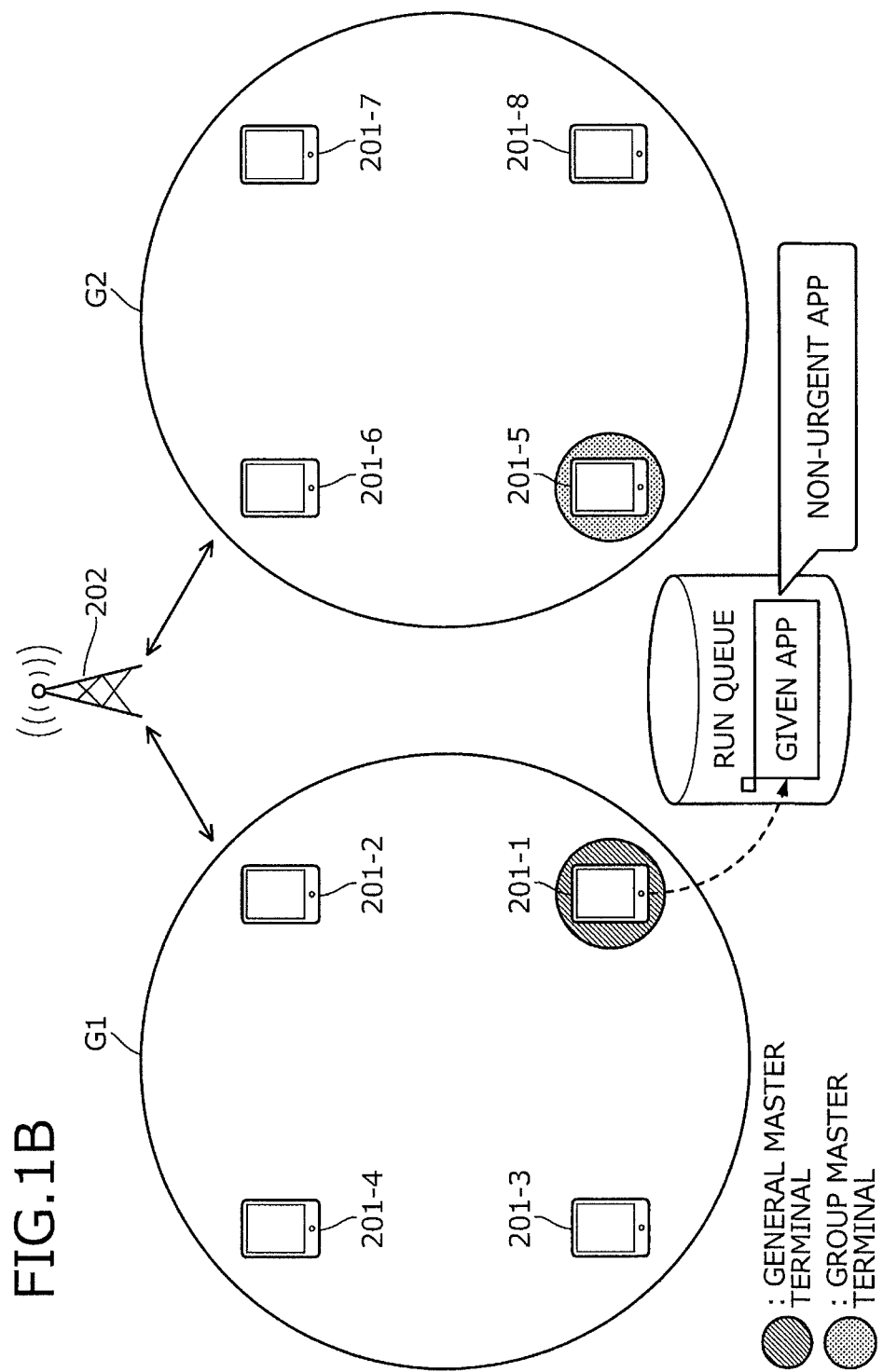

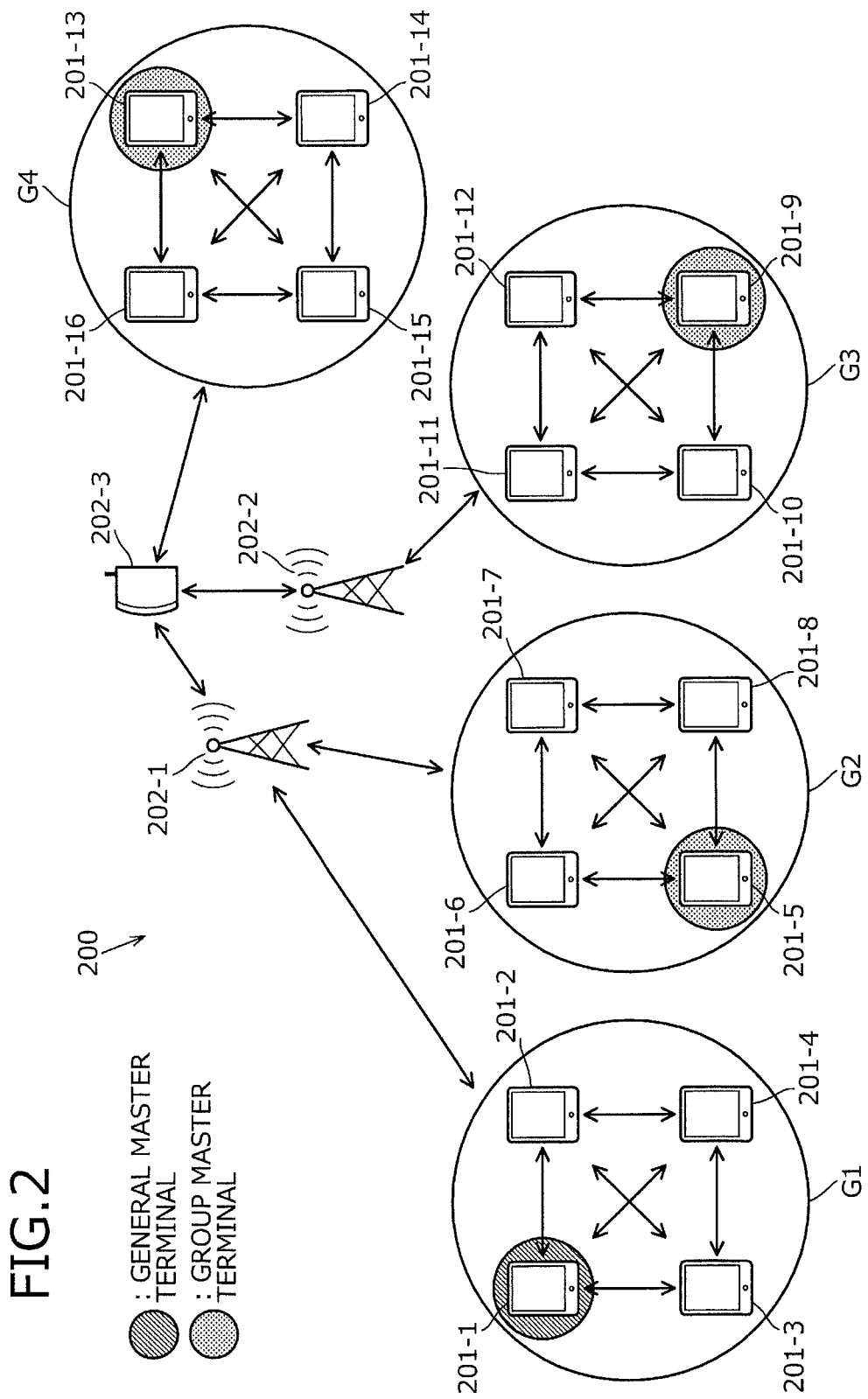

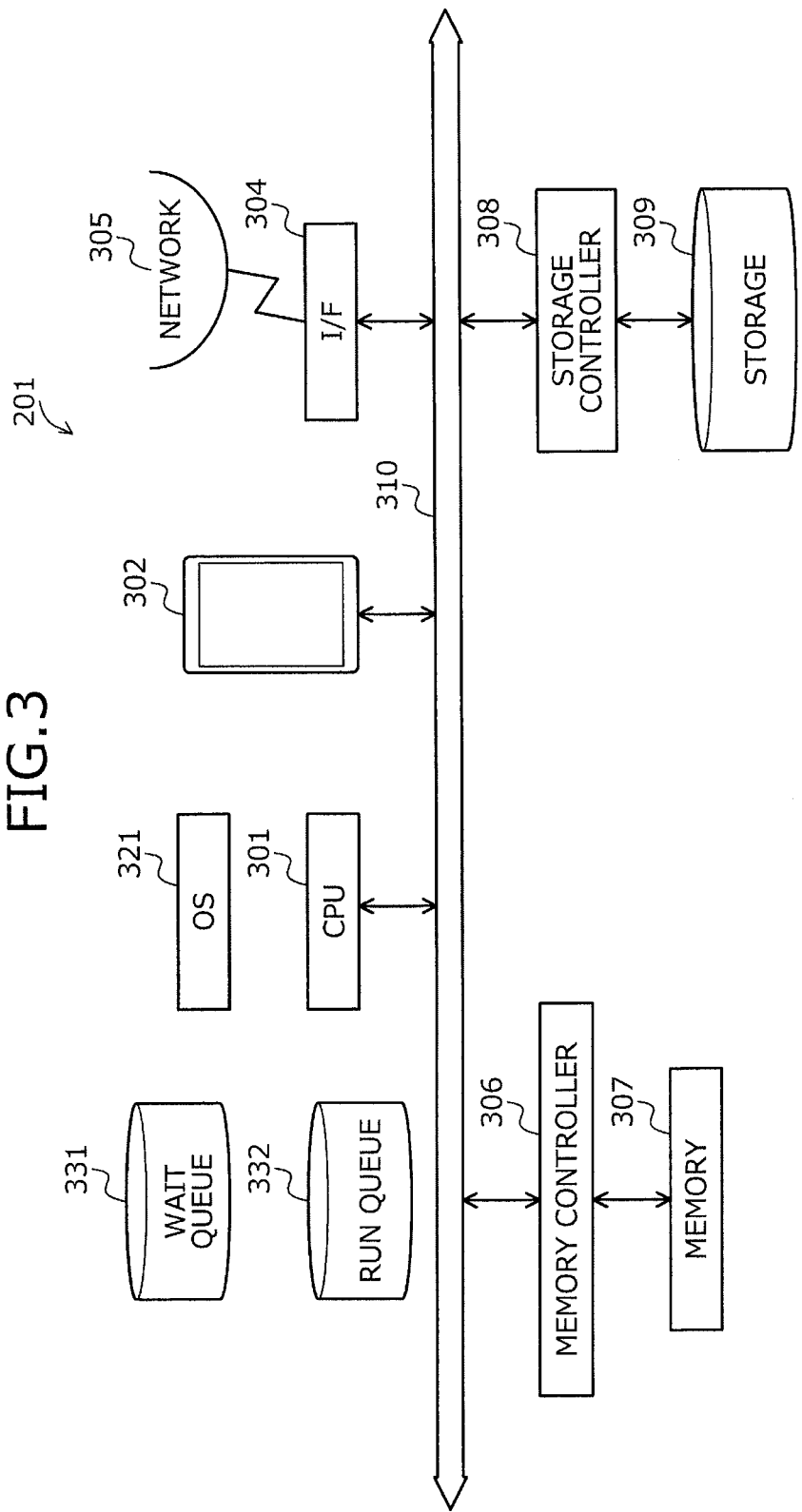

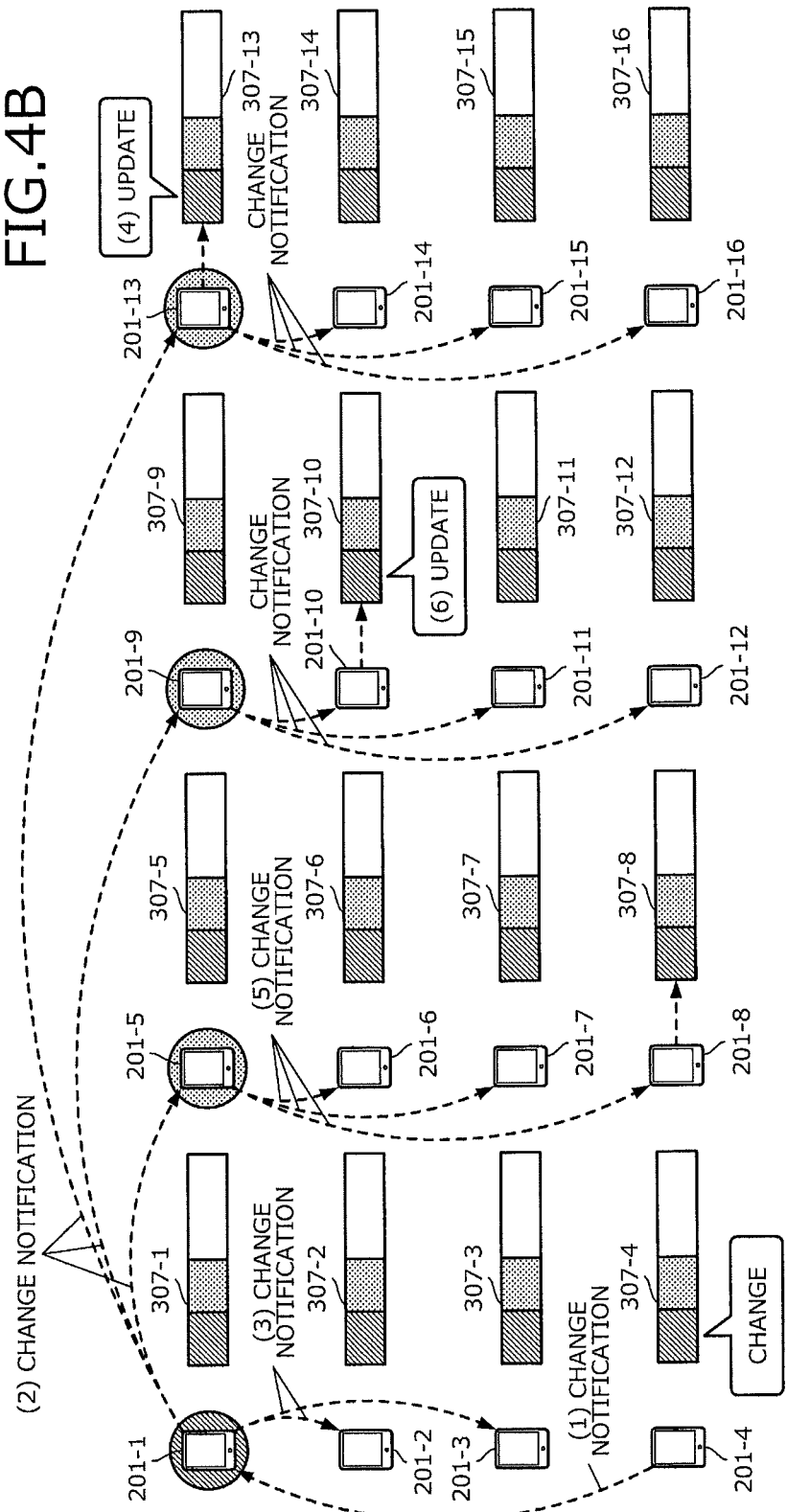

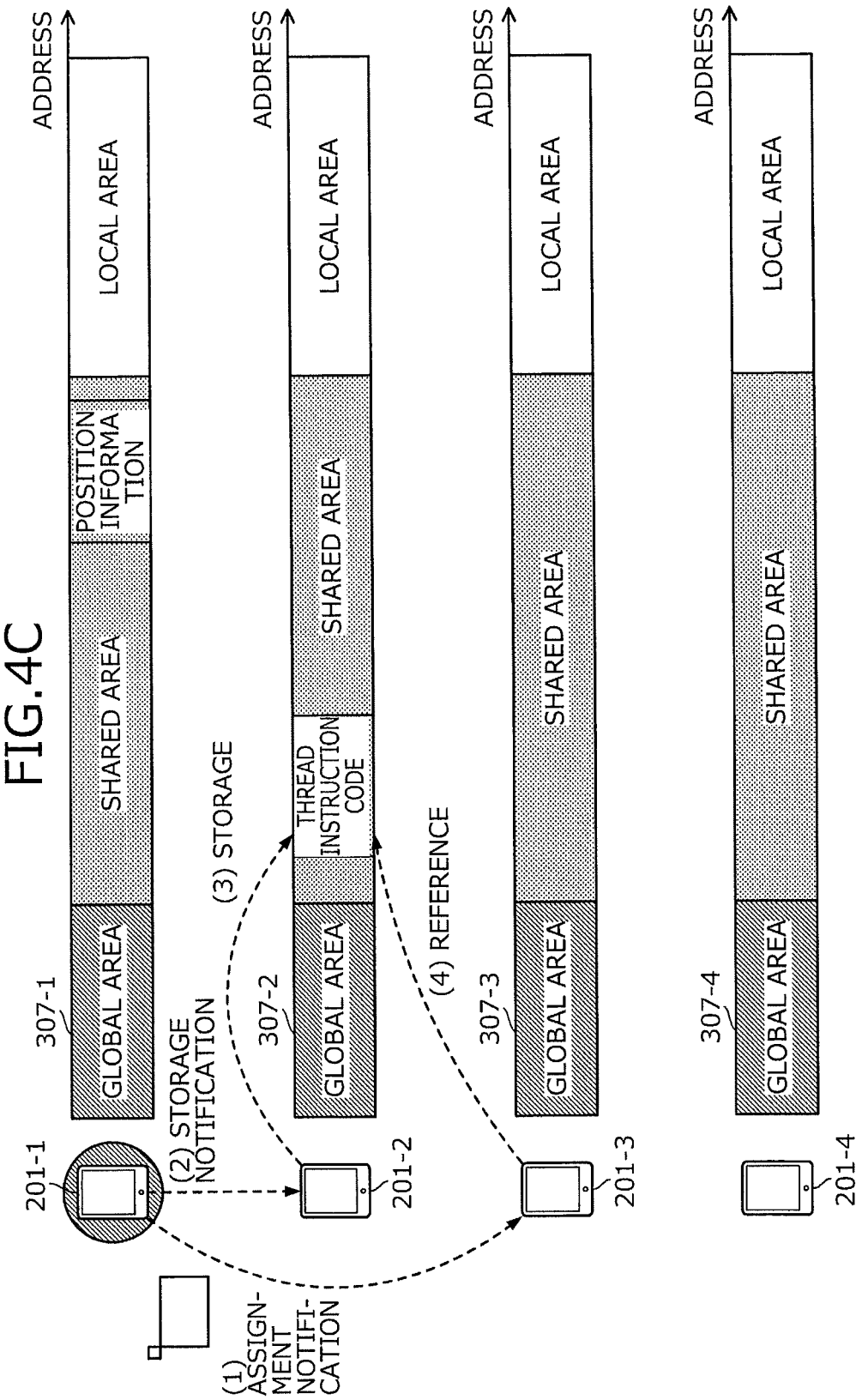

FIG.5C
<SLAVE TERMINAL>
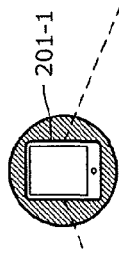
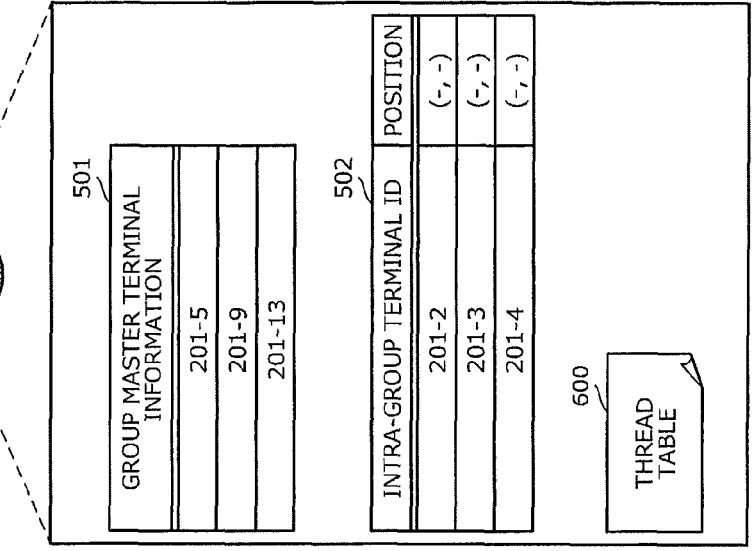
FIG.5B
<GROUP MASTER TERMINAL>
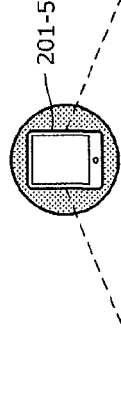
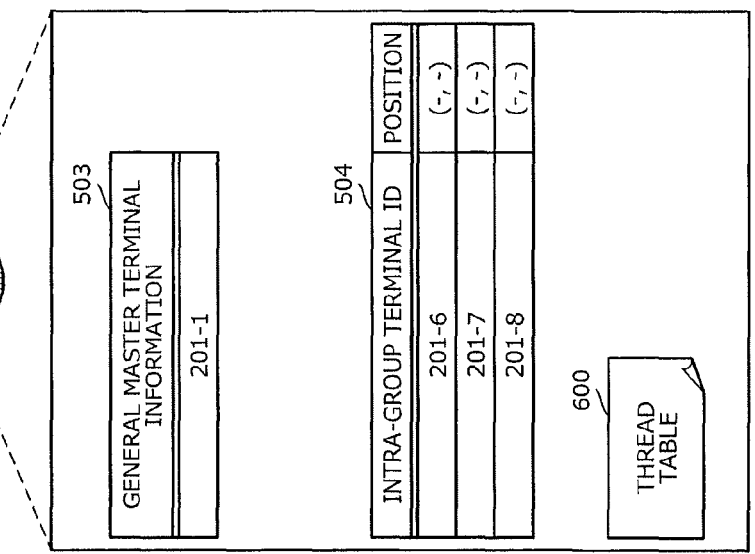
FIG.5A
<GENERAL MASTER TERMINAL>
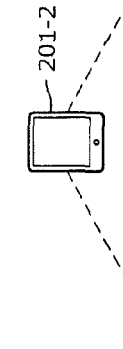
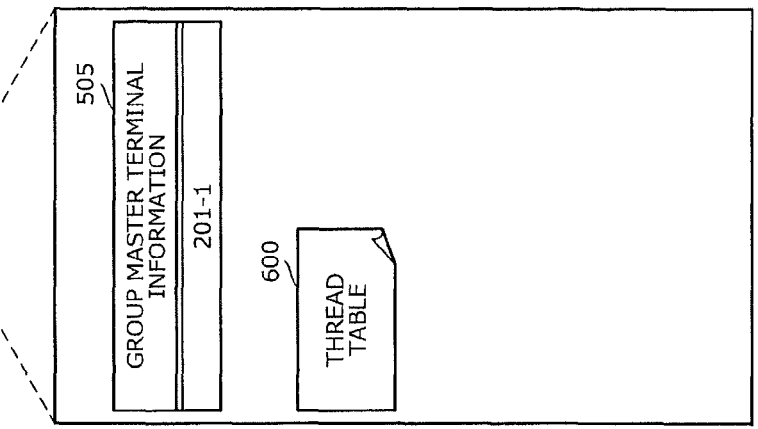

FIG.6

| APP ID | THREAD ID | SHARED DATA | FLAG | END TIME | LOAD AMOUNT [%] |
|--------|-----------|-------------|------|----------|-----------------|
| 801-1 | 801-1-1 | a, k, b | 0 | - | 10 |
| 801-1 | 801-1-2 | a, k | 0 | - | 30 |
| 801-1 | 801-1-3 | b | 0 | - | 20 |
| 801-2 | - | - | 1 | 13:05:00 | 40 |
| 801-3 | - | - | 0 | - | 10 |
| ⋮ | ⋮ | ⋮ | ⋮ | ⋮ | ⋮ |

600

601-1
601-2

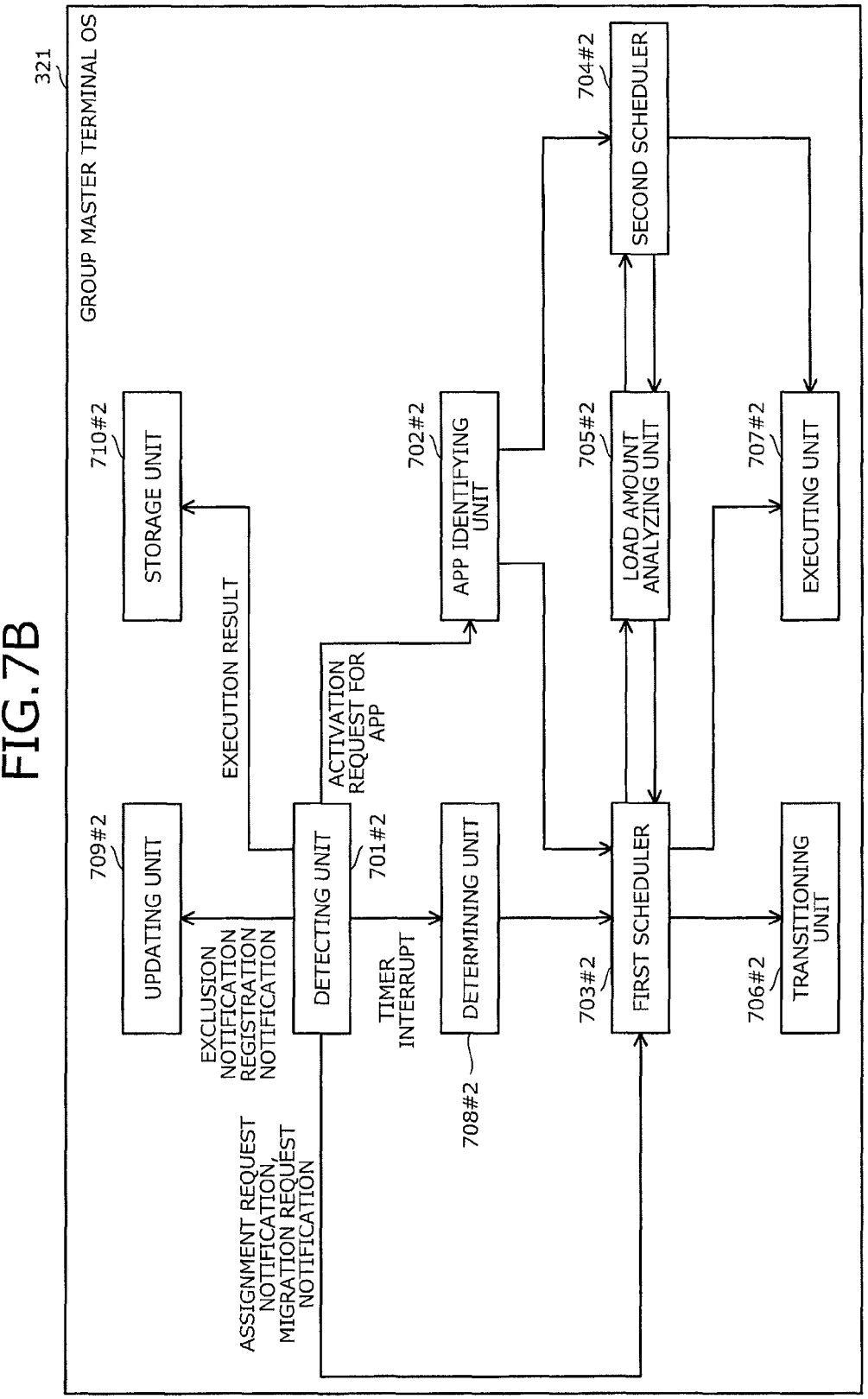

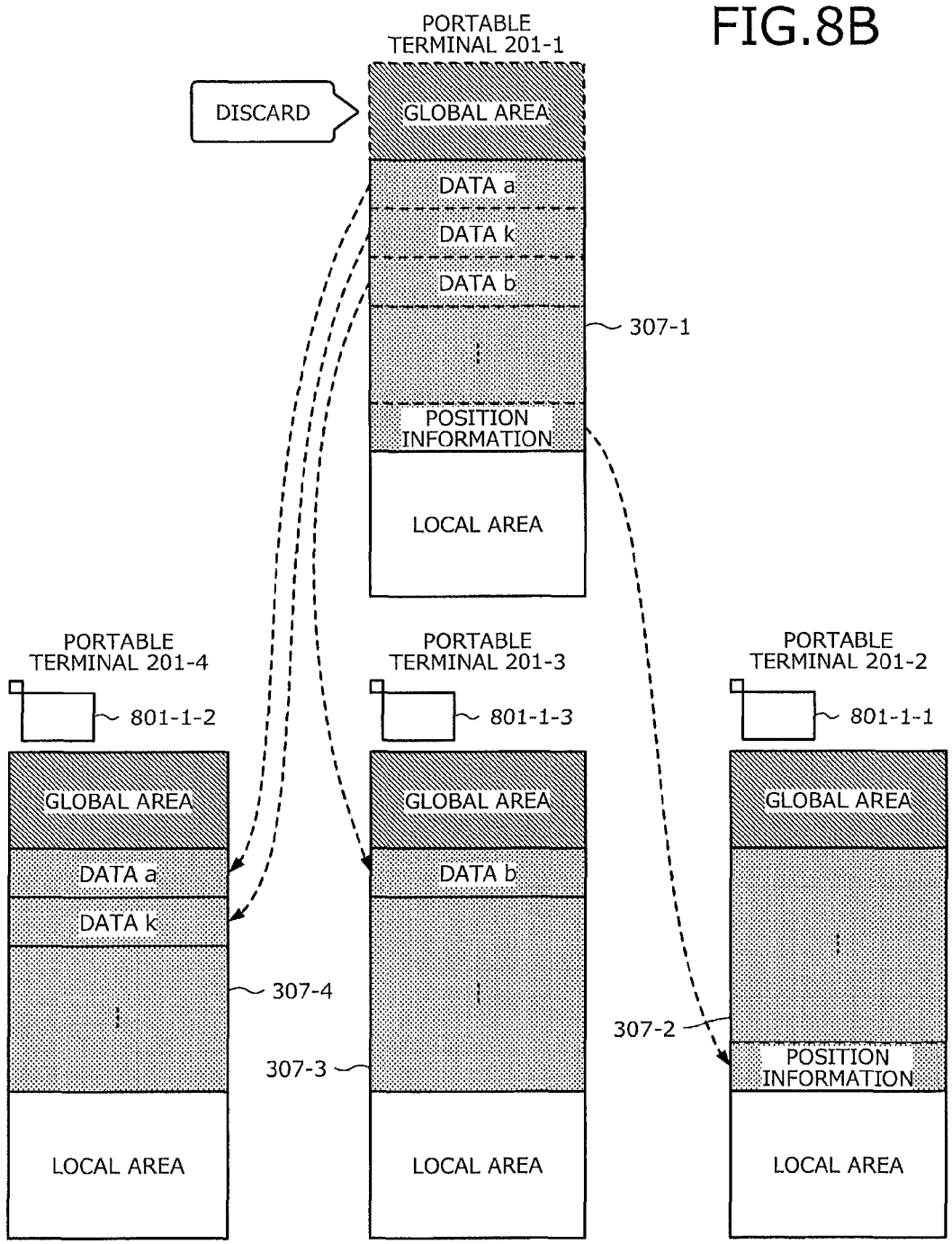

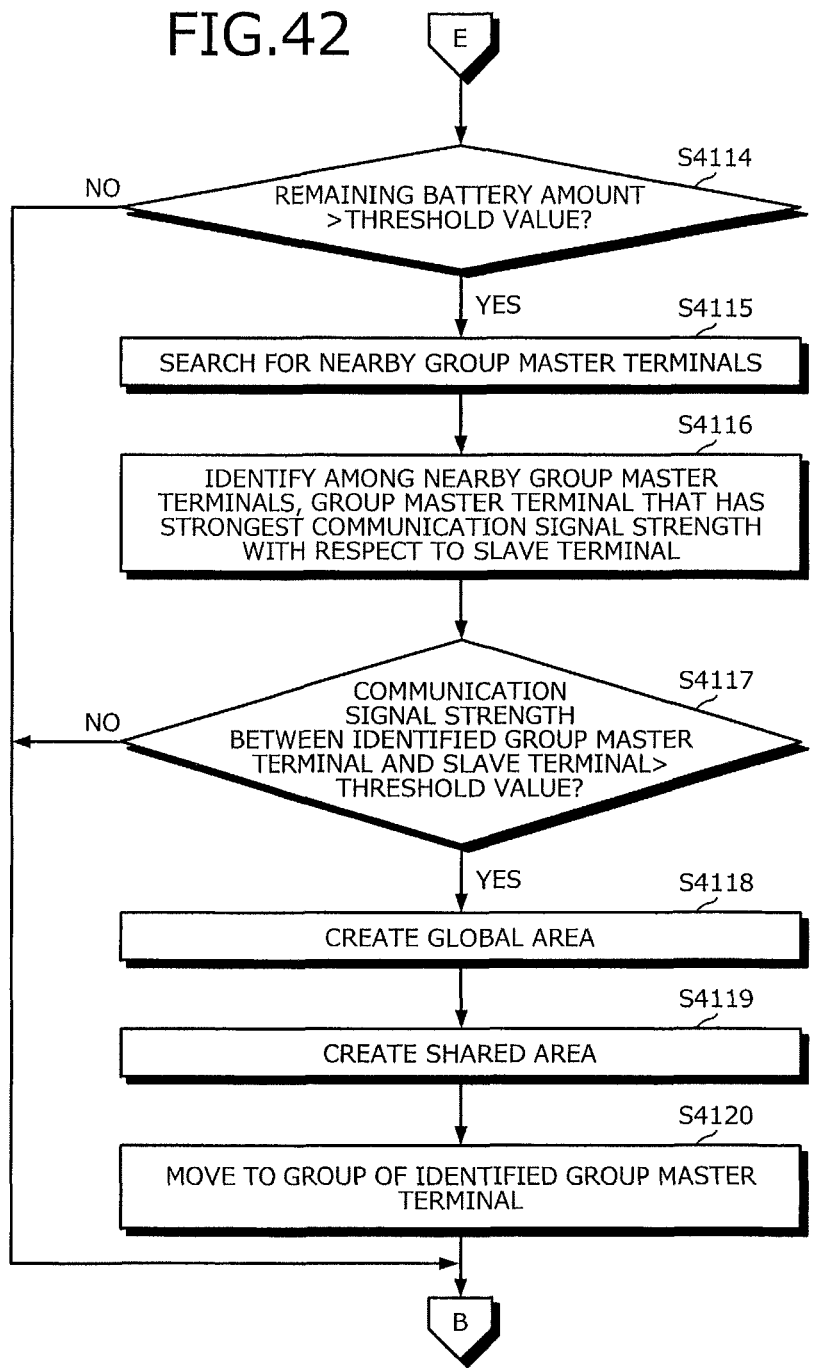

SCHEDULING METHOD AND SCHEDULING SYSTEM

CROSS REFERENCE TO RELATED APPLICATIONS

This application is a continuation application of International Application PCT/JP2011/068204, filed on Aug. 9, 2011 and designating the U.S., the entire contents of which are incorporated herein by reference.

FIELD

The embodiments discussed herein are related to a scheduling method that assigns applications (apps), and a scheduling system.

BACKGROUND

A technique is conventionally known in which multiple computers execute parallel/distributed processing of an application (hereinafter referred to as an "app") through a network. A related known technique is a procedure of changing urgency and priority of a process according to performance and load of each computer when multiple computers execute distributed processing.

Recently, a technique is further known in which multiple portable terminals such as portable telephones and personal digital assistants (PDAs) execute parallel processing through a wireless network. For examples, refer to Japanese Laid-Open Patent Publication No. H7-282013 and 2004-164255.

Nonetheless, if multiple computers execute parallel processing, a computer having a function (referred to as a "master function") of determining the assignment of processes to the respective computers is subject to load. If the computer having the master function executes an app, the performance of the app problematically deteriorates due to a process related to the master function.

SUMMARY

According to an aspect of an embodiment, a scheduling method includes determining whether priority of an application to be activated is of a given priority, the determining being performed by a first data processing apparatus that is included in a first group having at least one data processing apparatus; transferring to a second data processing apparatus that is included in any one among a second group and the first group, a predetermined function of the first data processing apparatus so as to execute the application by the first data processing apparatus, the transferring being performed when the priority of the application is of the given priority, and the first and the second groups being among a plurality of groups that each includes at least one data processing apparatus; and placing the application in an execution queue of the first data processing apparatus, when the priority of the application is not the given priority.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B are explanatory views of assignment examples;

FIG. 2 is an explanatory view of an example of a scheduling system;

FIG. 3 is an explanatory view of a hardware configuration example of portable terminals 201;

FIG. 4B is an explanatory view of a management example of a GLOBAL area;

FIG. 4C is an explanatory view of a management example of a SHARED area;

FIGS. 5A, 5B, and 5C are explanatory views of examples of tables included in the portable terminals 201;

FIG. 6 is an explanatory view of an example of a thread table 600;

FIGS. 7A, 7B, and 7C are block diagrams of functional examples of an OS 321 of the portable terminals 201;

FIG. 8B is an explanatory view of an operation example (part two) when the given app is a forced app;

FIGS. 38, 39, 40, 41, and 42 are flowcharts of a process procedure performed by the slave terminal.

DESCRIPTION OF EMBODIMENTS

Figure 4A:
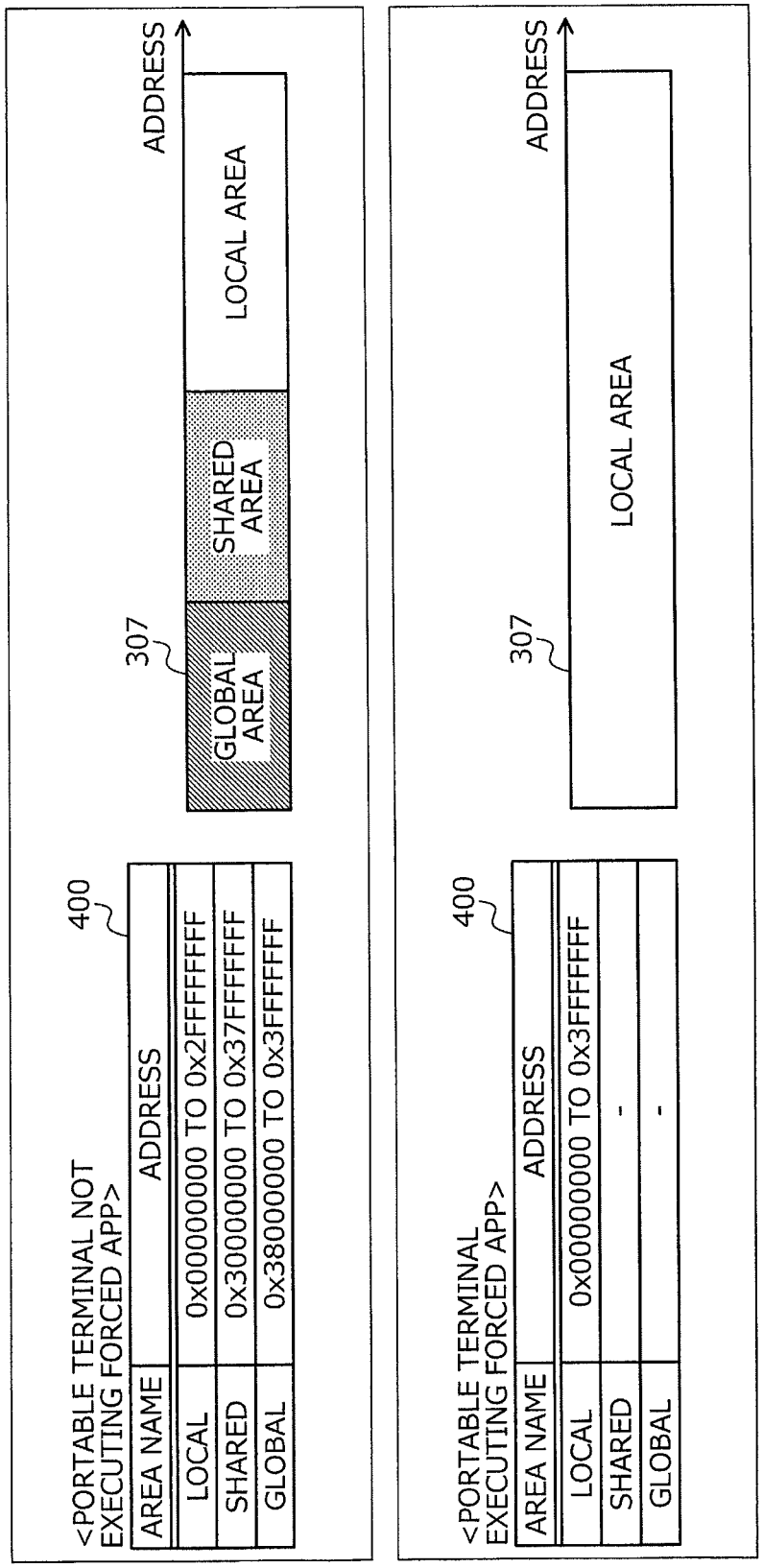
FIG. 4A is an explanatory view of an example of management of memory 307 of the portable terminals 201.

When multiple computers execute the parallel processing or distributed processing, if one computer having a master function provides overall control of the multiple computers, the time consumed for assignment may increase. Therefore, in this embodiment, the multiple computers are grouped, and a general master terminal controlling the entire scheduling system and a group master terminal controlling computers belonging to a group execute assignment processes. As a result, the time consumed for assignment by the general master terminal can be reduced to prevent an overload state of the general master terminal.

Meanwhile, if a highly-urgent app is executed, a two-staged assignment process is executed as a process of the general master terminal, which determines a group defined as an assignment destination and a process of the group master terminal, which determines an assignment destination from among portable terminals belonging to the group. A highly-urgent app may be a streaming-related app such as a video process and an image process and may be a phone call and email in the case of mobile telephones. For example, a streaming-related app such as a video process and an image process may cause interruption of a process due to slow response and causing inconvenience to users and thus, is cited herein as a highly-urgent app. A highly-urgent app may be an app for which a designer of the scheduling system determines that quicker responsiveness thereof is beneficial for users. The execution of the two-staged assignment process may affect execution performance in the case of a highly-urgent app.

If a highly-urgent app is activated at a general master terminal or a group master terminal, the general master terminal or the group master terminal must execute both the process related to the master function and the app. Therefore, the performance of the app may deteriorate due to the process related to the master function.

Thus, in this embodiment, the assignment method is switched depending on whether the app is highly-urgent, thereby reducing deterioration of app performance.

In this embodiment, a scheduling system that executes parallel processing will be described taking multiple portable terminals as an example. For example, it is predicted that a high-speed wireless communication service such as Long Term Evolution (LTE) will provide a service associated with parallel distributed processing executed by multiple portable terminals in the future. Embodiments of a scheduling method and a scheduling system will be described in detail with reference to the accompanying drawings.

FIGS. 1A and 1B are explanatory views of assignment examples. In FIGS. 1A and 1B, multiple portable terminals 201 are categorized into a first group, i.e., group G1, and a second group, i.e., group G2. The group G1 includes portable terminals 201-1 to 201-4 and the group G2 includes portable terminals 201-5 to 201-8. Communication between the group G1 and the group G2 is via an access point 202. The access point 202 is a base station in the case of the portable terminals 201, for example. The portable terminals 201 of the group G1 are directly connected in an ad-hoc mode enabling communication among the portable terminals 201 of the group G1.

The portable terminal 201-1 is a general master terminal having a function of assigning apps and threads subjected to parallel distributed processing by the multiple portable terminals 201. The portable terminal 201-1 also has a function of a group master that assigns apps and threads to the portable terminals 201 included in the group G1. The portable terminal 201-5 is a group master terminal having a function of a group master that assigns apps and threads to the portable terminals 201 included in the group G2.

For example, the portable terminal 201-1 determines whether priority of a given app for which an activation request has been issued is a given priority. The portable terminal 201-1 determines that the given app is a highly-urgent app if the priority of the given app is the given priority, and determines that the given app is a non-urgent app if the priority of the given app is not the given priority. For example, it is assumed that the priority of the given app is defined in advance by a designer of the given app.

In the example depicted in FIG. 1A, the portable terminal 201-1 determines that the priority of the given app is the given priority. If the priority of the app is the given priority, the portable terminal 201-1 transfers the general master terminal function to another portable terminal 201 included in the group G2 or group G1. In the example depicted in FIG. 1A, the portable terminal 201-1 transfers the general master function to the portable terminal 201-2. The portable terminal 201-1 then immediately starts executing the given app. As a result, the portable terminal 201-1 can concentrate on the execution of the given app.

In the example depicted in FIG. 1B, the portable terminal 201-1 determines that the priority of the given app is not the given priority. If the priority of the given app is not the given priority, the portable terminal 201-1 registers the app into a run queue. As a result, the portable terminal 201-1 executes the given app and the process related to the general master terminal function in a switching manner.

FIG. 2 is an explanatory view of an example of a scheduling system. A scheduling system 200 has multiple portable terminals 201-1 to 201-$n$ ($n \geq 2$; in FIG. 2, $n=16$) and access points 202-1 to 202-$m$ ($m \geq 1$; in FIG. 2, $m=3$). The multiple portable terminals 201-1 to 201-16 are divided into groups.

The portable terminals 201 are connected to each other through a wireless LAN network. For example, the portable terminals 201 of different groups communicate with each other via the access point 202, and the portable terminals 201 in the same group directly communicate with each other without using the access point 202. The portable terminals 201 search for a nearby access point 202 rather than always connecting to the same access point 202. The access points 202 are connected to each other through a physical LAN network, for example.

In FIG. 2, the portable terminals 201-1 to 201-4 belong to the group G1; the portable terminals 201-5 to 201-8 belong to the group G2; the portable terminals 201-9 to 201-12 belong to the group G3; and the portable terminals 201-13 to 201-16 belong to the group G4. For example, the groups may be divided by a predetermined number on the basis of the portable terminals 201 relayed by the same access point 202.

It is assumed that the multiple portable terminals 201 have identification information indicating that the portable terminals 201 belong to the scheduling system 200. The multiple portable terminals 201-1 to 201-16 are categorized into a general master terminal, a group master terminal, and a slave terminal. The general master terminal controls the entire scheduling system 200 and is also the group master terminal of a group to which the general master terminal belongs. In the example depicted in FIG. 2, the general master terminal is the portable terminal 201-1.

The group master terminal controls the entire group to which the group master terminal belongs. In the example depicted in FIG. 2, the group master terminal of the group G1 is the portable terminal 201-1 and the group master terminal of the group G2 is the portable terminal 201-5. In the example depicted in FIG. 2, the group master terminal of the group G3 is the portable terminal 201-9 and the group master terminal of the group G4 is the portable terminal 201-13. Among the multiple portable terminals 201-1 to 201-16, the remaining portable terminals 201 other than the general master terminal and the group master terminals are the slave terminals.

Upon receiving an activation instruction for a given app that can be processed in parallel by the multiple portable terminals 201, the general master terminal transmits an execution request to the slave terminals. A hardware configuration example of the portable terminals 201 is depicted in FIG. 3. In this embodiment, to facilitate understanding, all the portable terminals 201 have the same hardware configuration.

FIG. 3 is an explanatory view of a hardware configuration example of the portable terminals 201. The portable terminal 201 has a CPU 301, an input/output (I/O) 302, an interface (I/F) 304, a memory controller 306, memory 307, storage 309, and a storage controller 308. The CPU 301, the I/O 302, the I/F 304, the memory controller 306, and the storage controller 308 are connected via a bus 310.

The CPU 301 is responsible for overall control of the portable terminal 201. The CPU 301 has a register, a core, and a cache. The core has a computing function. The register in each of the CPUs 310 has a program counter (PC) and a reset register. The CPU 301 executes an OS 321 and the OS 321 executes apps and threads assigned to the portable terminal 201. The OS 321 has a wait queue 331 and a run queue 332. If an app is enqueued to the wait queue 331, the OS 321 determines that an activation instruction for the app has been received. The OS 321 can enqueue apps and threads to an execution queue, i.e., the run queue 332, so as to execute multiple apps or threads in a switching manner.

The I/O 302 displays cursors, icons, or tool boxes, as well as data such as documents, images, and functional information. As the I/O 302, for example, a TFT liquid crystal display can be employed. The I/O 302 is a touch panel type input pad and is able to receive input of numbers, various instructions, etc.

The I/F 304 is connected through a wireless communication line to a network 305 such as a local area network (LAN), a wide area network (WAN), and the Internet and is connected via the network 305 to other portable terminals 201. The I/F 304 is responsible for an internal interface with the network 305 and controls the input and output of data with respect to an external apparatus and other portable terminals 201. As the I/F 304, for example, a modem for wireless communication can be employed. For example, the I/F 304 has a function of directly communicating with other portable terminals 201 in an ad-hoc mode and communicating via the access point 202 with another portable terminal 201 in an infrastructure mode.

The storage 309 may be read-only memory (ROM) and flash ROM, for example. The storage controller 308 controls access from the CPU 301 to the storage 309. For example, the ROM stores a program such as a boot program. The flash ROM stores programs of system software, such as the OS 321, and applications.

The memory 307 is used as a work area of the CPU 301. The memory controller 306 controls access from the CPU 301 to the memory 307. The memory 307 may be random access memory (RAM), for example. Management of the memory 307 will be described with reference to FIGS. 4A to 4B.

FIG. 4A is an explanatory view of an example of management of the memory 307 of the portable terminals 201. In this embodiment, process assignment is determined in two stages at the general master terminal and the group master terminal. Therefore, in this embodiment, to facilitate assignment and parallel processing, each of the portable terminals 201 divides an area of the memory 307 thereof into three areas for management. However, if the portable terminal 201 is executing a highly-urgent app (hereinafter referred to as a "forced app"), the area is not divided into three areas so as to allow the forced app to exclusively use the memory 307. As depicted in FIG. 4A, if the portable terminal 201 is not executing a forced app, the memory 307 is divided into three areas, i.e., a GLOBAL area, a SHARED area, and a LOCAL area for management.

For example, the GLOBAL area is a first area and is used for storing data related to apps and threads assigned to different groups and for storing information related to the overall scheduling system 200. For example, the SHARED area is a second area and is used for storing instruction code of an app assigned to the group master terminal of the group to which the portable terminal 201 belongs, data of the app, and data shared between threads. For example, the LOCAL area is used for storing information related to apps and threads executed locally only at the portable terminal 201.

If the area of the memory 307 is divided when the portable terminal 201 is executing a forced app, the execution performance of the forced app may be affected and therefore, if the portable terminal 201 is executing a forced app, the area of the memory 307 is defined entirely as the LOCAL area.

A memory management table 400 has fields of an area name and an address. In the area name fields, LOCAL, SHARED, and GLOBAL are registered. In the address fields, address information established for each area is registered. In the memory management table 400 when the portable terminal 201 is not executing a forced app, address information is registered in the address fields corresponding to the respective areas. In the memory management table 400 when the portable terminal 201 is executing a forced app, no address information is registered in the address fields corresponding to the SHARED area and the GLOBAL area. The memory management table 400 is assumed to be stored in the LOCAL area or the storage 309, which is writable.

FIG. 4B is an explanatory view of a management example of the GLOBAL area. In FIG. 4B, to clearly indicate the memory 307 of the respective portable terminals 201, the memory 307 of each portable terminal 201 is appended with the same sequential number appended to the portable terminal 201 thereof. In this case, the GLOBAL area is managed as in a case of snoop processing of the cache of the CPU 301. For example, when a given portable terminal 201 changes data in the GLOBAL area, the data in the GLOBAL area in other portable terminals 201 can be updated.

In an example depicted in FIG. 4B, a write request for the GLOBAL area is issued to the portable terminal 201-4 and a change is made in the GLOBAL area. For example, a write request for the GLOBAL area is detected by the memory controller 306 of the portable terminal 201-4. The memory controller 306 of the portable terminal 201-4 notifies the CPU 301 of the detection of the write request, and the CPU 301 of the portable terminal 201-4 transmits a data change notification, via the I/F 304, to the portable terminal 201-1 acting as the general master terminal (1).

When the portable terminal 201-1 receives the data change notification, if the data is included in the GLOBAL area, the data is updated. The portable terminal 201-1 transmits a data change notification to the portable terminal 201-5, the portable terminal 201-9, and the portable terminal 201-13 respectively acting as the group master terminals of the other groups (2). The portable terminal 201-1 transmits the data change notification to the portable terminal 201-2 and the portable terminal 201-3 that are the slave terminals of the group G1 to which the portable terminal 201-1 belongs (3).

Upon receiving the data change notification, if the data is included in the respective GLOBAL areas, the portable terminal 201-5, the portable terminal 201-9, and the portable terminal 201-13 acting as the group master terminals of the groups update the data (4). The portable terminal 201-5, the portable terminal 201-9, and the portable terminal 201-13 transmit the data change notification to the slave terminals of the groups to which the respective terminals 201-9, 201-13 belong (5). Upon receiving the data change notification, if the data is included in the GLOBAL area, each of the slave terminals updates the data (6).

FIG. 4C is an explanatory view of a management example of the SHARED area. In this case, the SHARED area is shared by the portable terminals 201 in a group as in the case of a distributed shared memory. It is assumed that the general master terminal and the group master terminals have positional information. Details of the positional information will be described later with reference to FIG. 5.

In the example depicted in FIG. 4C, for example, the portable terminal 201-1 acting as the general master terminal assigns a thread to the portable terminal 201-3 through transmission of an assignment instruction (1) and transmits a thread storage instruction to the portable terminal 201-2 (2). The portable terminal 201-2 stores instruction code of the thread into the SHARED area according to the storage instruction (3). The portable terminal 201-3 refers to the instruction code of the thread stored in the SHARED area of the portable terminal 201-2 and executes the assigned thread (4). "Referring to the instruction code of the thread" particularly means that, for example, the portable terminal 201-3 communicates with the portable terminal 201-2, via the I/F 304, in the ad-hoc mode and accesses the SHARED area of the portable terminal 201-2.

FIGS. 5A, 5B, and 5C are explanatory views of examples of tables included in the portable terminals 201. Each of the portable terminals 201 retains different tables depending on whether the portable terminal 201 is functioning as the general master terminal, functioning as a group master terminal, or functioning as a slave terminal.

As depicted in FIG. 5A, for example, the general master terminal has group master terminal information 501, positional information 502, and a thread table 600. FIG. 5A depicts an example of the portable terminal 201-1 that is the general master terminal. The group master terminal information 501 indicates which portable terminals 201 are the group master terminals of the respective groups. For example, the identification information of the group master terminals is registered in the group master terminal information 501. As a result, the general master terminal can transmit assignment request notification and execution completion notification for an app and a thread to each group based on the identification information of the portable terminals 201 registered in the group master terminal information 501.

In the positional information 502, information is registered that relates to the positions of the slave terminals belonging to the group of the general master terminal. As described above, since the general master terminal and the slave terminals in the same group perform communication in the ad-hoc mode, the general master terminal has information indicating the positions of the slave terminals acquired by a global positioning system (GPS) etc. The positional information 502 has fields for intra-group terminal IDs and positions. In the intra-group terminal ID fields, identification information of the slave terminals belonging to the group of the general master terminal is registered. In the position fields, positional information of the slave terminals belonging to the group of the general master terminal is registered. The group master terminal information 501 is stored in a storage device such as the memory 307 of the general master terminal. The positional information 502 is stored in the SHARED area of the memory 307 as described above. The thread table 600 will be described later with reference to FIG. 6.

As depicted in FIG. 5B, for example, the group master terminals have general master terminal information 503, position information 504, and the thread table 600. In the general master terminal information 503, the identification information of the general master terminal is registered. FIG. 5B depicts an example of the portable terminal 201-5 that is a group master terminal. The group master terminal can transmit assignment request notification, migration request notification, execution completion notification, etc., described later to the general master terminal.

In the position information 504, information is registered that relates to positions of the slave terminals belonging to the group of the group master terminal. The positional information 504 has fields for intra-group terminal IDs and positions. In the intra-group terminal ID fields, identification information of the slave terminals belonging to the group of the group master terminal is registered. In the position fields, positional information of the slave terminals belonging to the group of the general master terminal is registered. As a result, the group master terminal can communicate in the ad-hoc mode, with the slave terminals belonging to the same group. The general master terminal information 503 is stored in a storage device such as the memory 307 of the group master terminal. The positional information 504 is stored in the SHARED area of the memory 307 as described above. The thread table 600 will be described later with reference to FIG. 6.

The slave terminals have group master terminal information 505 and the thread table 600. FIG. 5C depicts an example of the portable terminal 201-2 that is a slave terminal. The group master terminal information 505 is registered as the identification information of the group master terminal of the group to which the slave terminal belongs. As a result, the slave terminals can transmit assignment request notification, migration request notification, execution completion notification, etc., described later to the group master terminal. The group master terminal information 505 is stored in a storage device such as the memory 307 of the slave master terminal. The thread table 600 will be described with reference to FIG. 6.

FIG. 6 is an explanatory view of an example of the thread table 600. In the thread table 600, information concerning apps is registered. An app has one or more threads. The CPU 301 executes processing in units of threads. In this embodiment, if an app has only one thread, the app and the thread are one in the same; however, if an app has two or more threads, a set of two or more threads is referred to as an app.

The thread table 600 has fields for app IDs, thread IDs, shared data, flags, end times, and load amounts. By setting values in the fields, thread information (e.g., 601-1, 601-2) is stored as records.

In the app ID fields, identification information of an app is registered. In the thread ID fields, identification information of a thread is registered. In the shared data fields, data shared by multiple threads is registered.

In the flag fields, a value is registered that indicates whether the app is a forced app. In this embodiment, priority of an app is represented by whether the app is the forced app. If an app is categorized as a forced app, the priority of the app is determined to have a given priority and if the app is not categorized as a forced app, the app is determined to have a priority that is not the given priority. For example, an app for which zero is registered in the flag field is not a forced app, while an app for which one is registered in the flag field is a forced app. The thread table 600 is stored in a storage device such as the memory 307 and the storage 309 of the portable terminals 201.

In the end time fields, the time that indicates when the execution of the thread is to be terminated is registered. For example, if a thread has time information set in the end time field, the thread is determined to have a real-time limitation and if the thread has no time information set in the end time field, the thread is determined to have no real-time limitation. Although not depicted, if a time from the start of execution to the end of execution is determined in advance, the thread is determined to have a real-time limitation.

In this embodiment, to facilitate understanding, it is assumed that all the portable terminals 201 have the same thread tables 600. In actuality, since different apps are downloaded by the portable terminals 201, the portable terminals 201 have the different thread tables 600. Further, configuration may be such that the information of threads subject to parallel distributed processing alone are registered in the thread table 600, or may be such that each of the portable terminals 201 retains tables of thread information that is only processed locally by the portable terminals 201.

Since it is assumed that all the portable terminals 201 have the same hardware configuration to facilitate understanding, the load amounts are the same in each of the portable terminals 201; however, the load amounts actually vary depending on the performance of the CPUs 301 of the portable terminals 201.

Figure 7A:
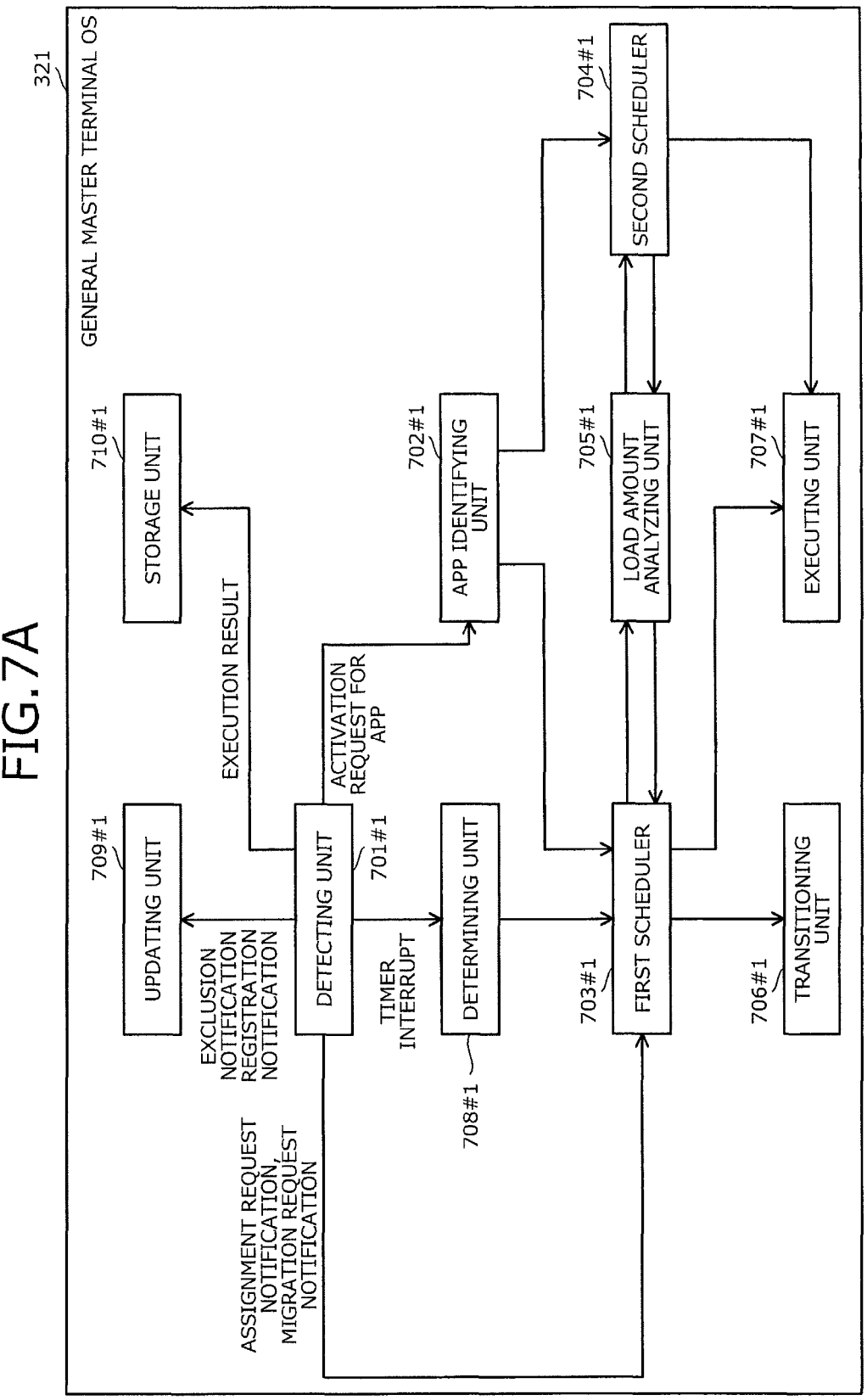
Figure 7C:
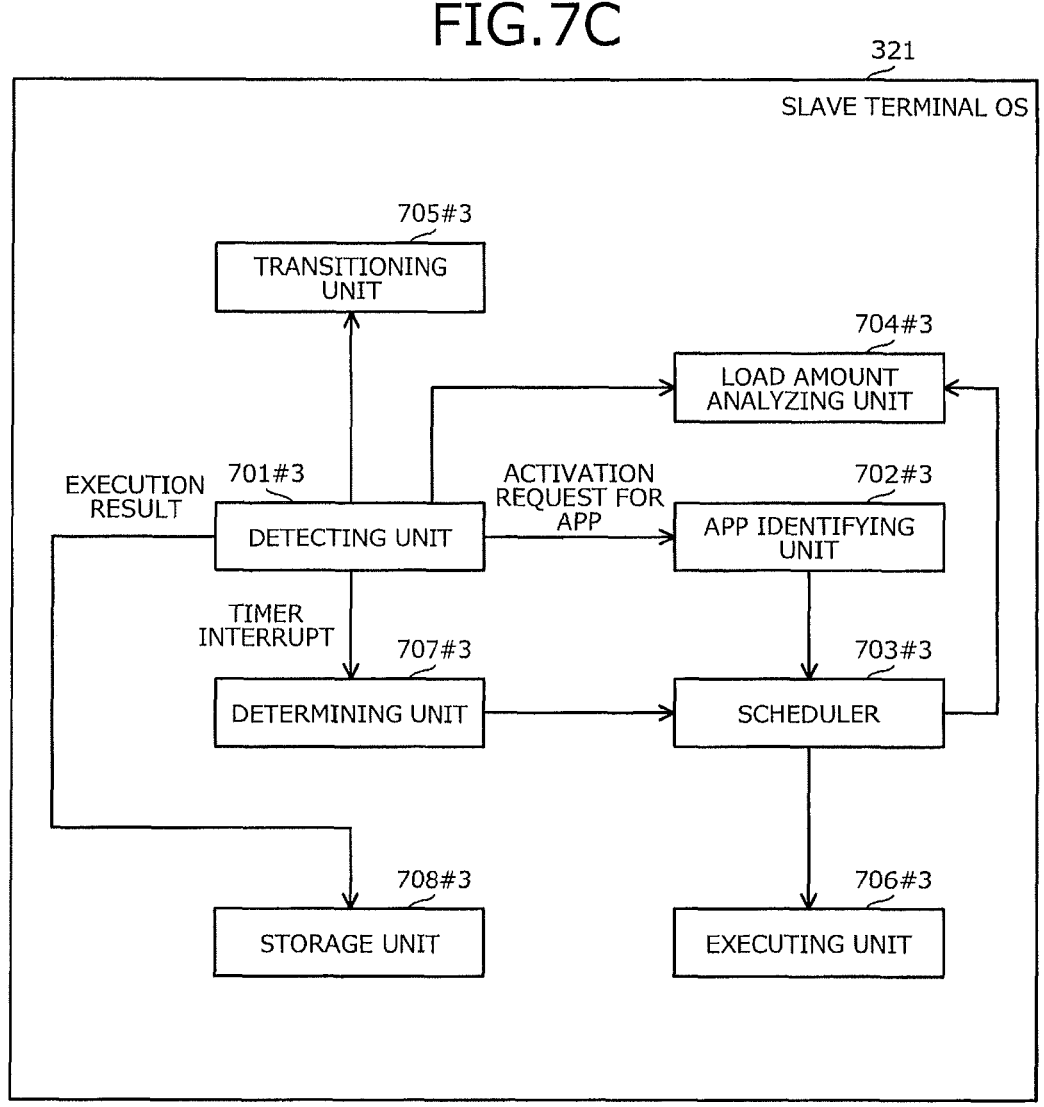

FIGS. 7A, 7B, and 7C are block diagrams of functional examples of the OS 321 of the portable terminals 201. It is assumed that although the OS 321 of the portable terminals 201 has the respective functions of the general master terminal, the group master terminal, and the slave terminal, the portable terminals 201 can set the functions to be enabled/disabled. As a result, the portable terminals 201 can transfer the general master terminal function or the group master terminal function, or can make a transition to the general master terminal or the group master terminal.

FIG. 7A depicts a functional block diagram of the OS 321 in the case of the general master terminal (referred to as a "general master terminal OS 321"). The general master terminal OS 321 has a detecting unit 701#1, an app identifying unit 702#1, a first scheduler 703#1, a second scheduler 704#1, and a load amount analyzing unit 705#1. The general master terminal OS 321 also has a transitioning unit 706#1, an executing unit 707#1, a determining unit 708#1, an updating unit 709#1, and a storage unit 710#1.

The processes of the detecting unit 701#1 to the storage unit 710#1 are coded in the OS 321. The CPU 301 reads the OS 321 stored in a storage device such as the storage 309 and executes the processes coded in the OS 321. As a result, functions of the detecting unit 701#1 to the storage unit 710#1 are implemented.

FIG. 7B depicts a functional block diagram of the OS 321 in a case of the group master terminal (referred to as a "group master terminal OS 321"). The group master terminal OS 321 has a detecting unit 701#2, an app identifying unit 702#2, a first scheduler 703#2, a second scheduler 704#2, and a load amount analyzing unit 705#2. The group master terminal OS 321 also has a transitioning unit 706#2, an executing unit 707#2, a determining unit 708#2, an updating unit 709#2, and a storage unit 710#2. The processes of the detecting unit 701#2 to the storage unit 710#2 are coded in the OS 321. The CPU 301 reads the OS 321 stored in a storage device such as the storage 309 and executes the processes coded in the OS 321. As a result, functions of the detecting unit 701#2 to the storage unit 710#2 are implemented.

FIG. 7C depicts a functional block diagram of the OS 321 in a case of the slave terminal (referred to as a "slave terminal OS 321"). The slave terminal OS 321 has a detecting unit 701#3, an app identifying unit 702#3, a scheduler 703#3, a load amount analyzing unit 704#3, a transitioning unit 705#3, an executing unit 706#3, a determining unit 707#3, and a storage unit 708#3. The processes of the detecting unit 701#3 to the storage unit 708#3 are coded in the OS 321. The CPU 301 reads the OS 321 stored in a storage device such as the storage 309 and executes the processes coded in the OS 321. As a result, functions of the detecting unit 701#3 to the storage unit 708#3 are implemented.

Functions of the OS 321 depicted in FIGS. 7A to 7C will be described in detail with first to sixth examples.

In a first example, upon receiving an activation request for a forced app, the general master terminal transfers the general master terminal function to another portable terminal 201 to preferentially execute the forced app. As a result, the capability of the CPU 301 can be assigned to the execution of the forced App and deterioration of the performance of the forced app can be reduced to improve the responsiveness of the forced app.

First, the detecting unit 701#1 of the general master terminal detects the occurrence of an event. In this case, for example, it is assumed that the detecting unit 701#1 of the general master terminal detects an activation request for an app (given app). When the detecting unit 701#1 detects the activation request for the given app, the app identifying unit 702#1 of the general master terminal identifies whether the given app is a force app. For example, based on the identification information of the given app, the app identifying unit 702#1 of the general master terminal refers to the thread table 600 to identify the value of the flag field in the thread information related to the given app. For example, the app identifying unit 702#1 of the general master terminal identifies that the given app to be a forced app if the identified value is one, and identifies the given app to not be a forced app if the identified value is zero.

If the app identifying unit 702#1 identifies the given app to be a forced app, the first scheduler 703#1 of the general master terminal selects the portable terminal 201 to be a transfer destination to which the general master terminal function to be transferred. As for a case where the given app is identified as a forced app, a detailed operation example will be described.

Figure 8A:
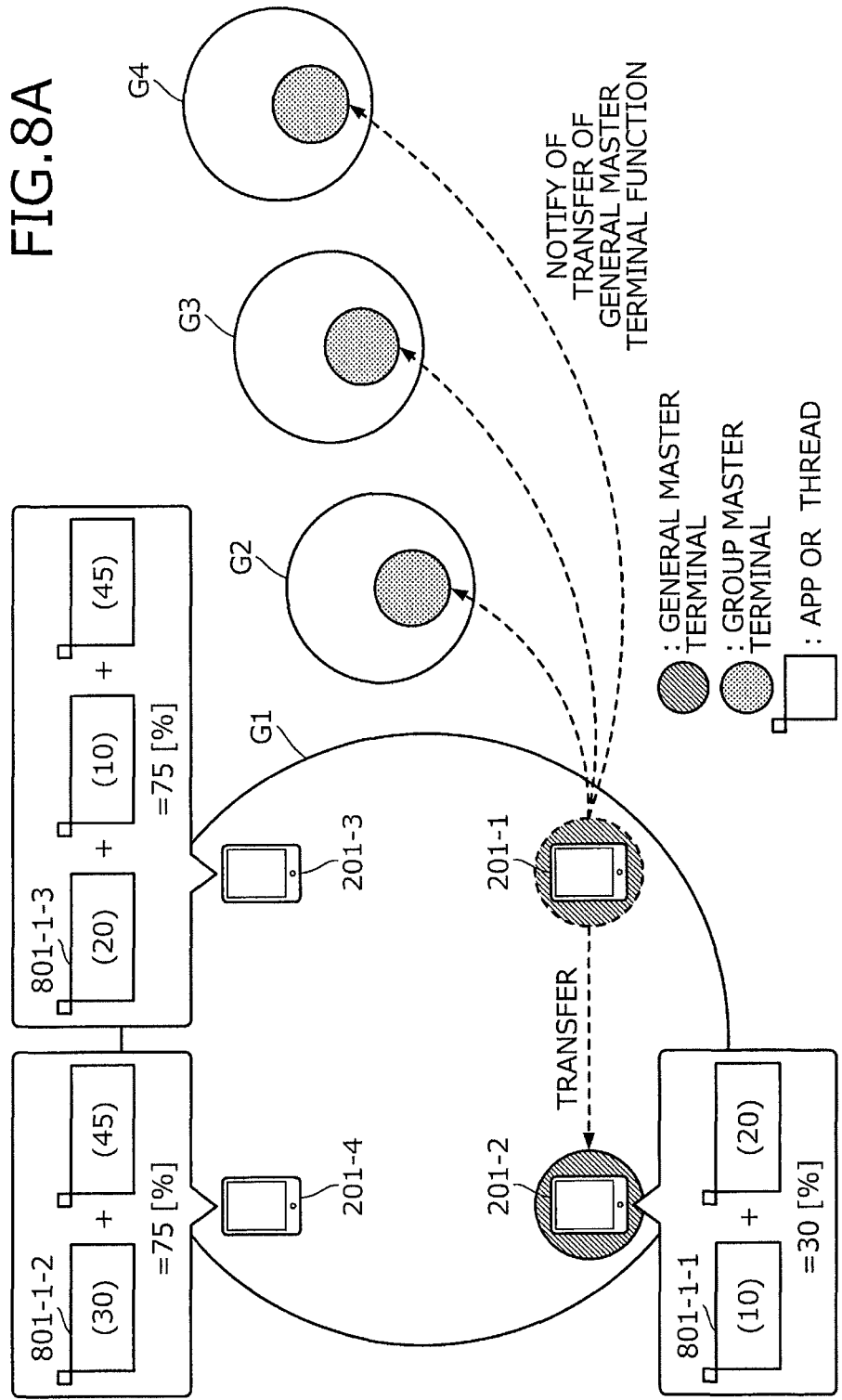
FIG. 8A is an explanatory view of an operation example (part one) when a given app is a forced app.

FIG. 8A is an explanatory view of an operation example (part one) when the given app is a forced app. For example, if the app identifying unit 702#1 identifies the given app to be a forced app, the first scheduler 703#1 of the general master terminal causes the load amount analyzing unit 705#1 to analyze the load amounts of the slave terminals in the group G1. The load amount analyzing unit 705#1 of the general master terminal analyzes the load amounts of the slave terminals in the group G1. For example, the load amount analyzing unit 705#1 of the general master terminal transmits load amount calculation notification to the slave terminals in the group G1.

The detecting unit 701#3 of each of the slave terminals detects receipt of the load amount calculation notification. The load amount analyzing unit 704#3 of each of the slave terminals calculates a total load of apps and threads under execution and awaiting execution at the slave terminal. The load amount analyzing unit 704#3 of each of the slave terminals transmits to the portable terminal 201 that is the transmission source of the load amount calculation notification, the calculated total load as the load amount of the slave terminal.

The load amount analyzing unit 705#1 of the general master terminal receives from each of the slave terminals, the total load of the apps and the threads under execution and awaiting execution at the slave terminal. In FIG. 8A, the total load of the portable terminal 201-3 is 75 [%]; the total load of the portable terminal 201-4 is 75[%]; and the total load of the portable terminal 201-2 is 30[%].

For example, the first scheduler 703#1 of the general master terminal selects the slave terminal having the smallest load amount among the slave terminals that are not executing a forced app in the group G1, as the transfer destination of the general master terminal function. In this example, for instance, the transfer destination is defined to be the portable terminal 201-2.

FIG. 8B is an explanatory view of an operation example (part two) when the given app is a forced app. If the app identifying unit 702#1 identifies the given app to be a forced app, the first scheduler 703#1 of the general master terminal discards all the data stored in the GLOBAL area. The first scheduler 703#1 of the general master terminal transfers the positional information 502 stored in the SHARED area of the portable terminal 201 to the SHARED area of the portable terminal 201-2 determined as the transfer destination of the general master terminal function.

For example, the first scheduler 703#1 of the general master terminal sequentially selects from the data stored in the SHARED area, transfer data that is to be transferred. For example, the first scheduler 703#1 of the general master terminal identifies the portable terminal 201 that is executing an app or a thread having a dependence relationship with the selected transfer data. For example, the first scheduler 703#1 of the general master terminal refers to the thread table 600 to identify which thread utilizes the transfer data. For example, the first scheduler 703#1 of the general master terminal then identifies the slave terminal in the group G1 assigned the identified thread.

For example, data a stored in the SHARED area of the portable terminal 201-1 is shared data that is shared by a thread 801-1-1 and a thread 801-1-2. In FIG. 8B, since the thread 801-1-2 is assigned to the portable terminal 201-4, the first scheduler 703#1 of the general master terminal transmits the data a to the portable terminal 201-4, whereby the data a is stored into the SHARED area of the portable terminal 201-4.

For example, data k stored in the SHARED area of the portable terminal 201-1 is shared data that is shared by a thread 801-1-1 and a thread 801-1-2. In FIG. 8B, since the thread 801-1-2 is assigned to the portable terminal 201-4, the first scheduler 703#1 of the general master terminal transmits the data k to the portable terminal 201-4, whereby the data k is stored into the SHARED area of the portable terminal 201-4.

For example, data b stored in the SHARED area of the portable terminal 201-1 is shared data shared by a thread 801-1-1 and a thread 801-1-3. In FIG. 8B, since the thread 801-1-3 is assigned to the portable terminal 201-3, the first scheduler 703#1 of the general master terminal transmits the data b to the portable terminal 201-3, whereby the data b is stored into the SHARED area of the portable terminal 201-3.

For example, the first scheduler 703#1 of the general master terminal adds the addresses of the GLOBAL area and the SHARED area to the address field related to the LOCAL area of the memory management table 400. The first scheduler 703#1 of the general master terminal empties the address field of the GLOBAL area and the address field of the SHARED area of the memory management table 400. As a result, the forced app under execution can use a greater space of the memory 307.

Reference of the description returns to FIG. 8A. The first scheduler 703#1 of the general master terminal transmits notification of transition to the general master terminal, to the portable terminal 201-2 determined as the transfer destination of the general master terminal function. For example, the first scheduler 703#1 of the general master terminal transmits to the portable terminal 201-2, notification of transition from the slave terminal function to the general master terminal function.

The first scheduler 703#1 of the general master terminal notifies the group master terminals of the transfer destination of the general master terminal function. The transitioning unit 706#1 of the general master terminal transitions from the general master terminal function to the slave terminal function. The executing unit 707#3 of the portable terminal 201-2 that has transitioned from the master terminal to the slave terminal executes the given app.

For example, the detecting unit 701#3 of the portable terminal 201-2 detects receipt of the notification of transition from the slave terminal function to the general master terminal function and the transitioning unit 705#1 of the portable terminal 201-2 transitions from the slave terminal function to the general master terminal function.

According to the first example, the forced app can be executed preferentially and the responsiveness of the forced app can be improved. According to the first example, when the forced app is executed, the data stored for executing the parallel distributed processing with other portable terminals 201 can be transferred to the other portable terminals so as to maximize the area of the memory 307 available for the forced app. As a result, the execution performance of the forced app can be improved.

Although the general master terminal is taken as an example in the first example, the group master terminal transfers the group master terminal function to another portable terminal 201 in the same way if a given app of a generated activation request is the forced app. An assigned thread may be transferred to another portable terminal in addition to the general master terminal function and the slave terminal function.

In the second example, when a given app of a generated activation request is not the forced app, if the load of the portable terminal 201 is likely to exceed remaining power, the given app is assigned to another portable terminal 201. As a result, the performance deterioration can be reduced in the given app and an app already being executed or an app waiting for execution in the portable terminal 201.

Figure 9:
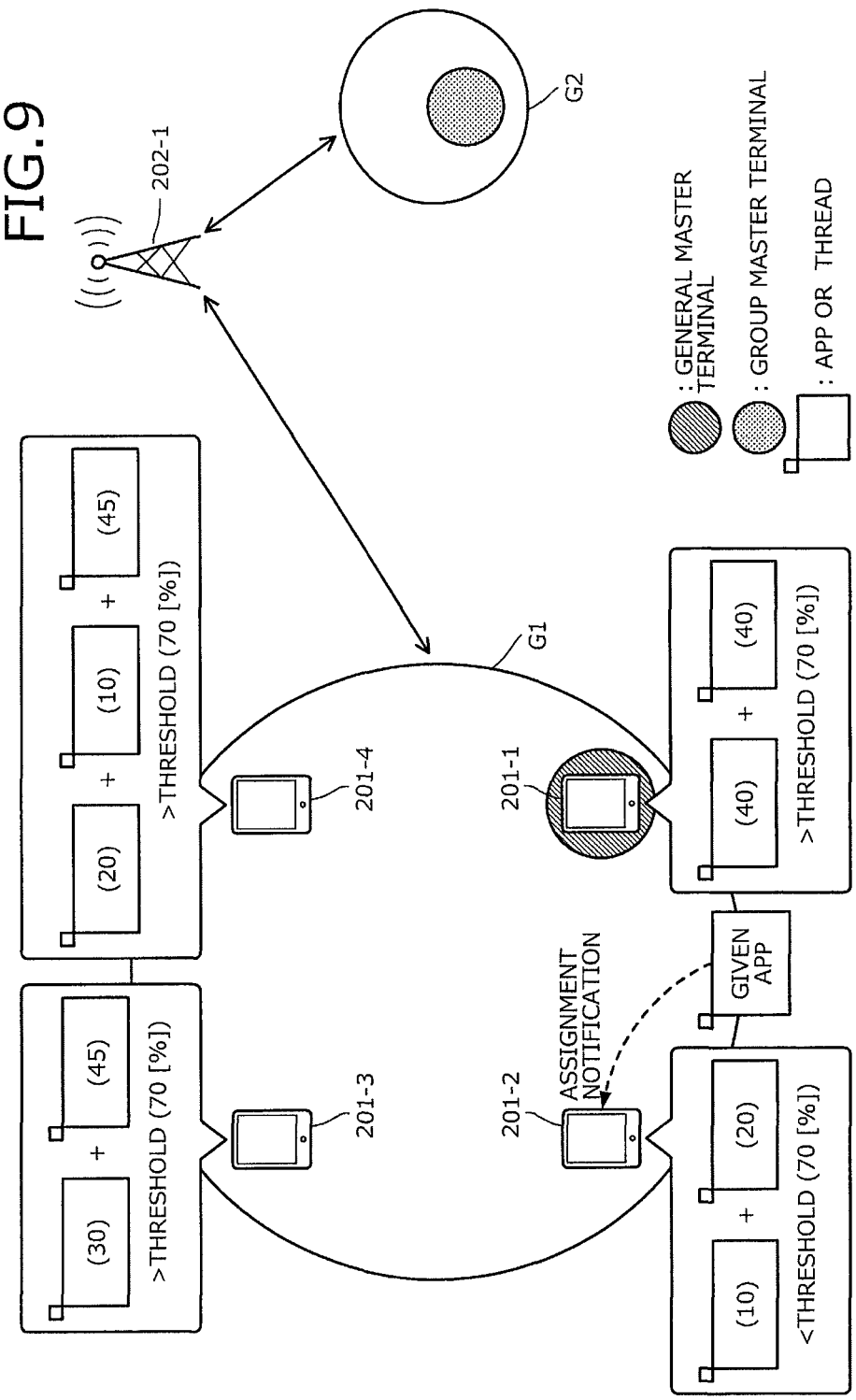
FIG. 9 is an explanatory view of an operation example when the given app is not a forced app.

FIG. 9 is an explanatory view of an operation example when the given app is not a forced app. If the app identifying unit 702#1 identifies the given app to not be a forced app, the second scheduler 704#1 of the general master terminal registers the given app into the run queue 332. For example, the load amount analyzing unit 705#1 of the general master terminal calculates a total load of the apps and threads assigned to the portable terminal 201.

For example, the second scheduler 704#1 of the general master terminal determines whether the total value of the load amounts calculated by the load amount analyzing unit 705#1 is less than a threshold value. In the example depicted in FIG. 9, a load amount is indicated in parentheses ( ) for each of the apps or threads. The second scheduler 704#1 of the general master terminal determines that a total value of the load amounts (40[%]+40[%]=80[%]) is greater than the threshold value (e.g., 70[%]). In the example depicted in FIG. 9, the threshold value is a fixed value determined by a designer of the scheduling system 200; however, the threshold value may be a value acquired by subtracting the load amount of the given app from 100[%].

If it is determined that the total value of the load amounts is larger than the threshold value, the load amount analyzing unit 705#1 of the general master terminal analyzes the load amounts of the slave terminals in the group G1. The analysis of the load amounts of the slave terminals in the group by the load amount analyzing unit 705#1 of the general master terminal is the same as the process described in the first example and will not be described in detail.

The second scheduler 704#1 of the general master terminal determines whether the load amount of each of the slave terminals analyzed by the load amount analyzing unit 705#1 is less than a threshold value. For example, the threshold value may be the load amount of the object app or may be a fixed value determined by the designer of the scheduling system 200. In the example depicted in FIG. 9, the second scheduler 704#1 of the general master terminal determines that the load amount of the portable terminal 201-3 and the load amount of the portable terminal 201-4 are greater than the threshold value and that the load amount of the portable terminal 201-2 is less than the threshold value. The second scheduler 704#1 of the general master terminal assigns the given app to the portable terminal 201-2 having the load amount that is less than the threshold value.

According to the second example, deterioration of performance can be reduced at a given app for which an activation request has been issued and an app that is under execution or an app awaiting execution at the portable terminal 201.

Although the general master terminal is taken as an example in the second example, the group master terminals or the slave terminals may assign a given app to another portable terminal 201 in the same group as described above in a case where the remaining power available for execution of the given app is insufficient.

In a third example, when a given app is not a forced app, if no portable terminal 201 in the same group has remaining power to execute the given app for which an activation request has been issued, the given app is assigned to the portable terminal 201 that has remaining power and is in another group. As a result, the load between the groups can be distributed and deterioration of the performance of the given app can be reduced.

Figure 10:
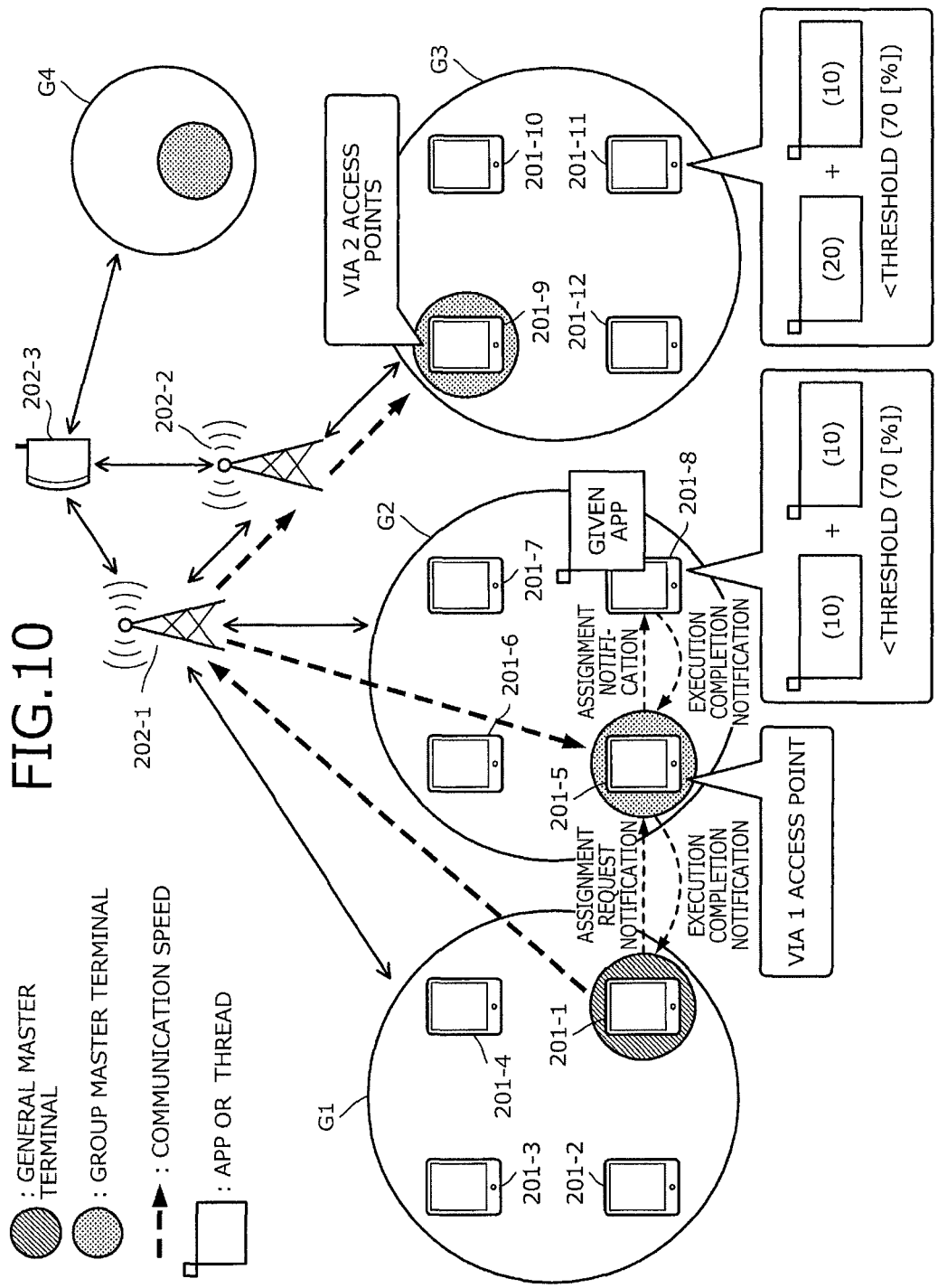
FIG. 10 is an explanatory view of an example of assigning a given app to another group.

FIG. 10 is an explanatory view of an example of assigning a given app to another group. In this case, it is assumed that the app identifying unit 702#1 of the general master terminal has identified the given app as a non-forced app and that the load amount analyzing unit 705#1 of the general master terminal has analyzed the load amounts of the slave terminals in the group.

If it is determined that no slave terminal in the group G1 has a load amount less than the threshold value, the second scheduler 704#1 of the general master terminal causes the load amount analyzing unit 705#1 to analyze load statuses of other groups. For example, the load amount analyzing unit 705#1 of the general master terminal transmits load status notification to the group master terminals of the groups.

For example, the detecting unit 701#2 of each of the group master terminals detects receipt of the load status notification. For example, the load amount analyzing unit 705#2 of each of the group master terminals analyzes the load amounts of the slave terminals in the group. The analysis of the load amounts of the slave terminals in the group is the same as the process of the general master terminal described in the first example and will not be described in detail.

For example, the load amount analyzing unit 705#2 of each of the group master terminals determines whether a slave terminal having a load amount that is less than the threshold value is present. For example, the load amount analyzing unit 705#2 of each of the group master terminals transmits to the general master terminal, a determination result as the load status.

For example, the detecting unit 701#1 of the general master terminal detects receipt of the load statuses from the group master terminals. It is assumed that the detecting unit 701#1 of the general master terminal receives the load statuses from the group master terminals and also acquires communication speeds between the portable terminal 201-1 and the group master terminals. For example, the number of access points 202 through which the load status notification is transmitted from the portable terminal 201-1 to each of the group terminals is used as a measure of the communication speed. In the example depicted in FIG. 10, the load status notification from the portable terminal 201-1 to the portable terminal 201-5 is transmitted through the one access point 202, and the load status notification from the portable terminal 201-1 to the portable terminal 201-9 is transmitted through the two access points 202. For example, the general master terminal may measure a reception time of the load status from each of the group master terminals, since the transmission time of the load status notification.

The second scheduler 704#1 of the general master terminal identifies a group that includes a portable terminal 201 having a load amount that is less than the threshold value, based on the load statuses of the groups analyzed by the load amount analyzing unit 705#1. In the example depicted in FIG. 10, the second scheduler 704#1 of the general master terminal identifies the group G2 and the group G3 as a group that includes a portable terminal 201 having a load amount that is less than the threshold value. For example, the second scheduler 704#1 of the general master terminal transmits assignment request notification for the given app to the group master terminal of the group having the fastest communication speed among the identified groups.

The detecting unit 701#2 of the group master terminal detects receipt of the assignment request notification for the given app. The first scheduler 703#2 of the group master terminal uses the load amount analyzing unit 705#2 to analyze whether the load amounts of the slave terminals are less than the threshold value. The first scheduler 703#2 of the group master terminal assigns the given app to the slave terminal analyzed, by the load amount analyzing unit 705#2, to have a load amount that is less than the threshold value. In this example, the first scheduler 703#2 of the group master terminal transmits assignment notification for the given app to the portable terminal 201-8. As a result, the given app can be assigned to the portable terminal 201 having remaining power available for execution of the given app and the deterioration of performance of the given app can be reduced.

For example, when the detecting unit 701#3 of the portable terminal 201-8 detects the assignment of the given app, the executing unit 706#3 of the portable terminal 201-8 executes the given app. For example, upon detecting completion of the given app, the detecting unit 701#3 of the portable terminal 201-8 transmits to the group master terminal, execution completion notification having an execution result of the given app. For example, the detecting unit 701#2 of the group master terminal detects receipt of the execution completion notification for the given app. The detecting unit 701#2 of the group master terminal determines whether a request source portable terminal that requested execution of the completed app is a portable terminal 201 in the group to which the group master terminal belongs. In the example depicted in FIG. 10, the detecting unit 701#2 of the group master terminal determines that the request source portable terminal is not a portable terminal 201 in the group to which the group master terminal belongs, and transmits execution completion notification to the general master terminal.

The detecting unit 701#1 of the general master terminal detects receipt of the execution completion notification and determines whether the request source portable terminal that request execution of the completed app is a portable terminal 201 in the group G1 to which the general master terminal belongs. In the example depicted in FIG. 10, the detecting unit 701#1 of the general master terminal determines that the request source portable terminal is a portable terminal 201 in the group G1 to which the general master terminal 201 belongs. For example, the detecting unit 701#1 of the general master terminal then determines whether the request source portable terminal is the general master terminal. In the example depicted in FIG. 10, the detecting unit 701#1 of the general master terminal determines that the request source portable terminal of the given app is the general master terminal 201, and stores the execution result that is included in the execution completion notification into a storage device such as the memory 307 or the storage 309.

Figure 11:
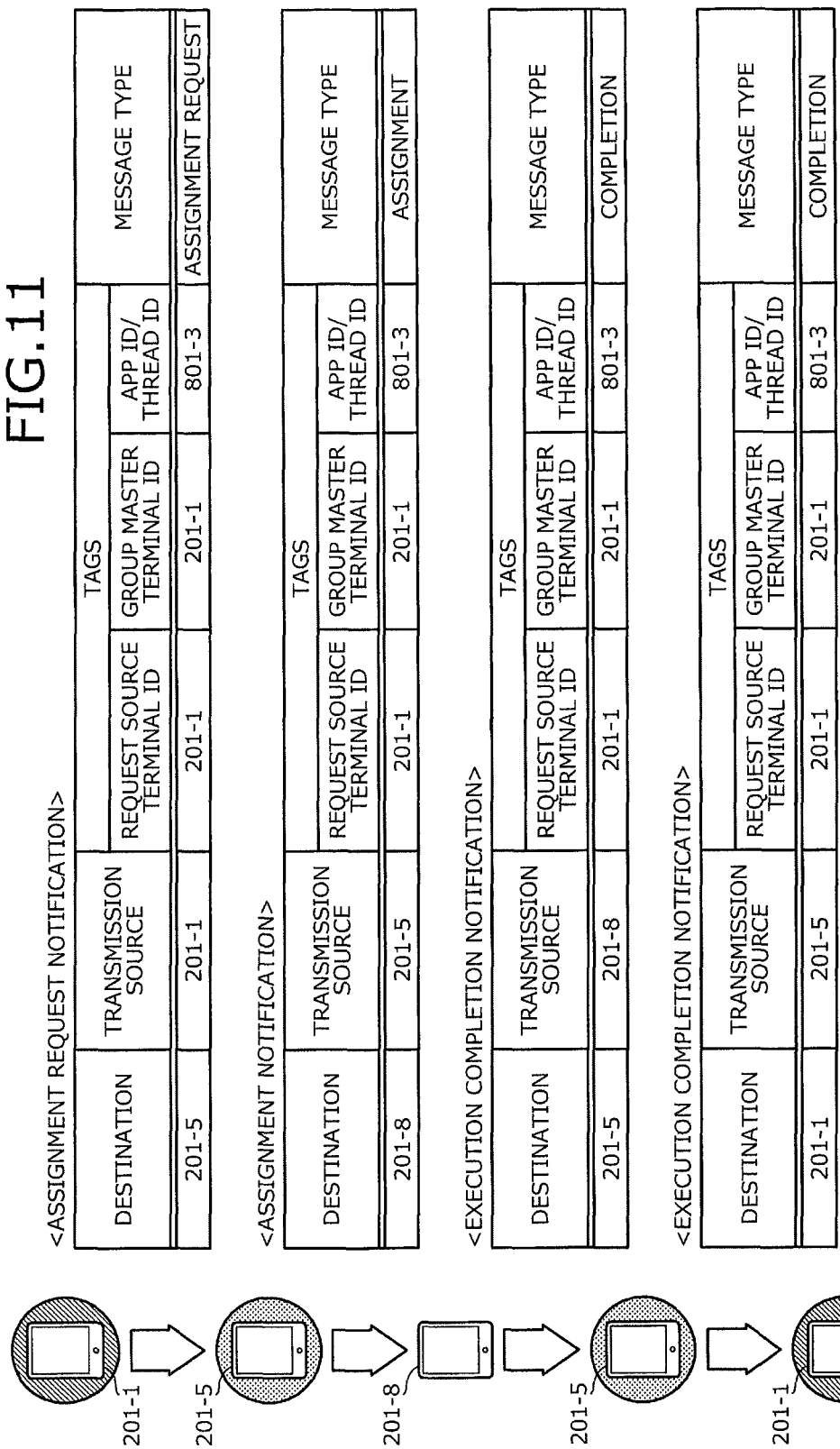
FIG. 11 is an explanatory view of an example of data structures of notifications depicted in FIG. 10.

FIG. 11 is an explanatory view of an example of data structures of the notifications depicted in FIG. 10. A header of the notifications retains an address of a transmission source and an address of a destination. In the example depicted in FIG. 11, code assigned to each of the portable terminals 201 is described as a substitute for an address. For tags of the notifications, a request source terminal ID, a group master terminal ID of the request source, and app ID/thread ID of an assigned app/thread are retained. Payloads of the notifications store the message type.

Even when the header and the payload are changed, each of the portable terminals 201 that receives the notification creates notification without changing the values of the tags. As a result, regardless of which portable terminal 201 of the scheduling system 200 executes the given app, the execution result is delivered through the general master terminal and the group master terminal to the request source portable terminal.

For example, the message type of the assignment request notification transmitted from the portable terminal 201-1 to the portable terminal 201-5 is "assignment request". For example, the message type of the assignment notification transmitted from the portable terminal 201-5 to the portable terminal 201-8 is "assignment". For example, the message type of the execution completion notification transmitted from the portable terminal 201-8 to the portable terminal 201-5 is "completion". For example, the message type of the execution completion notification transmitted from the portable terminal 201-5 to the portable terminal 201-1 is "completion".

Although not depicted, the payload of the execution completion notification, for example, retains an execution result. For example, the payload of the assignment request notification or the payload for assignment notification, for example, may retain an instruction code of the app or thread that is to be assigned.

According to the third example, if the portable terminals 201 in the same group have no remaining power, the given app can be assigned to a portable terminal 201 that has remaining power and is in another group, thereby distributing the load between groups and reducing deterioration of the performance of the given app.

In a fourth example, if an assignment request is made across groups, a route of the assignment request can be clarified by passing through the general master terminal and the group master terminal. As a result, for each group, by allowing the group master terminal to perform assignment for the group and not having a portable terminal 201 execute all the assignment processes alone, the portable terminal 201 can be prevented from entering an overload state due to the assignment processes.

Figure 12:
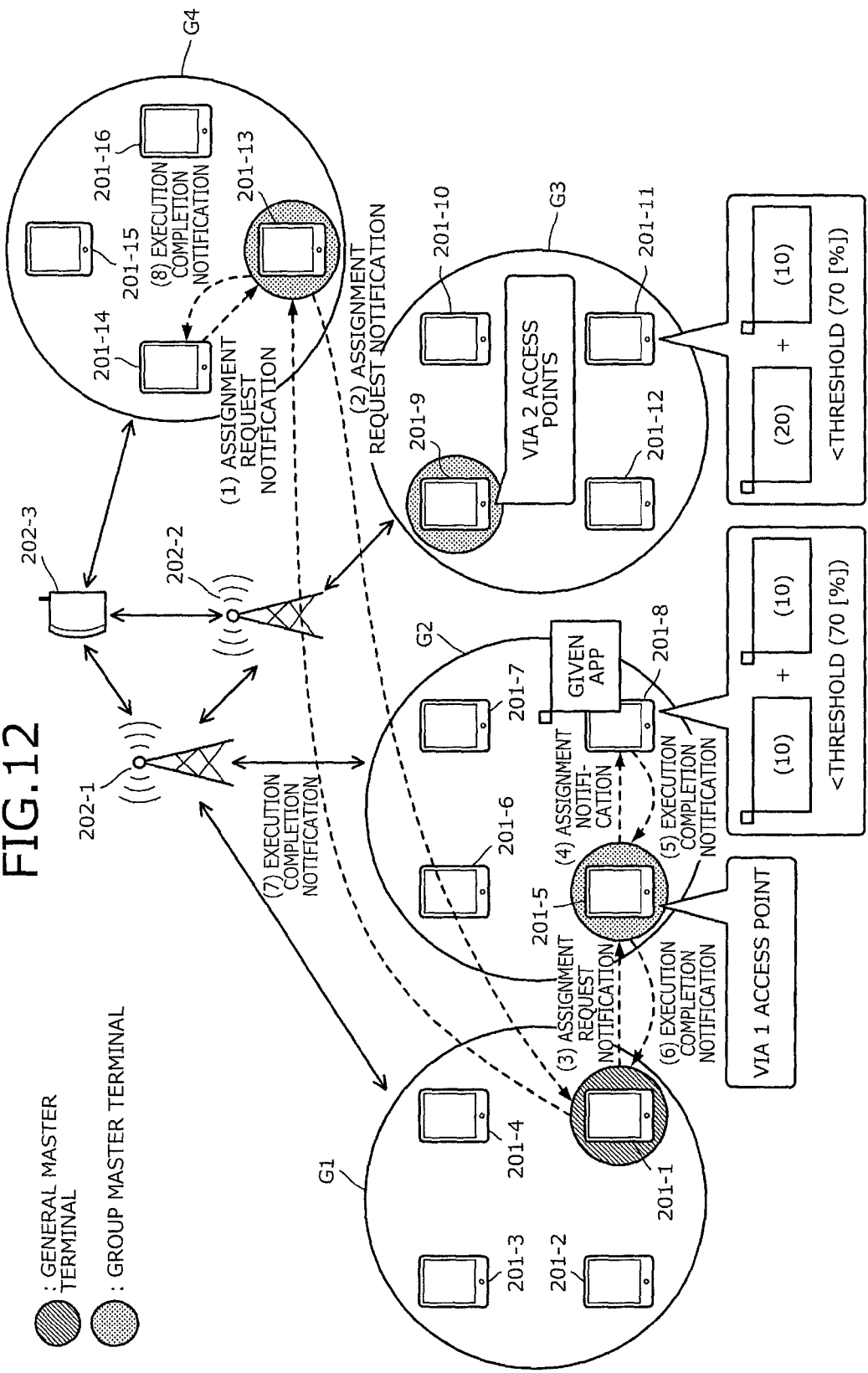
FIG. 12 is an explanatory view of an example of a case where assignment request notification is transmitted from another group.

FIG. 12 is an explanatory view of an example of a case where assignment request notification is transmitted from another group. In the example depicted in FIG. 12, the portable terminal 201-14 transmits the assignment request notification for a given app to the group master terminal to which the portable terminal 201-14 belongs (1). Upon determining that no slave terminal in the group has remaining power available to execute the given app, the portable terminal 201-13 acting as the group master terminal transmits the assignment request notification to the portable terminal 201-1 acting as the general master terminal (2).

For example, the detecting unit 701#1 of the general master terminal detects receipt of the assignment request notification from the group master terminal. The first scheduler 703#1 of the general master terminal causes the load amount analyzing unit 705#1 to analyze the load statuses of the groups. The analysis of the load statuses of the groups by the load amount analyzing unit 705#1 of the general master terminal is the same as the process described in the third example and will not be described in detail. In the example depicted in FIG. 12, based on the analysis result from the load amount analyzing unit 705#1, the first scheduler 703#1 of the general master terminal transmits the assignment request notification to the portable terminal 201-5 acting as the group master terminal of the group (3).

The portable terminal 201-5 acting as the group master terminal receives the assignment request notification and analyzes the load amounts of the slave terminals in the group. In the example depicted in FIG. 12, the portable terminal 201-5 acting as the group master terminal transmits the assignment notification to the portable terminal 201-8 (4).

For example, the portable terminal 201-8 receives the assignment notification for the given app and executes the given app. When detecting the completion of the execution of the given app, the portable terminal 201-8 transmits the execution completion notification for the given app to the portable terminal 201-5 acting as the group master terminal (5).

Upon receiving the execution completion notification for the given app, based on the tags included in the execution completion notification, the portable terminal 201-5 acting as the group master terminal transmits the execution completion notification for the given app to the portable terminal 201-1 acting as the general master terminal (6).

Upon receiving the execution completion notification for the given app and based on the tags included in the execution completion notification, the portable terminal 201-1 acting as the general master terminal transmits the execution completion notification for the given app to the portable terminal 201-13 acting as the group master terminal (7).

Upon receiving the execution completion notification for the given app from the general master terminal and based on the tags included in the execution completion notification, the portable terminal 201-13 acting as the group master terminal transmits the execution completion notification for the given app to the portable terminal 201-14 that is the request source portable terminal (8).

Upon detecting receipt of the execution completion notification from the group master terminal, the portable terminal 201-14, i.e., the request source portable terminal, stores the execution result into a storage device such as the memory 307 and the storage 309.

According to the fourth example, when an assignment request is made across groups, a route of the assignment request can be clarified by passing through the general master terminal and the group master terminal. As a result, for each group, by allowing the group master terminal to perform assignment for the group without having a portable terminal 201 execute all the assignment processes alone, the portable terminal 201 can be prevented from entering an overload state due to the assignment processes. The execution performance of an app can be prevented from deteriorating due to the time consumed for assignment. By preventing communication from concentrating at one portable terminal alone, deterioration of performance due to communication latency can be reduced.

When the apparatuses are the portable terminals 201 as in the scheduling system 200 described in this embodiment, the communication environment of the portable terminals 201 may deteriorate because of the reduced remaining battery amount due to battery consumption in the portable terminals 201, or due to changes in the positions of the portable terminals 201 consequent to movement. In a fifth example, the remaining battery amount and the communication signal strength of the general master terminal are regularly monitored and if either the remaining battery amount or the communication signal strength falls below a threshold value, the general master terminal function is transferred to another portable terminal 201. As a result, a portable terminal 201 in favorable communication environment and without battery exhaustion can be allowed to perform the general master terminal function and the interruption of overall control of the scheduling system 200 can be prevented. In the fifth example, each time a timer interrupt is detected, the remaining battery amount and the communication signal strength are monitored.

Figure 13:
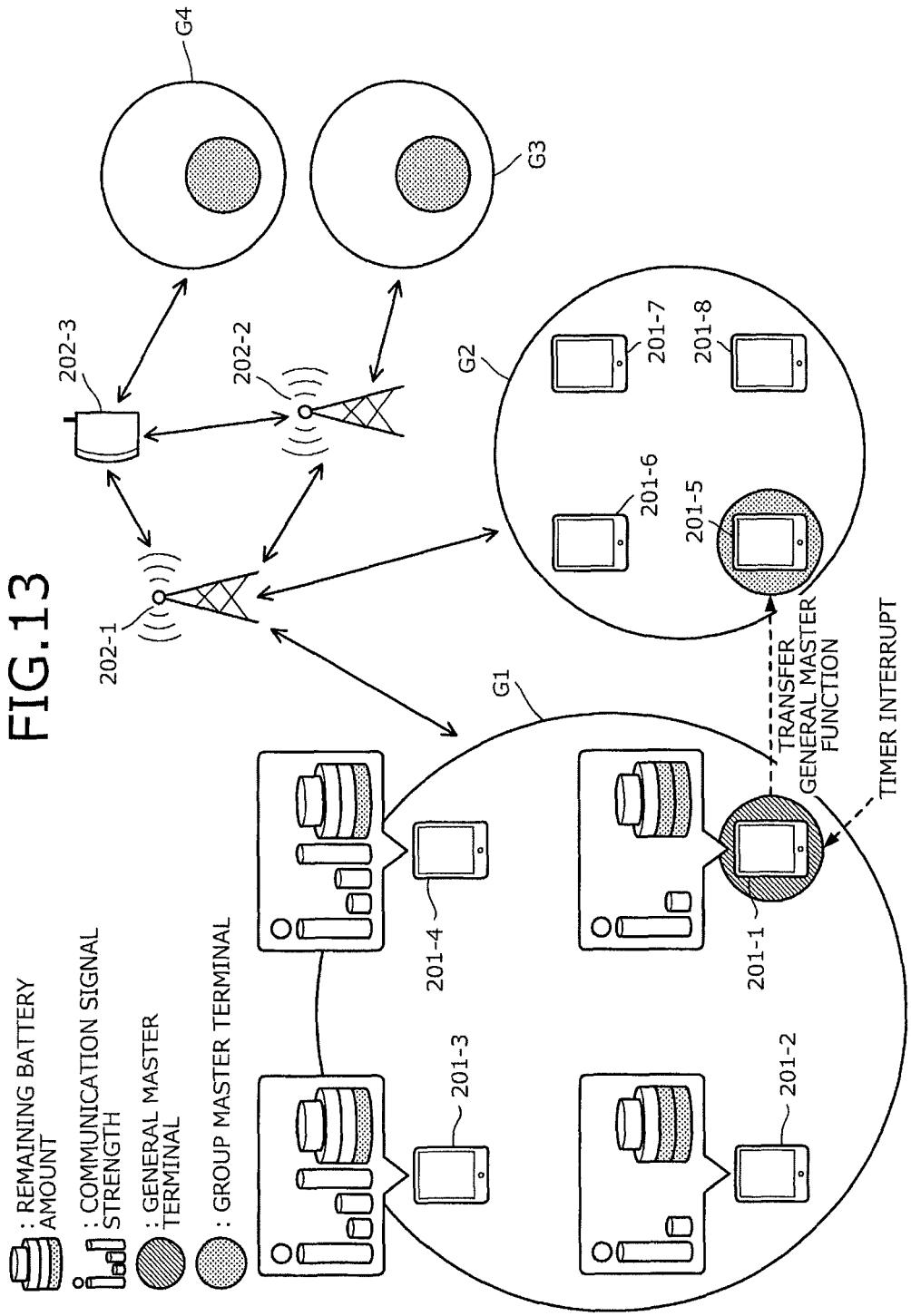
FIG. 13 is an explanatory view of an operation example of a general master terminal when a timer interrupt is detected.

FIG. 13 is an explanatory view of an operation example of the general master terminal when a timer interrupt is detected. First, the detecting unit 701#1 of the general master terminal detects a timer interrupt. When the detecting unit 701#1 detects the timer interrupt, the determining unit 708#1 of the general master terminal determines if the remaining battery amount of the general master terminal is greater than or equal to a threshold value. The determining unit 708#1 of the general master terminal determines if the communication signal strength between the general master terminal and the access point 202-1 is greater than or equal to a threshold value.

If the determining unit 708#1 determines that the remaining battery amount is less than the threshold value, the first scheduler 703#1 of the general master terminal selects a portable terminal 201 to be the transfer destination of the general master terminal function of the portable terminal 201. If the determining unit 708#1 determines that the communication signal strength is less than the threshold value, the first scheduler 703#1 of the general master terminal selects a portable terminal 201 to be the transfer destination of the general master terminal function of the portable terminal 201. The first scheduler 703#1 of the general master terminal transfers the general master terminal function to the determined transfer destination.

For example, the determining unit 708#1 of the general master terminal can acquire the remaining battery amounts of the portable terminals through an API of the OS 321. In the example depicted in FIG. 13, the remaining amounts of the portable terminals 201 are classified into three stages. In this case, for example, it is assumed that the remaining battery amount in a first stage on the lower side is determined as a remaining battery amount that is less than the threshold value, while a remaining battery amount in the two upper stages is determined as a remaining battery amount that is greater than or equal to the threshold value. In the example depicted in FIG. 13, the determining unit 708#1 of the general master terminal determines that the remaining battery amount of the portable terminal 201 is greater than or equal to the threshold value.

If it is determined that the remaining battery amount of general master terminal is greater than or equal to the threshold value, the determining unit 708#1 of the general master terminal determines if the communication signal strength between the general master terminal and the access point 202 is greater than or equal to the threshold value. For example, the determining unit 708#1 of the general master terminal can acquire the communication signal strength through the API of the OS 321.

In the example depicted in FIG. 13, the communication signal strength is classified into three stages. In this case, for example, it is assumed that the determining unit 708#1 of the general master terminal determines that the communication signal strength is less than the threshold value if the communication signal strength is in a first stage on the lower side, and determines that the communication signal strength is greater than or equal to the threshold value if the communication signal strength is in the two upper stages. In the example depicted in FIG. 13, the determining unit 708#1 of the general master terminal determines that the communication signal strength of the portable terminal 201 is less than the threshold value.

For example, when the determining unit 708#1 determines that the communication signal strength of the general master terminal is less than the threshold value, the first scheduler 703#1 of the general master terminal transmits remaining battery amount check notification to the slave terminals of the group G1 to which the general master terminal belongs. As a result, the first scheduler 703#1 of the general master terminal acquires the remaining battery amounts of the slave terminals of the group G1.

For example, the first scheduler 703#1 of the general master terminal determines if the remaining battery amounts of the slave terminals are greater than or equal to the threshold value. In the example depicted in FIG. 13, the first scheduler 703#1 of the general master terminal determines that the remaining battery amount of the portable terminal 201-3 and the remaining battery amount of the portable terminal 201-4 are less than the threshold value and determines that the remaining battery amount of the portable terminal 201-2 is greater than or equal to the threshold value.

For example, the first scheduler 703#1 of the general master terminal transmits check notification for the communication signal strength between the portable terminals 201 and the access point 202. As a result, the first scheduler 703#1 of the general master terminal acquires the communication signal strength of the slave terminals in the group G1.

For example, the first scheduler 703#1 of the general master terminal determines if the communication signal strength between the portable terminals 201 and the access point 202 is greater than or equal to the threshold value. In the example depicted in FIG. 13, the first scheduler 703#1 of the general master terminal determines that the communication signal strength between the portable terminals 201-2, 201-3, 201-4 and the access point 202-1 is not greater than or equal to the threshold value. Therefore, the first scheduler 703#1 of the general master terminal determines that the general master terminal function cannot be transferred to the slave terminals of the group G1.

For example, the first scheduler 703#1 of the general master terminal transmits a response request to the group master terminals of groups other than the group G1 to which the general master terminal belongs and detects the group master terminal that gives the fastest response. In the example depicted in FIG. 13, it is assumed that the portable terminal 201-5 is the group master terminal that gives the fastest response. For example, the first scheduler 703#1 of the general master terminal transfers the general master terminal function to the detected group master terminal.

Figure 14:
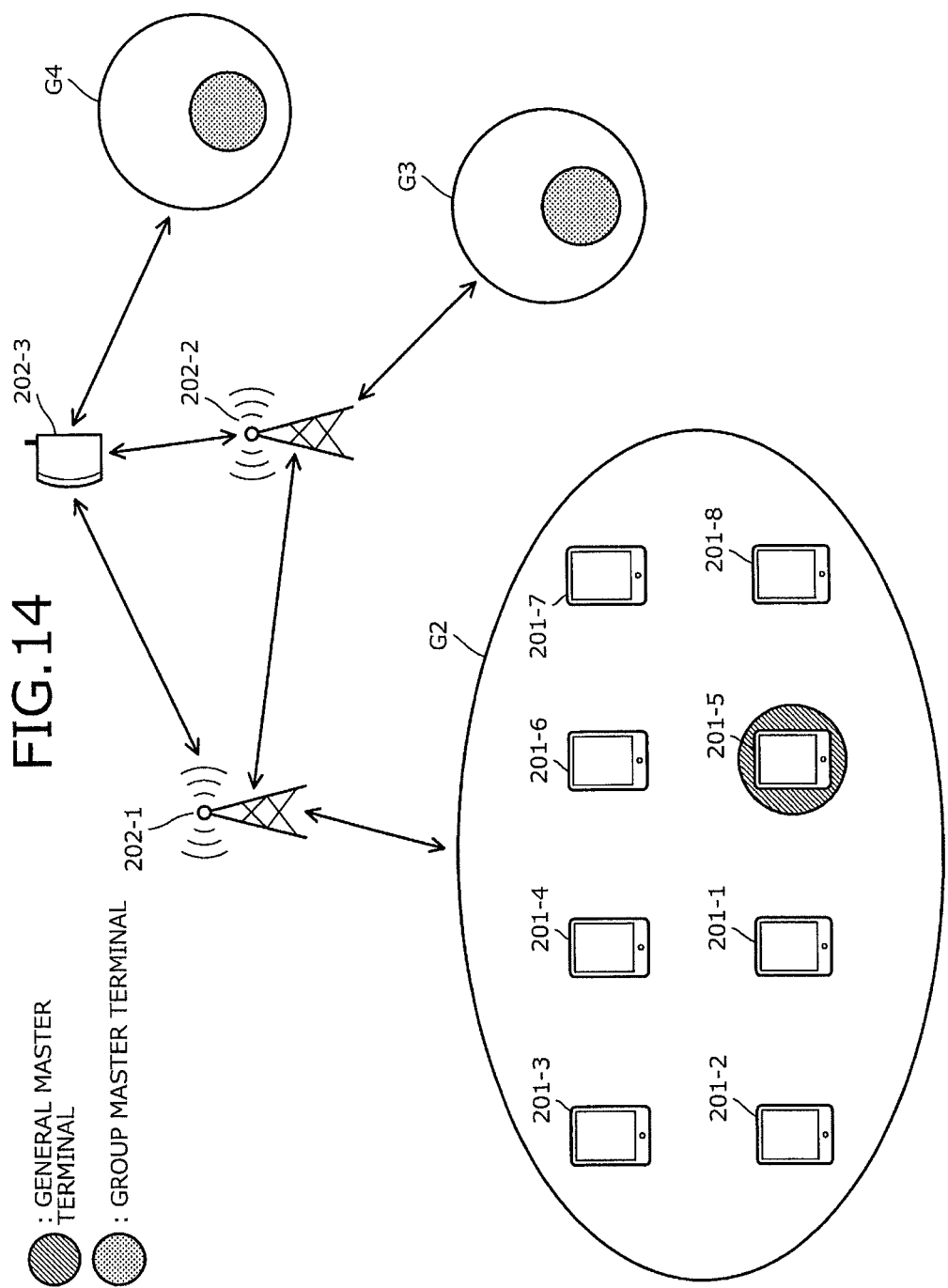
FIG. 14 is an explanatory view of groups after a transfer.

FIG. 14 is an explanatory view of groups after the transfer. Once the portable terminal 201-1 of the group G1 transfers the general master terminal function to the group master terminal of G2, the group master terminal function of the group G1 is consequently transferred and therefore, the group G1 and the group G2 form one group G2.

According to the fifth example, the general master terminal function can be transferred to a portable terminal 201 that is in a favorable communication environment and without battery exhaustion, and the interruption of overall control of the scheduling system 200 can be prevented.

Although the fifth example is described as an example of transferring the general master terminal function according to the remaining battery amount and the communication signal strength, the group master terminal function may also be transferred according to the remaining battery amount and the communication signal strength.

In a sixth example, the remaining battery amount and the communication signal strength are regularly monitored to exclude a slave terminal whose remaining battery amount is small or in a communication environment that is poor. As a result, the parallel distributed processing can be executed exclusively by portable terminals 201 that are in an environment in which assignment from another portable terminal 201 can be performed.

Figure 15:
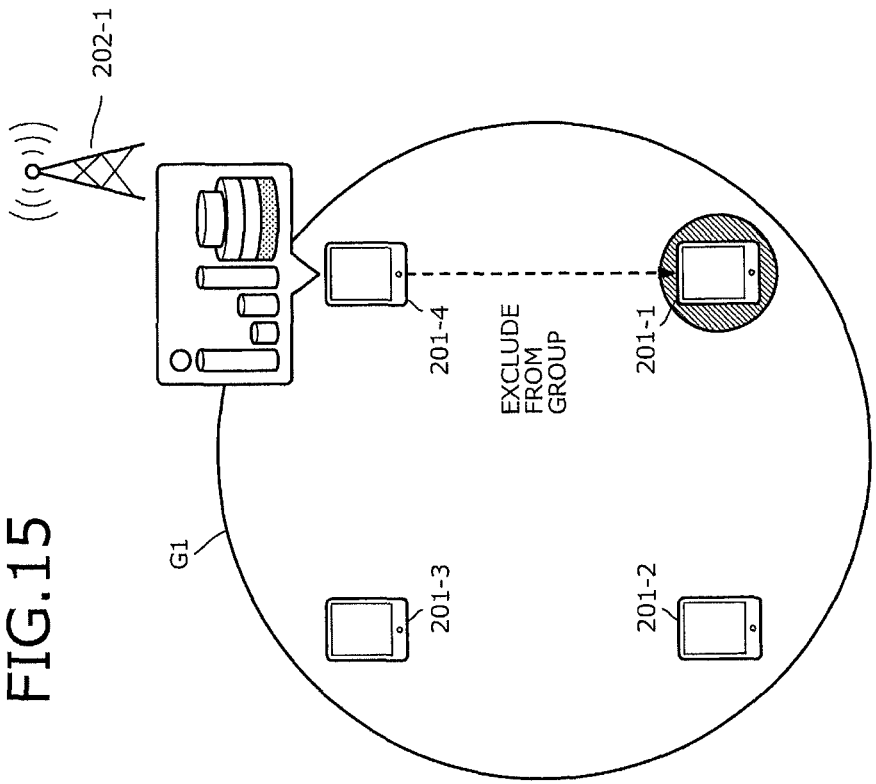
FIG. 15 is an explanatory view of an example of excluding a slave terminal from a group.

FIG. 15 is an explanatory view of an example of excluding a slave terminal from a group. The detecting unit 701#3 of the portable terminal 201-4 acting as a slave terminal of the group G1 detects a timer interrupt. For example, when the detecting unit 701#3 detects the timer interrupt, the determining unit 707#3 of the portable terminal 201-4 determines if the remaining battery amount of the portable terminal 201-4 is less than or equal to a threshold value. In the example depicted in FIG. 15, the determining unit 707#3 of the portable terminal 201-4 determines that the remaining battery amount of the portable terminal 201-4 is less than or equal to the threshold value.

If the determining unit 707#3 determines that the remaining battery amount of the portable terminal 201-4 is less than or equal to the threshold value, the scheduler 703#3 of the portable terminal 201-4 discards the GLOBAL area of the memory 307. For example, the scheduler 703#3 of the portable terminal 201-4 executes a transfer process of the SHARED area of the memory 307. The transfer process is the same process as the process described with reference to FIG. 8B of the first example and therefore will not be described in detail.

If the determining unit 707#3 determines that the remaining battery amount of the portable terminal 201-4 is less than or equal to the threshold value, the scheduler 703#3 of the portable terminal 201-4 transmits to the portable terminal 201-1, exclusion notification of the exclusion of the portable terminal 201-4 from the group G1. The portable terminal 201-1 is the general master terminal and is also the group master terminal of the group G1.

For example, the detecting unit 701#1 of the portable terminal 201-1 detects receipt of the exclusion notification from the portable terminal 201-4. For example, when the detecting unit 701#1 detects receipt of the exclusion notification, the updating unit 709#1 of the portable terminal 201-1 deletes the information of the portable terminal 201-4 from the positional information 502.

According to the sixth example, the parallel distributed processing can be executed exclusively by portable terminals 201 that are in an environment in which assignment from another portable terminal 201 can be performed.

When the position of a slave terminal changes, the state of communication with a portable terminal 201 of another group may become better as compared to the portable terminals 201 in the group to which the slave terminal currently belongs. Therefore, in a seventh example, the communication signal strength between a slave terminal and the group master terminals is regularly monitored to update the group to which the slave terminal belongs. As a result, a group can be made up of the portable terminals 201 in a favorable environment for communication in the ad-hoc mode and performance deterioration due to the communication environment can be reduced.

Figure 16:
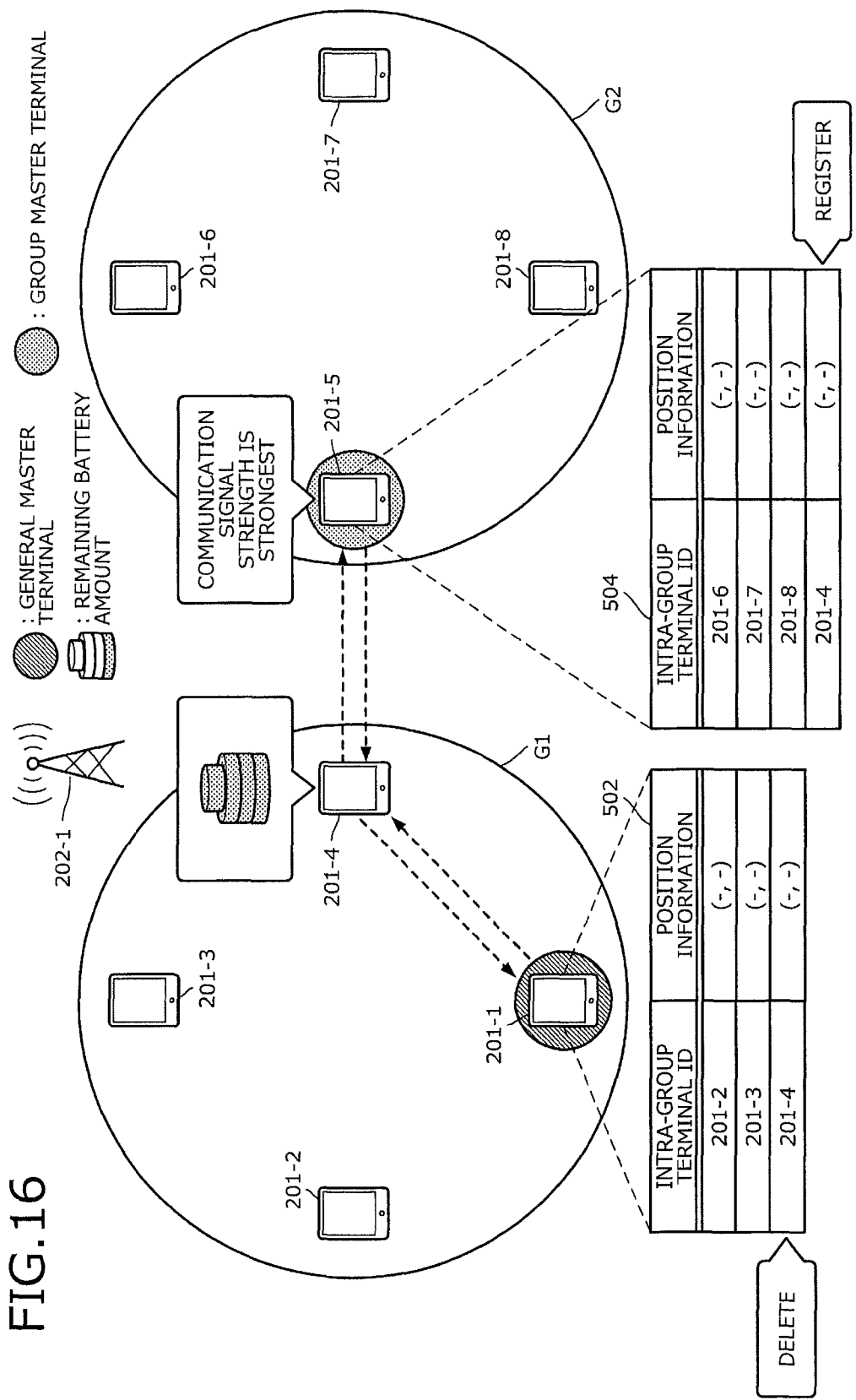
FIG. 16 is an explanatory view of an example of a slave terminal moving to another group.

FIG. 16 is an explanatory view of an example of a slave terminal moving to another group. The detecting unit 701#3 of the portable terminal 201-4 acting as the slave terminal of the group G1 detects a timer interrupt. For example, when the detecting unit 701#3 detects the timer interrupt, the determining unit 707#3 of the portable terminal 201-4 determines whether the portable terminal 201-4 belongs to a group. In this case, for example, the determining unit 707#3 of the portable terminal 201-4 determines that the portable terminal 201-4 belongs to a group. For example, the determining unit 707#3 of the portable terminal 201-4 determines if the remaining battery amount of the portable terminal 201-4 is greater than or equal to a threshold value. In the example depicted in FIG. 16, the determining unit 707#3 of the portable terminal 201-4 determines that the remaining battery amount of the portable terminal 201-4 is greater than or equal to the threshold value.

When the determining unit 707#3 determines that the remaining battery amount of the portable terminal 201-4 is greater than or equal to the threshold value, the scheduler 703#3 of the portable terminal 201-4 detects the communication signal strength of communication in the ad-hoc mode between the portable terminal 201-4 and the group master terminals. For example, the scheduler 703#3 of the portable terminal 201-4 detects the group master terminal that has the strongest communication signal strength. In the example depicted in FIG. 16, the detecting unit 701#3 of the portable terminal 201-4 detects the portable terminal 201-5.

The scheduler 703#3 of the portable terminal 201-4 determines if the communication signal strength between the detected group master terminal and the portable terminal 201-4 is greater than or equal to a threshold value. In this example, for example, it is assumed that the scheduler 703#3 of the portable terminal 201-4 determines that the communication signal strength between the detected group master terminal and the portable terminal 201-4 is greater than or equal to the threshold value. For example, the scheduler 703#3 of the portable terminal 201-4 determines whether the group that includes the detected group master terminal is the same as the group to which the portable terminal 201-4 belongs. In the example depicted in FIG. 16, the scheduler 703#3 of the portable terminal 201-4 determines that the group that includes the detected group master terminal is not the same as the group to which the portable terminal 201-4 belongs.

For example, the scheduler 703#3 of the portable terminal 201-4 transmits group exclusion notification to the portable terminal 201-1, which is the group master terminal to which the portable terminal 201-4 belongs. For example, the detecting unit 701#1 of the portable terminal 201-1 detects receipt of the exclusion notification. For example, the updating unit 709#1 of the portable terminal 201-1 deletes the information of the portable terminal 201-4 from the positional information 502.

For example, the scheduler 703#3 of the portable terminal 201-4 transmits to the portable terminal 201-5, which is the detected group master terminal, notification of registration to the group G2. For example, the detecting unit 701#2 of the portable terminal 201-5 detects receipt of the notification of registration. For example, the updating unit 709#2 of the portable terminal 201-5 registers information of the portable terminal 201-4 to the positional information 504.

According to the seventh example, communication signal strength between a slave terminal and the group master terminals is regularly monitored to change the group to which each slave terminal belongs. As a result, a group can be made up of portable terminals 201 that are in a favorable environment for communication in the ad-hoc mode and performance deterioration consequent to communication environment can be reduced.

Even when a portable terminal 201 is excluded from a group due to the remaining battery amount or the communication environment, the communication environment may be improved by an increase in the remaining battery amount consequent to charging of the battery of the portable terminal 201 or a change in the position of the portable terminal 201. Therefore, in an eighth example, even when a portable terminal does not belong to a group, the remaining battery amount and the communication environment are regularly monitored to determine whether the portable terminal can belong to a group. As a result, parallel distributed processing of the scheduling system 200 can be executed by portable terminals 201 that have favorable remaining battery amounts and are in a favorable communication environment.

Figure 17:
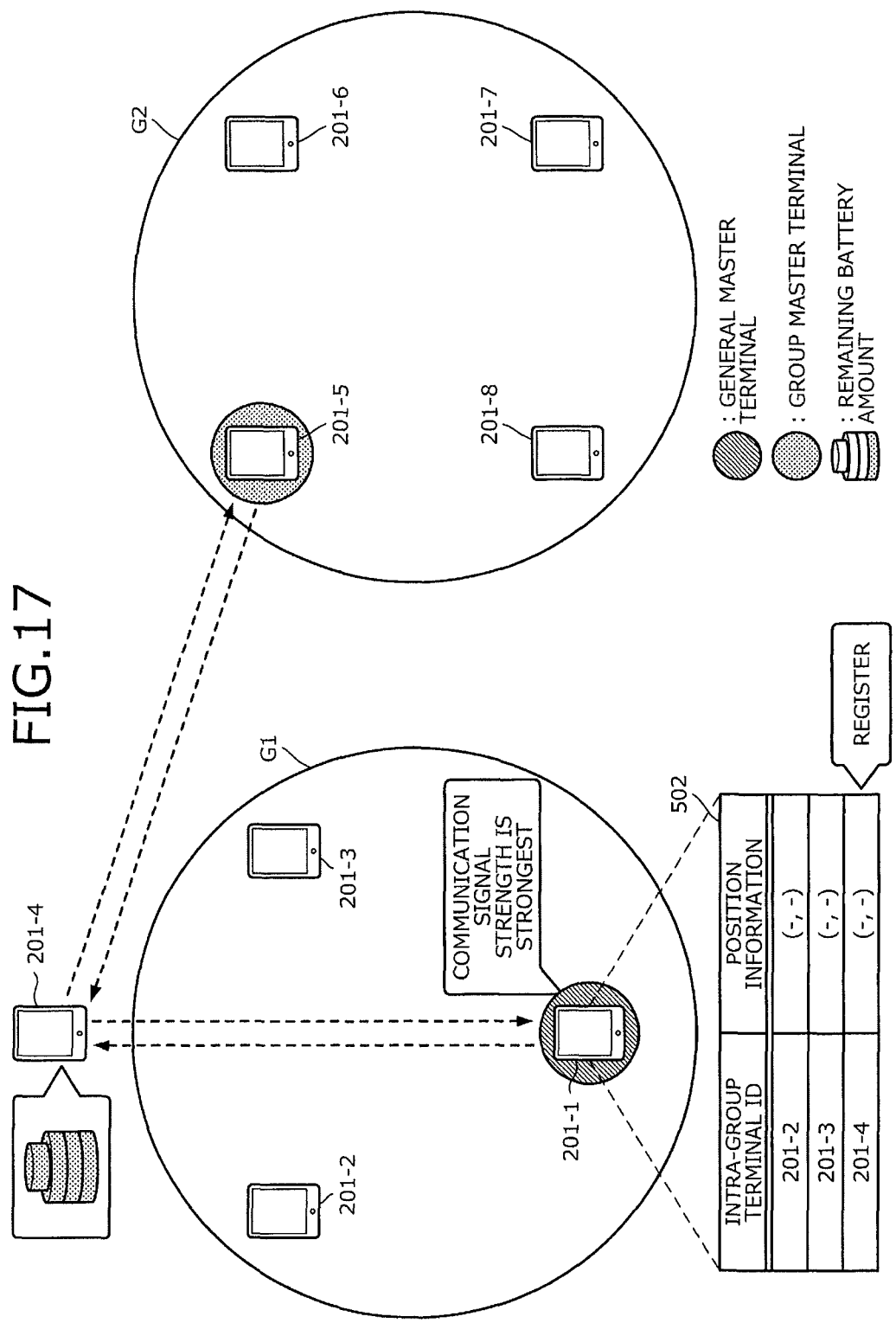
FIG. 17 is an explanatory view of a group registration example of a slave terminal.

FIG. 17 is an explanatory view of a group registration example of a slave terminal. The detecting unit 701#3 of the portable terminal 201-4 acting as a slave terminal detects a timer interrupt. For example, when the detecting unit 701#3 detects the timer interrupt, the determining unit 707#3 of the portable terminal 201-4 determines whether the portable terminal 201-4 belongs to a group. In this example, the determining unit 707#3 of the portable terminal 201-4 determines that the portable terminal 201-4 does not belong to a group. For example, the determining unit 707#3 of the portable terminal 201-4 determines if the remaining battery amount of the portable terminal 201-4 is greater than or equal to a threshold value. In the example depicted in FIG. 17, the determining unit 707#3 of the portable terminal 201-4 determines that the remaining battery amount of the portable terminal 201-4 is greater than or equal to the threshold value.

When the determining unit 707#3 determines that the remaining battery amount of the portable terminal 201-4 is greater than or equal to the threshold value, the scheduler 703#3 of the portable terminal 201-4 detects the communication signal strength of communication in the ad-hoc mode between the portable terminal 201-4 and the group master terminals. For example, the scheduler 703#3 of the portable terminal 201-4 can communicate with each of the portable terminals 201 communicable in the ad-hoc mode for a certain period, thereby searching the group master terminals and detecting the communication signal strength. For example, the scheduler 703#3 of the portable terminal 201-4 detects the group master terminal that has the greatest communication signal strength. In the example depicted in FIG. 17, the scheduler 703#3 of the portable terminal 201-4 detects the portable terminal 201-1 as the group master terminal that has the greatest communication signal strength.

The scheduler 703#3 of the portable terminal 201-4 determines if the communication signal strength between the detected group master terminal and the portable terminal 201-4 is greater than or equal to a threshold value. In this example, it is assumed that the scheduler 703#3 of the portable terminal 201-4 determines that the communication signal strength between the detected group master terminal and the portable terminal 201-4 is greater than or equal to the threshold value.

For example, the scheduler 703#3 of the portable terminal 201-4 transmits group registration notification to the detected group master terminal. For example, the detecting unit 701#1 of the detected portable terminal 201-1 detects receipt of the registration notification. The updating unit 709#2 of the portable terminal 201-1 registers information of the portable terminal 201-4 into the positional information 502 and thereby, registers the portable terminal 201-4 into the group G1.

According to the eighth example, parallel distributed processing of the scheduling system 200 can be executed by portable terminals 201 that have favorable remaining battery amounts and are in favorable communication environment.

FIGS. 18, 19, 20, 21, 22, 23, 24, and 25 are flowcharts of an example of a process procedure performed by the general master terminal. First, the general master terminal uses the detecting unit 701#1 to determine whether occurrence of an event has been detected (step S1801). If it is determined that no event has been detected (step S1801: NO), the general master terminal returns to step S1801. If it is determined that an activation request for an app has been detected (step S1801: ACTIVATION REQUEST), the general master terminal uses the app identifying unit 702#1 to identify whether the given app of the detected activation request is a forced app (step S1802).

The general master terminal determines whether the given app is a forced app (step S1803). If it is determined that the given app is a forced app (step S1803: YES), the general master terminal uses the load amount analyzing unit 705#1 to execute an intra-group load amount analyzing process (step S1804). The general master terminal uses the first scheduler 703#1 to determine, as a transfer destination of the general master terminal function, the slave terminal that has the smallest load amount (step S1805). The general master terminal uses the first scheduler 703#1 to discard data in the GLOBAL area (step S1806). The general master terminal uses the first scheduler 703#1 to execute a data transfer process (step S1807).

The general master terminal uses the first scheduler 703#1 to give to the slave terminal that is to be the transfer destination, notification of the transition to the general master terminal (step S1808). The general master terminal uses the first scheduler 703#1 to give to the group master terminals, notification of the transfer destination of the general master terminal (step S1809). The general master terminal uses the transitioning unit 706#1 to make a transition to the slave terminal, uses the executing unit 707#1 to start the execution of the given app (step S1810), and returns to step S1801.

If it is determined at step S1803 that the given app is not a forced app (step S1803: NO), the general master terminal uses the second scheduler 704#1 to determine whether real-time limitation is present (step S1811). The presence of real-time limitation means the case that a time from the start of execution to the end of execution is determined in advance or that an execution completion time is defined in advance. If it is determined that the real-time limitation is present (step S1811: YES), the general master terminal goes to step S1814.

If it is determined that the real-time limitation is not present (step S1811: NO), the general master terminal uses the load amount analyzing unit 705#1 to calculate a load amount (step S1812), and determines whether the calculated load amount>the threshold value is satisfied (step S1813). If it is determined that the calculated load amount>the threshold value is not satisfied (step S1813: NO), the general master terminal uses the second scheduler 704#1 to register the given app to the run queue 332 (step S1814) and returns to step S1801.

On the other hand, if it is determined that the calculated load amount>the threshold value is satisfied (step S1813: YES), the general master terminal uses the load amount analyzing unit 705#1 to execute the intra-group load amount analyzing process (step S1815). The general master terminal uses the second scheduler 704#1 to identify a slave terminal that is capable of executing the given app, based on the load amount at the slave terminals and the load amount of the given app (step S1816) and determines whether a slave terminal has been identified (step S1817). If it is determined that a slave terminal has been identified (step S1817: YES), the general master terminal uses the second scheduler 704#1 to transmit assignment notification for the given app to the slave terminal that has the smallest load amount among the identified slave terminals (step S1818). The general master terminal returns to step S1801.

If it is determined that no slave terminal has been identified (step S1817: NO), the general master terminal uses the load amount analyzing unit 705#1 to execute a group-based load amount analyzing process (step S1819). The general master terminal uses the second scheduler 704#1 to identify a group that includes a slave terminal that is capable of executing the given app, based on the group loads and the load amount of the given app (step S1820).

The general master terminal determines whether a group has been identified (step S1821). If it is determined that no group has been identified (step S1821: NO), the general master terminal uses the second scheduler 704#1 to register the given app to the run queue 332 (step S1822) and returns to step S1801. If it is determined that a group has been identified (step S1821: YES), the general master terminal uses the second scheduler 704#1 to transmit to the group master terminal of the group that has the fastest communication speed among the identified groups, assignment request notification for the given app (step S1823). The general master terminal returns to step S1801.

Figure 21:
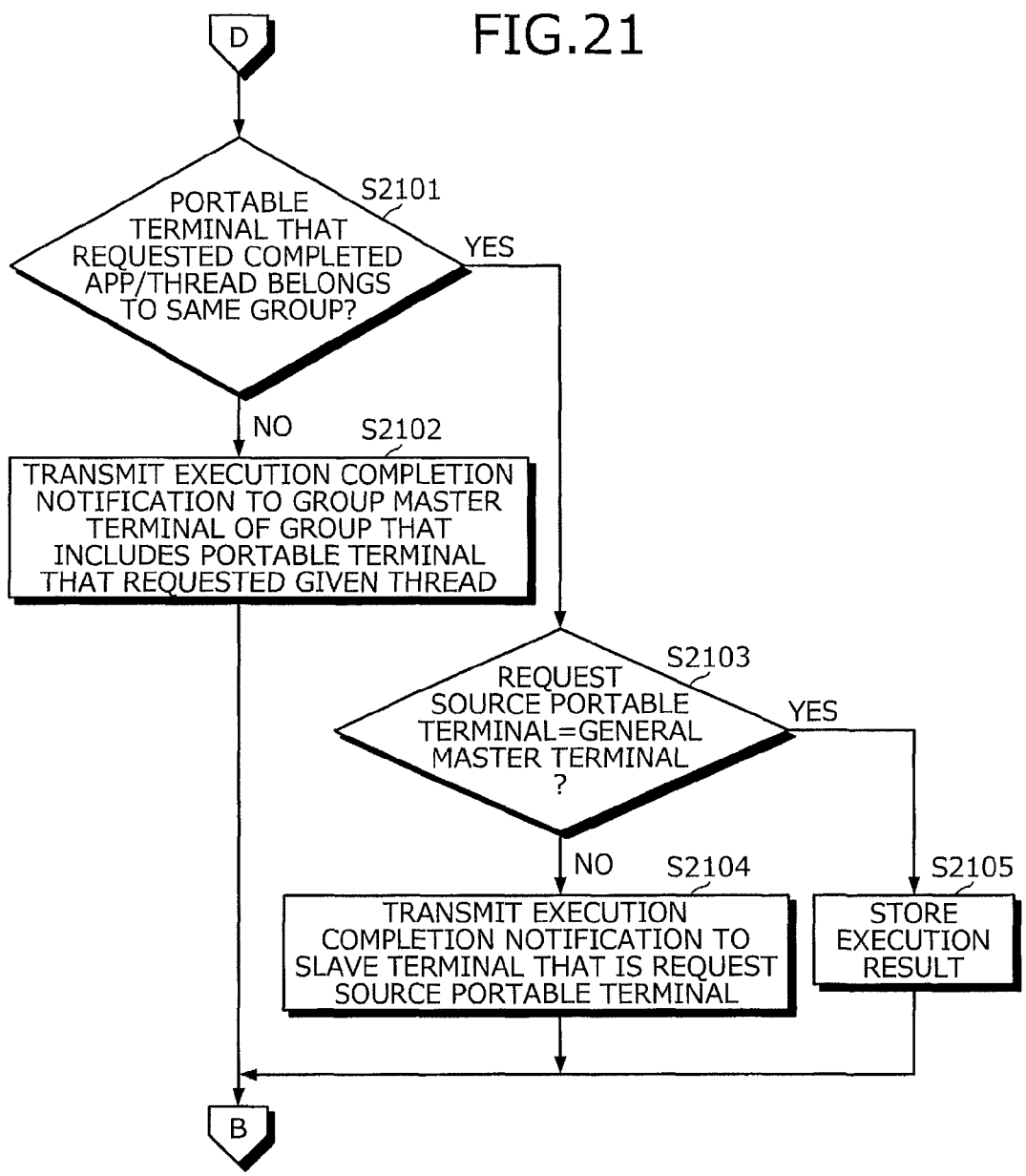

At step S1801, if the general master terminal detects, via the detecting unit 701#1, receipt of execution completion notification from a group master terminal or a slave terminal in the same group (step S1801: EXECUTION COMPLETION NOTIFICATION), the general master terminal goes to step S2101. Step S2101 is depicted in FIG. 21.

The general master terminal determines whether the request source portable terminal of the assignment request for the app or thread of the completed app/thread belongs to the same group (step S2101). If it is determined that the request source portable terminal does not belong to the same group (step S2101: NO), the general master terminal transmits the execution completion notification to the group master terminal of the group that includes the portable terminal that requested the given thread (step S2102).

If it is determined that the request source portable terminal belongs to the same group (step S2101: YES), the general master terminal determines whether the request source portable terminal is the general master terminal 201 (step S2103). If it is determined that the request source portable terminal is the general master terminal 201 (step S2103: YES), the general master terminal uses the storage unit 710#1 to store the execution result (step S2105) and returns to step S2101.

If it is determined that the request source portable terminal is not the general master terminal 201 (step S2103: NO), the general master terminal transmits execution completion notification to the slave terminal that is the request source portable terminal (step S2104) and returns to step S2101.

Figure 22:
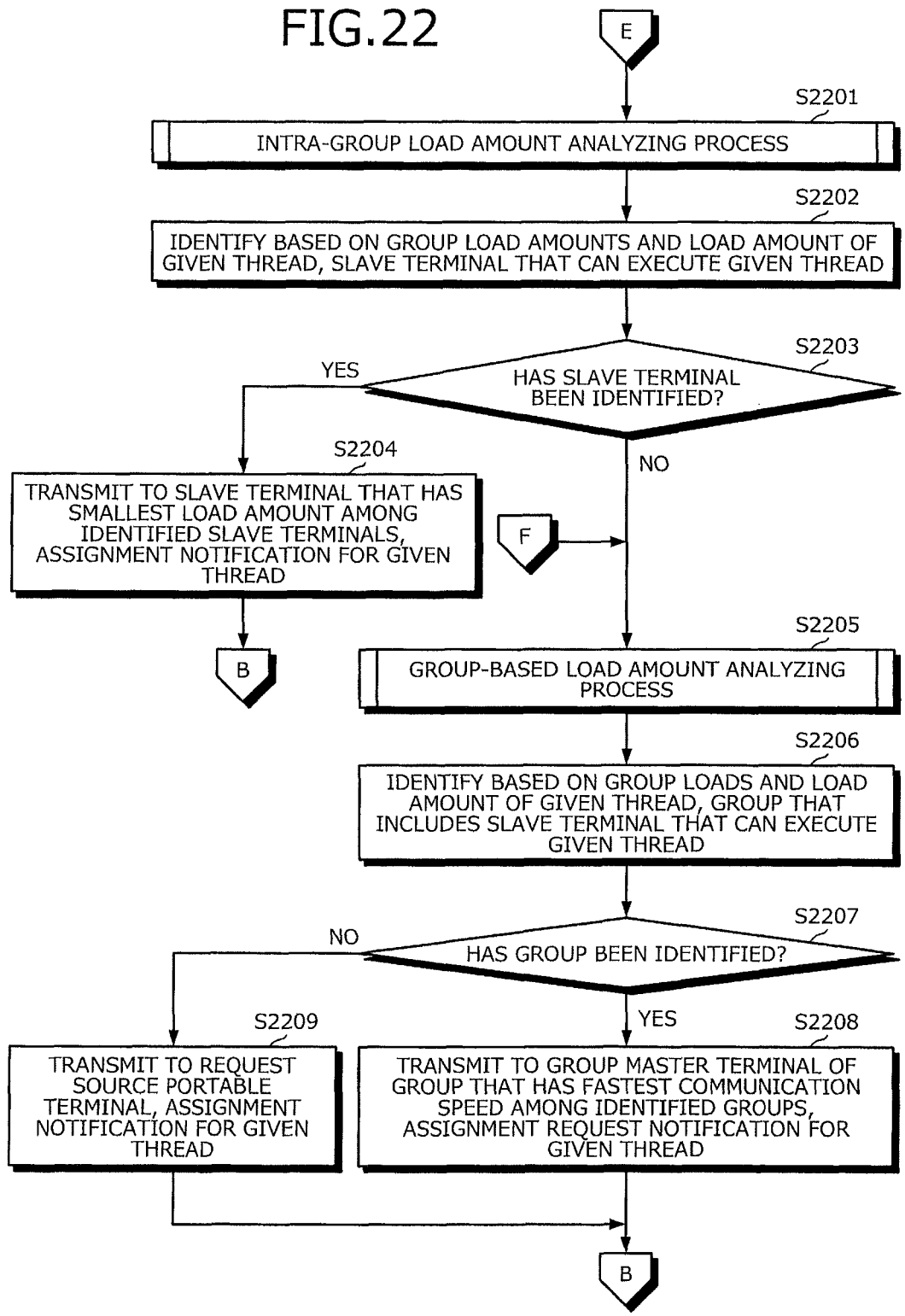

At step S1801, if receipt of assignment request notification from a slave terminal has been detected, via the detecting unit 701#1, that (step S1801: ASSIGNMENT REQUEST NOTIFICATION FROM SLAVE TERMINAL), the general master terminal goes to step S2201. Step S2201 is depicted in FIG. 22.

The general master terminal uses the load amount analyzing unit 705#1 to execute the intra-group load amount analyzing process (step S2201). The general master terminal uses the first scheduler 703#1 to identify a slave terminal that is capable of executing the given thread, based on the group load amounts and the load amount of the given thread (step S2202).

The general master terminal determines whether a slave terminal has been identified (step S2203). If it is determined that a slave terminal has been identified (step S2203: YES), the general master terminal uses the first scheduler 703#1 to transmit to the slave terminal that has the smallest load amount among the identified slave terminals, assignment notification for the given thread (step S2204). The general master terminal returns to step S1801.

If it is determined that no slave terminal has been identified (step S2203: NO), the general master terminal uses the load amount analyzing unit 705#1 to execute the group-based load amount analyzing process (step S2205). The general master terminal identifies a group that includes a slave terminal that is capable of executing the given thread, based on the group loads and the load amount of the given thread (step S2206).

The general master terminal determines whether a group has been identified (step S2207). If it is determined that a group has been identified (step S2207: YES), the general master terminal uses the first scheduler 703#1 to transmit to the group master terminal of the group that has the fastest communication speed among the identified groups, the assignment request notification for the given thread (step S2208). The general master terminal returns to step S1801.

If it is determined that no group has been identified (step S2207: NO), the general master terminal uses the first scheduler 703#1 to transmit to the request source portable terminal, the assignment notification for the given thread (step S2209) and returns to step S1801.

At step S1801, if the general master terminal detects, via the detecting unit 701#1, receipt of the assignment request notification from a group master terminal (step S1801: ASSIGNMENT REQUEST FROM GROUP MASTER TERMINAL), the general master terminal goes to step S2205.

Figure 23:
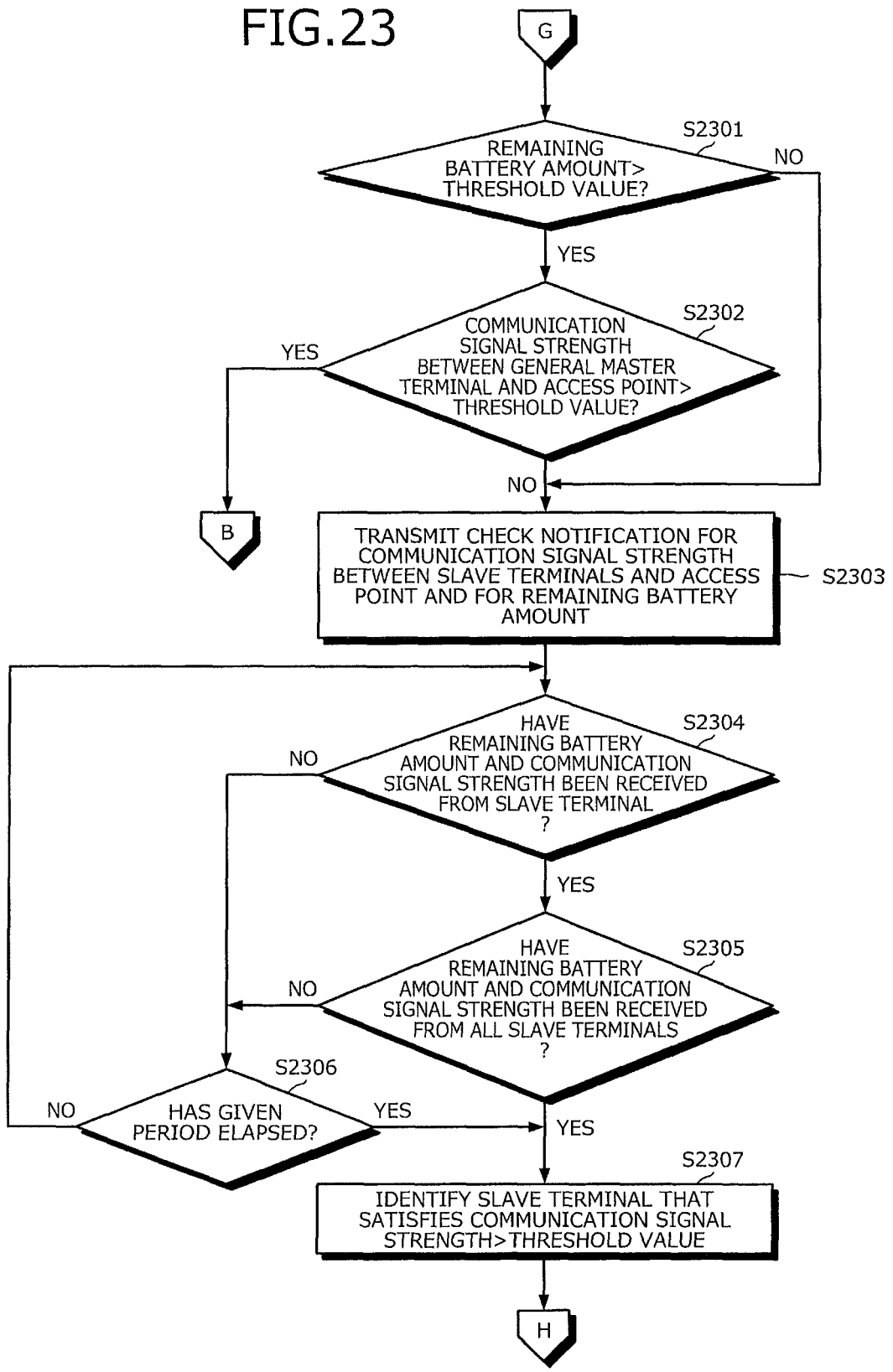
Figure 24:
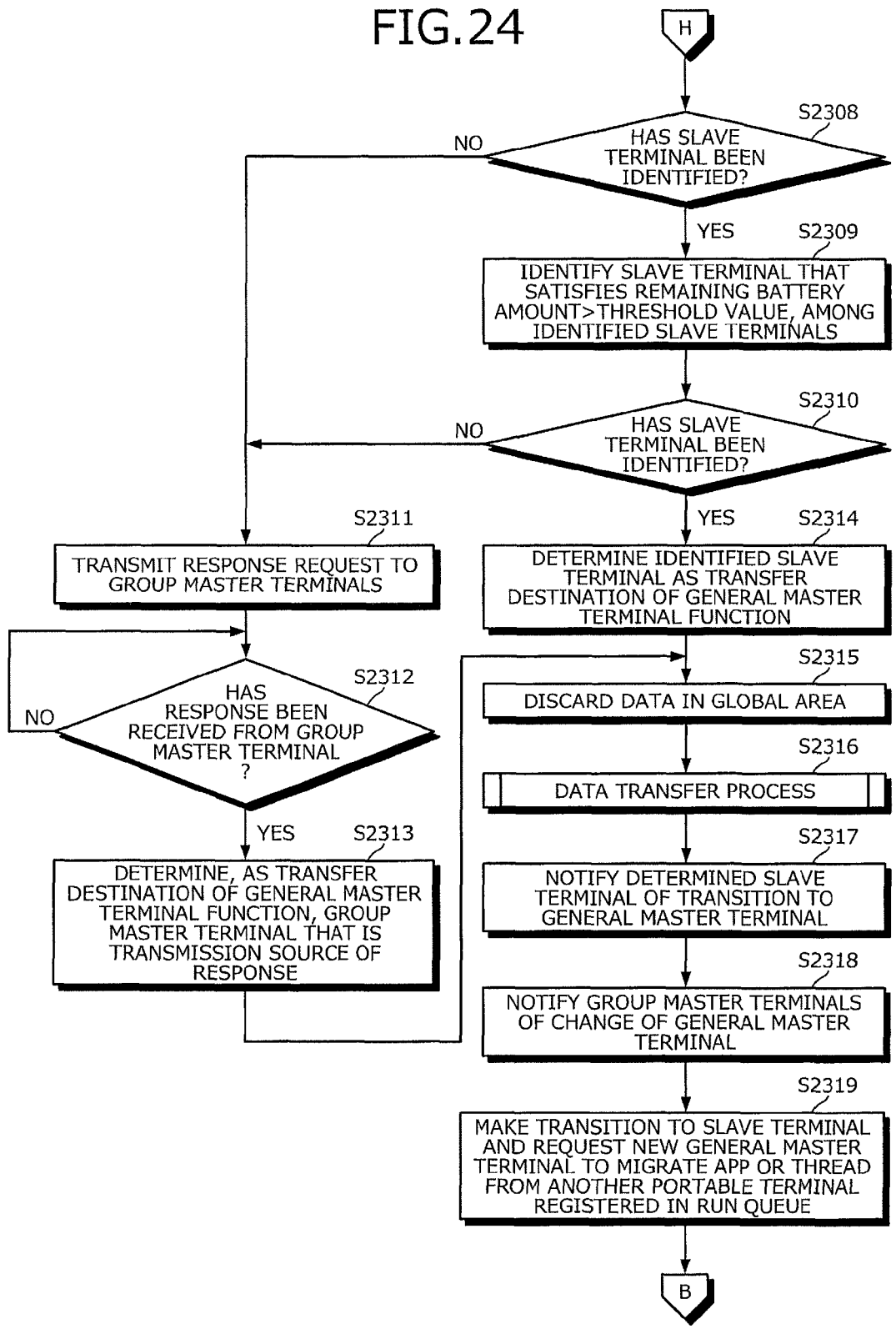

At step S1801, if the general master terminal detects a timer interrupt, via the detecting unit 701#1, (step S1801: TIMER INTERRUPT), the general master terminal goes to step S2301. Step S2301 is depicted in FIG. 23.

The general master terminal uses the determining unit 708#1 to determine whether the remaining battery amount>the threshold value is satisfied (step S2301). If it is determined that the remaining battery amount>the threshold value is not satisfied (step S2301: NO), the general master terminal goes to step S2303. If it is determined that the remaining battery amount>the threshold value is satisfied (step S2301: YES), the general master terminal uses the determining unit 708#1 to determine whether the communication signal strength between the general master terminal and the access point 202>the threshold value is satisfied (step S2302). If it is determined that the communication signal strength between the general master terminal and the access point 202>the threshold value is satisfied (step S2302: YES), the general master terminal goes to step S1801.

If it is determined that the communication signal strength between the general master terminal and the access point 202>the threshold value is not satisfied (step S2302: NO), the general master terminal goes to step S2303. The general master terminal uses the first scheduler 703#1 to transmit to the slave terminals of the same group as the general master terminal, check notification for communication signal strength between the slave terminals and the access point 202 and for the remaining battery amount (step S2303). The general master terminal determines whether the remaining battery amount and the communication signal strength have been received from the slave terminal (step S2304).

If it is determined that the remaining battery amount and the communication signal strength have been from the slave terminals (step S2304: YES), the general master terminal determines whether the remaining battery amount and the communication signal strength have been received from all the slave terminals (step S2305). If it is determined that the remaining battery amount and the communication signal strength have been received from all the slave terminals (step S2305: YES), the general master terminal goes to step S2307.

If it is determined at step S2304 that the remaining battery amount and the communication signal strength have not been received from the slave terminals (step S2304: NO), the general master terminal goes to step S2306. If it is determined, at step S2305, that the remaining battery amount and the communication signal strength have not been received from all the slave terminals (step S2305: NO), the general master terminal goes to step S2306.

The general master terminal determines whether a given period has elapsed (step S2306). If it is determined that the given period has not elapsed (step S2306: NO), the general master terminal returns to step S2304. On the other hand, if it is determined that the given period has elapsed (step S2306: YES), the general master terminal goes to step S2307.

The general master terminal uses the first scheduler 703#1 to identify a slave terminal that satisfies the communication signal strength>the threshold value (step S2307) and determines whether a slave terminal has been identified (step S2208). If it is determined that a slave terminal has been identified (step S2208: YES), the general master terminal uses the first scheduler 703#1 to identify a slave terminal that satisfies the remaining battery amount>the threshold value, among the identified slave terminals (step S2309). The general master terminal determines whether a slave terminal has been identified (step S2310).

If it is determined that no slave terminal that satisfies the communication signal strength>the threshold value has been identified (step S2308: NO), the general master terminal goes to step S2311. If it is determined that no slave terminal that satisfies the remaining battery amount>the threshold value is identified among the identified slave terminals (step S2310: NO), the general master terminal goes to step S2311. The general master terminal uses the first scheduler 703#1 to transmit the response request to the group master terminals (step S2311) and determines whether a response has been received from a group master terminal (step S2312).

If it is determined that no response has been received from a group master terminal (step S2312: NO), the general master terminal goes to step S2312. If it is determined that a response has been received from a group master terminal (step S2312: YES), the general master terminal uses the first scheduler 703#1 to determine, as the transfer destination of the general master terminal function, the group master terminal that is the transmission source of the response (step S2313). The general master terminal goes to step S2315.

If it is determined that a slave terminal has been identified (step S2310: YES), the general master terminal uses the first scheduler 703#1 to determine the identified slave terminal as the transfer destination of the general master terminal function (step S2314) and goes to step S2315.

The general master terminal uses the first scheduler 703#1 to discard data in the GLOBAL area (step S2315) and uses the first scheduler 703#1 to execute the data transfer process (step S2316). The general master terminal notifies the determined slave terminal of the transition to the general master terminal (step S2317). The general master terminal uses the first scheduler 703#1 to notify the group master terminals of the change of the general master terminal (step S2318).

The general master terminal uses the transitioning unit 706#1 to make the transition to a slave terminal and requests the new general master terminal to migrate an app or a thread from another portable terminal 201 registered in the run queue 332 (step S2319). The general master terminal returns to step S1801.

Figure 25:
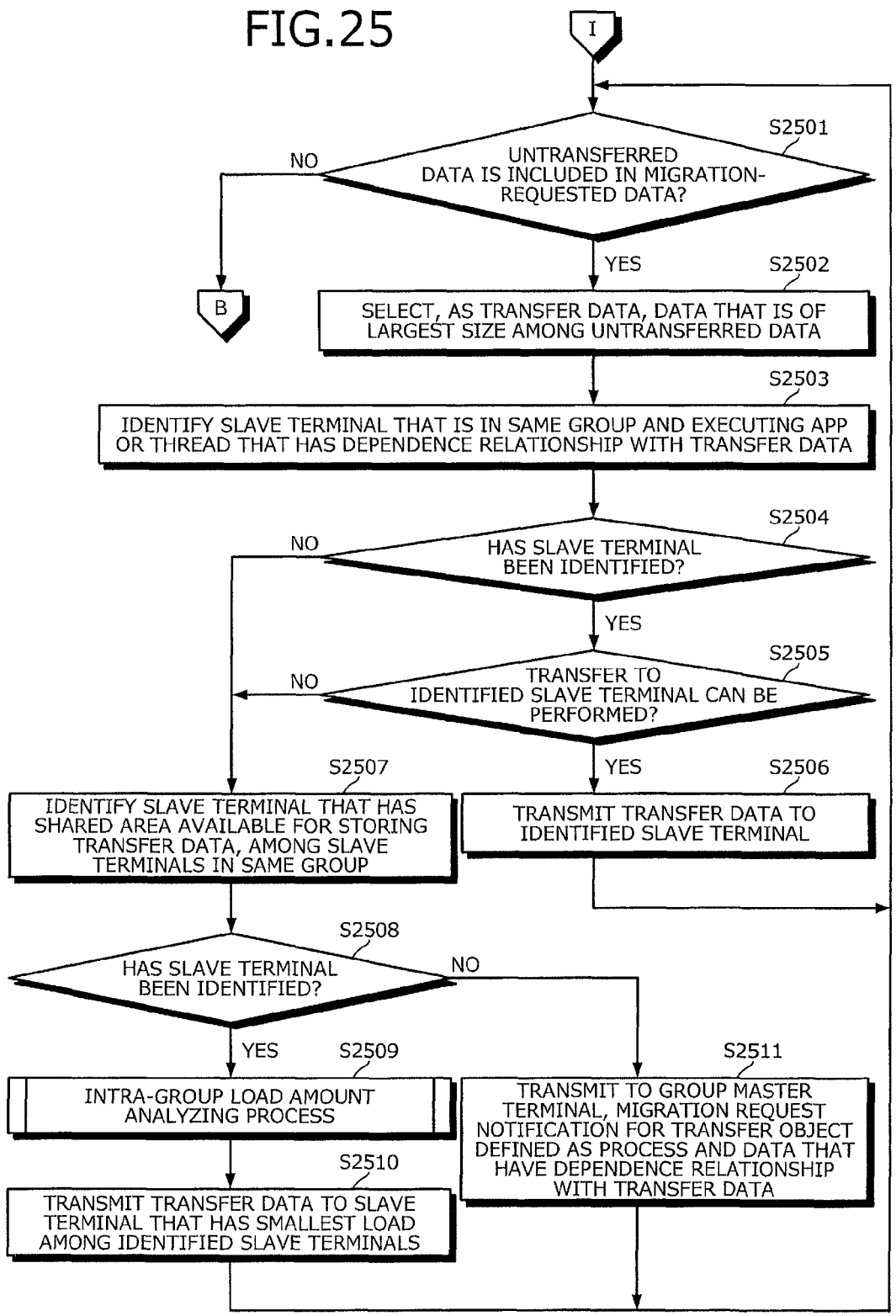

At step S1801, if the general master terminal detects, via the detecting unit 701#1, receipt of the migration request notification (step S1801: MIGRATION REQUEST NOTIFICATION), the general master terminal goes to step S2501. Step S2501 is depicted in FIG. 25.

The general master terminal uses the first scheduler 703#1 to determine whether untransferred data is included in migration-requested data (step S2501). Although a process such as an app and a thread is migration-requested, since data related to the process is transferred, the data is defined as migration-requested data.

If it is determined that untransferred data is not included in the migration-requested data (step S2501: NO), the general master terminal returns to step S1801. If it is determined that untransferred data is included in the migration-requested data (step S2501: YES), the general master terminal selects, as transfer data, data that is of the largest size among the untransferred data (step S2502).

The general master terminal uses the first scheduler 703#1 to identify a slave terminal that is in the same group and executing an app or a thread that has a dependence relationship with the transfer data (step S2503). The general master terminal determines whether a slave terminal has been identified (step S2504). If it is determined that a slave terminal has been identified (step S2504: YES), the general master terminal determines whether transfer to the identified slave terminal can be performed (step S2505). In this case, for example, if the identified slave terminal has no area available for storing the transfer data, it is determined that transfer cannot be performed.

If it is determined that transfer to the identified slave terminal can be performed (step S2505: YES), the general master terminal uses the first scheduler 703#1 to transmit the transfer data to the identified slave terminal (step S2506) and returns to step S2501. If it is determined that no slave terminal has been identified (step S2504: NO) or that transfer to the identified slave terminal cannot be performed (step S2505: NO), the general master terminal goes to step S2507.

The general master terminal identifies the slave terminal that has the SHARED area available for storing the transfer data, among the slave terminals in the same group (step S2507). The general master terminal determines whether a slave terminal has been identified (step S2508) and, if it is determined that the slave terminal has been identified (step S2508: YES), the general master terminal uses the load amount analyzing unit 705#1 to execute the intra-group load amount analyzing process (step S2509). The general master terminal uses the first scheduler 703#1 to transmit the transfer data to the slave terminal that has the smallest load among the identified slave terminals (step S2510) and returns to step S2501.

If it is determined that no slave terminal has been identified (step S2508: NO), the general master terminal goes to step S2511. The general master terminal uses the first scheduler 703#1 to transmit to the group master terminal, migration request notification for the transfer object defined as the process and data that have a dependence relationship with the transfer data (step S2511) and returns to step S2501. Although the group master terminal defined as the transmission destination of the migration request may be any group master terminal, for example, the general master terminal may determine the group master terminal, based on the load amounts of the groups.

Figure 18:
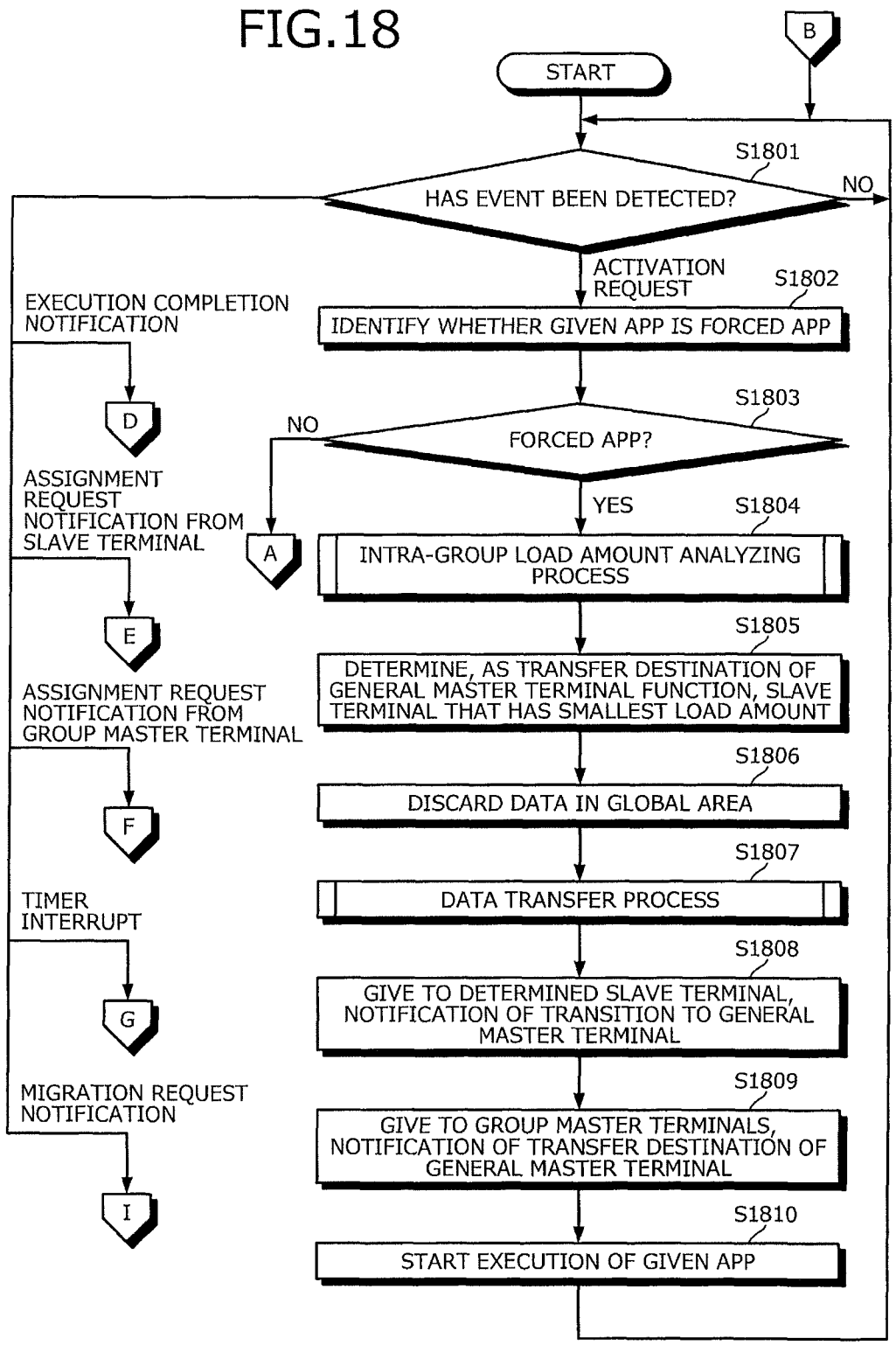
FIGS. 18, 19, 20, 21, 22, 23, 24, and 25 are flowcharts of an example of a process procedure performed by the general master terminal.
Figure 19:
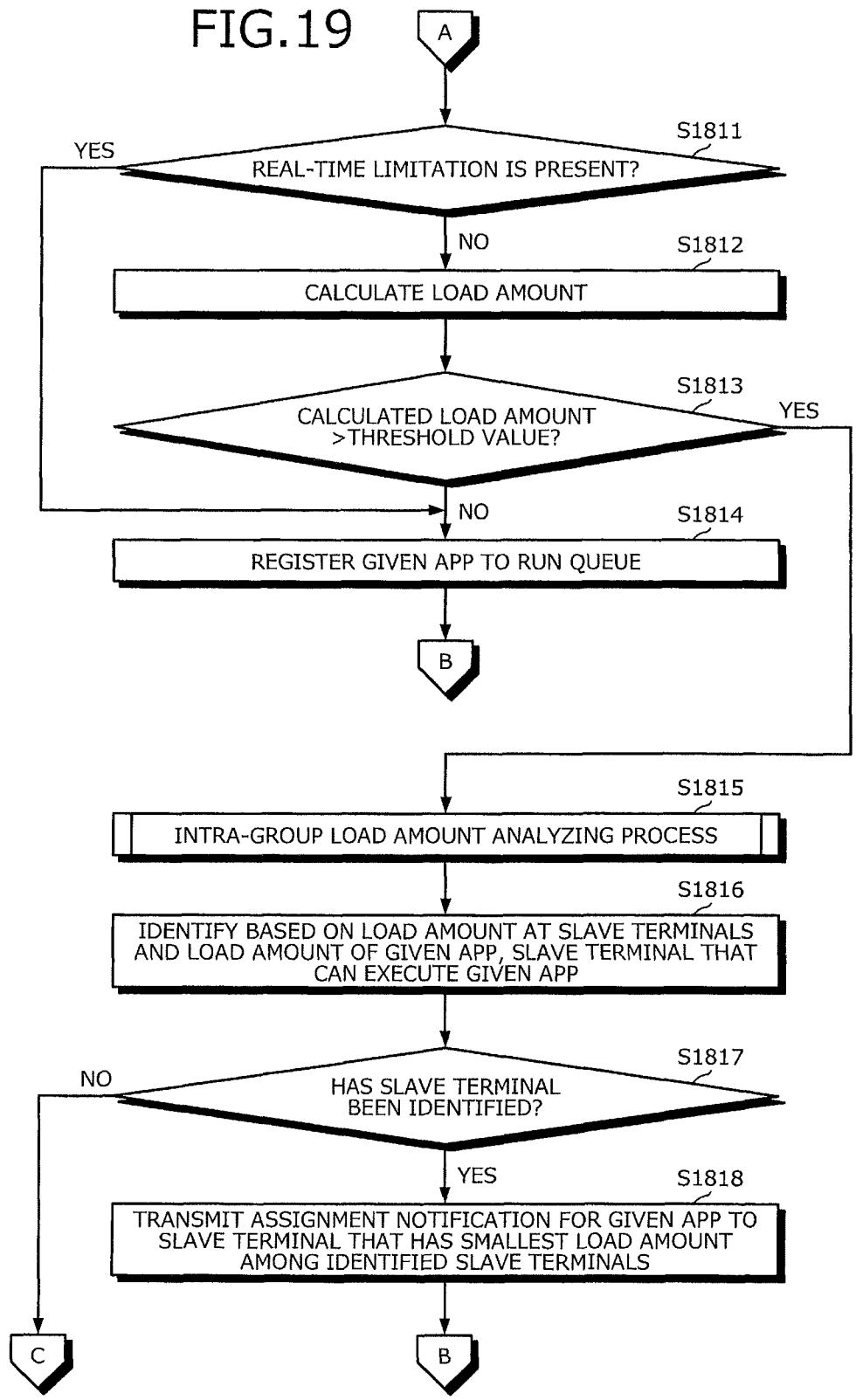
Figure 26:
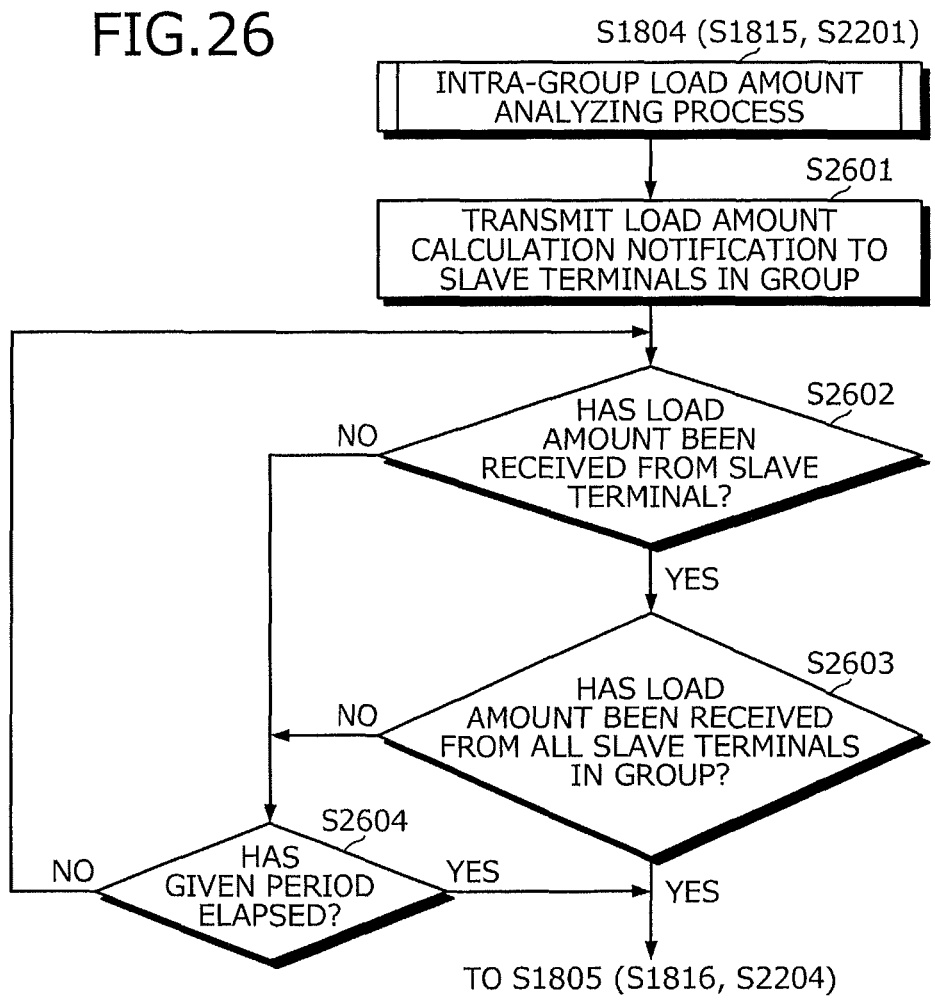
FIG. 26 is a flowchart for explaining in detail an intra-group load amount analyzing process (step S1804) depicted in FIG. 18.

FIG. 26 is a flowchart for explaining the intra-group load amount analyzing process (step S1804) depicted in FIG. 18 in detail. The intra-group load amount analyzing processes (steps S1815, S2201) are the same process as the intra-group load amount analyzing process (step S1804). The general master terminal transmits load amount calculation notification to the slave terminals in the group (step S2601) and determines whether a load amount has been received from a slave terminal (step S2602). If it is determined that load amounts have been received from the slave terminals (step S2602: YES), the general master terminal determines whether a load amount has been received from all the slave terminals in the group (step S2603).

If it is determined that load amounts have been received from all the slave terminals in the group (step S2603: YES), the general master terminal goes to step S1805 (S1816, S2204). If it is determined that no load amount has been from a slave terminal (step S2602: NO), the general master terminal goes to step S2604. If it is determined that load amounts have not been received from all the slave terminals in the group (step S2603: NO), the general master terminal goes to step S2604.

The general master terminal determines whether a given period has elapsed (step S2604). If it is determined that the given period has not elapsed (step S2604: NO), the general master terminal returns to step S2602. On the other hand, if it is determined that the given period has elapsed (step S2604: YES), the general master terminal goes to step S1805 (S1816, S2204).

Figure 20:
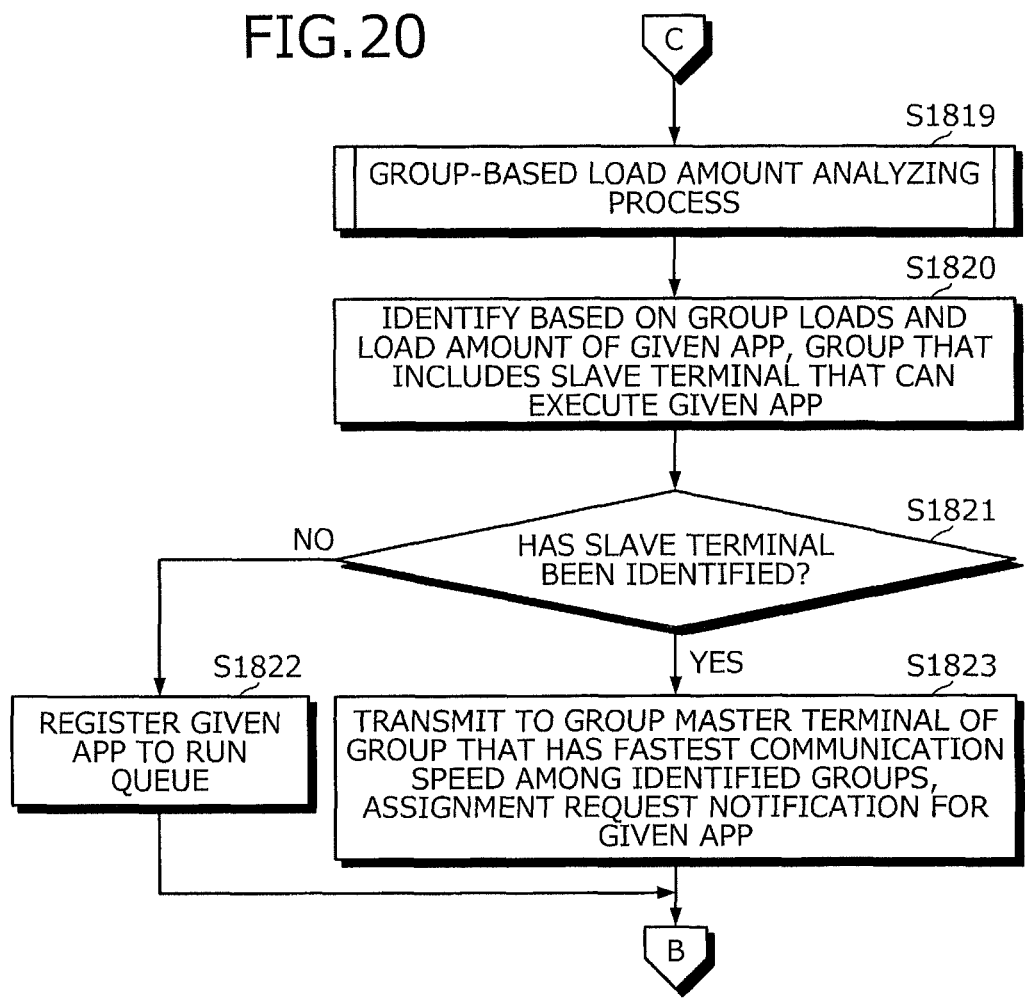
Figure 27:
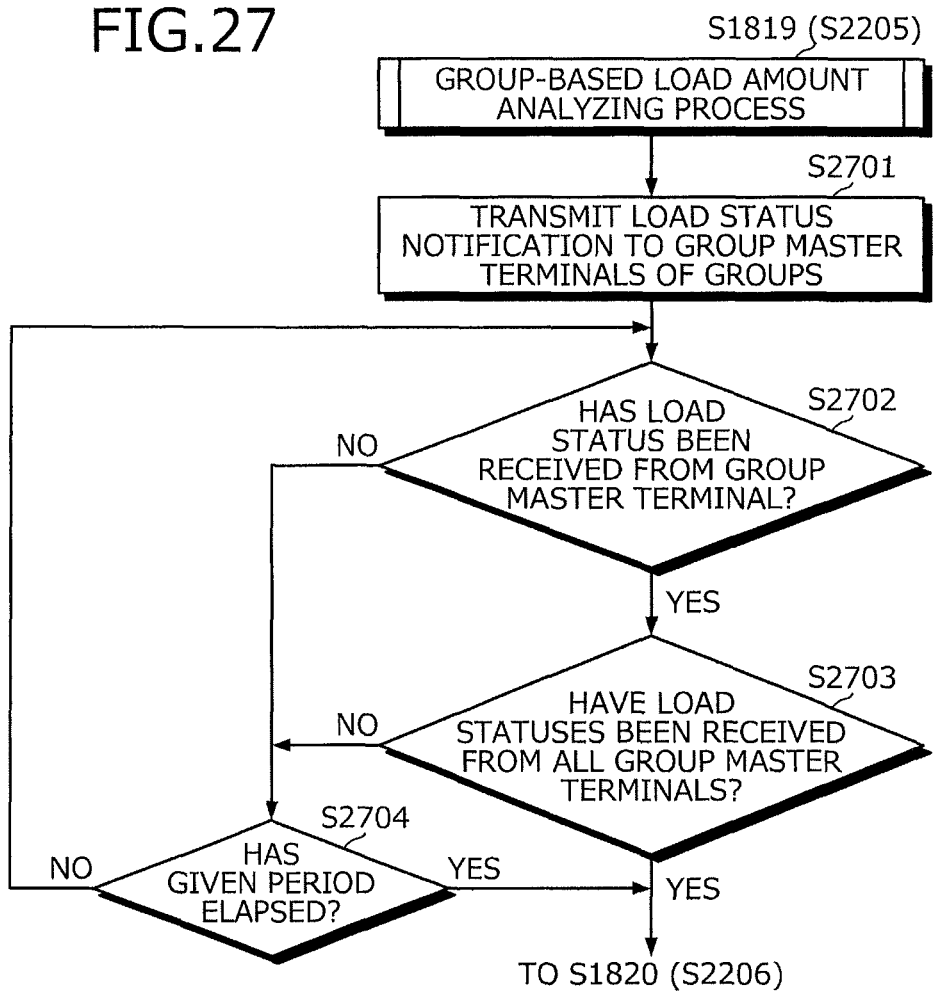
FIG. 27 is a flowchart for explaining in detail a group-based load amount analyzing process (step S1819) depicted in FIG. 20.

FIG. 27 is a flowchart for explaining the group-based load amount analyzing process (step S1819) depicted in FIG. 20 in detail. The group-based load amount analyzing process (step S2205) is the same process as the group-based load amount analyzing process (step S1819). The general master terminal transmits the load status notification to the group master terminals of the groups (step S2701) and determines whether the load status has been received from a group master terminal (step S2702).

If it is determined that the load status has been received from a group master terminal (step S2702: YES), the general master terminal determines whether load statuses have been received from all the group master terminals (step S2703). If it is determined that load statuses have been received from all the group master terminals (step S2703: YES), the general master terminal goes to step S1820 (S2206).

If it is determined that no load status has been received from a group master terminal (step S2702: NO), the general master terminal goes to step S2704. If it is determined that load statuses have not been received from all the group master terminals (step S2703: NO), the general master terminal goes to step S2704.

The general master terminal determines whether a given period has elapsed (step S2704). If it is determined that the given period has not elapsed (step S2704: NO), the general master terminal returns to step S2702. On the other hand, if it is determined that the given period has elapsed (step S2704: YES), the general master terminal goes to step S1820 (S2206).

Figure 28:
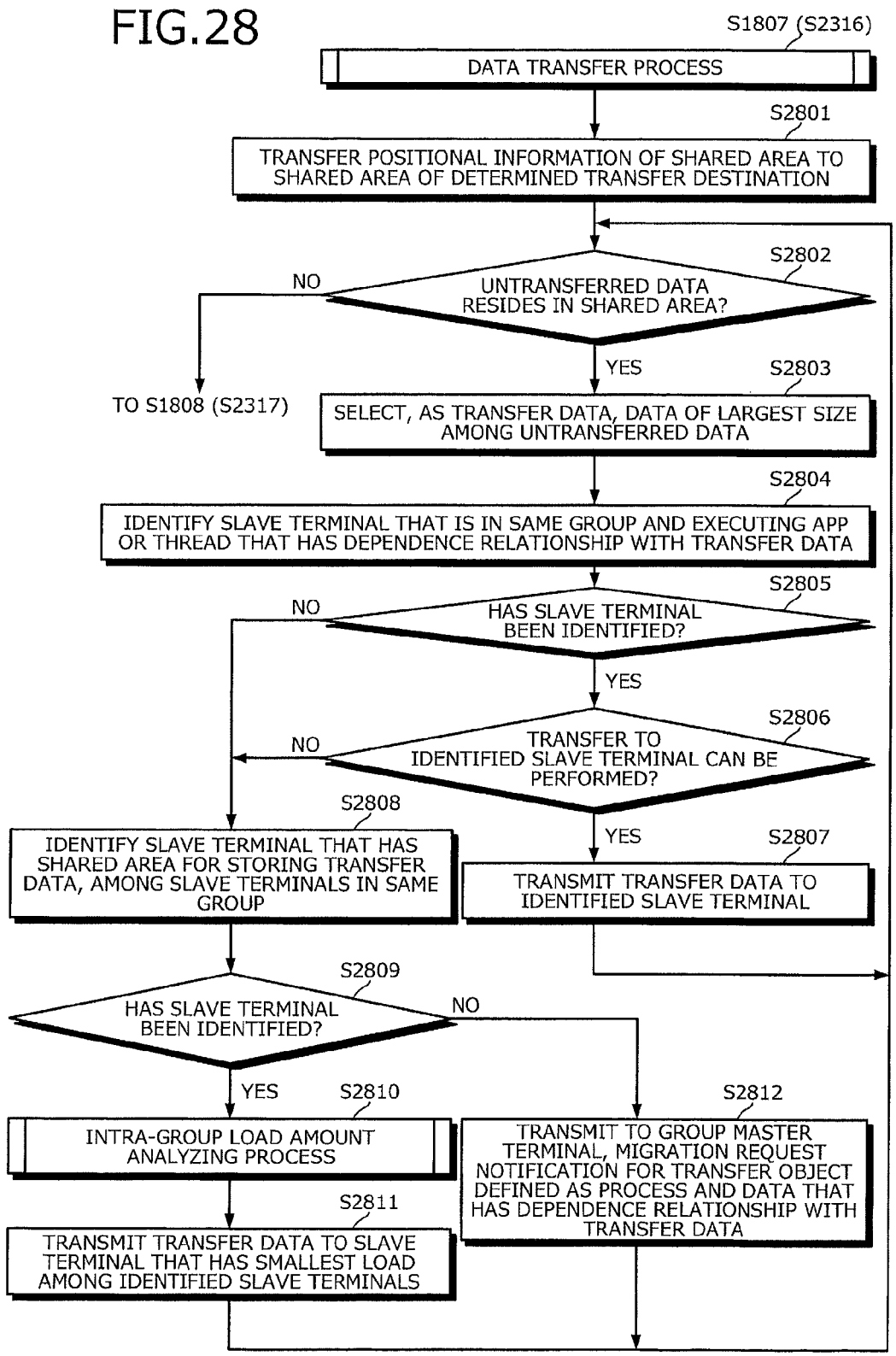
FIG. 28 is a flowchart for explaining in detail the data transfer process (step S1807) depicted in FIG. 18.

FIG. 28 is a flowchart for explaining the data transfer process (step S1807) depicted in FIG. 18 in detail. The data transfer process (step S2316) is the same process as the data transfer process (step S1807). First, the general master terminal transfers the positional information of the SHARED area to the SHARED area of the determined transfer destination (step S2801). The general master terminal determines whether untransferred data resides in the SHARED area (step S2802). If it is determined that untransferred data does not resides in the SHARED area (step S2802: NO), the general master terminal goes to step S1808 (S2317).

If it is determined that untransferred data resides in the SHARED area (step S2802: YES), the general master terminal selects, as transfer data, data of the largest size among the untransferred data (step S2803).

The general master terminal identifies a slave terminal that is in the same group and executing an app or a thread that has a dependence relationship with the transfer data (step S2804). The general master terminal determines whether a slave terminal has been identified (step S2805). If it is determined that a slave terminal has been identified (step S2805: YES), the general master terminal determines whether transfer to the identified slave terminal can be performed (step S2806). In this case, for example, if the identified slave terminal has no area available for storing the transfer data, it is determined that the transfer cannot be performed.

If it is determined that transfer to the identified slave terminal can be performed (step S2806: YES), the general master terminal transmits the transfer data to the identified slave terminal (step S2807) and returns to step S2802. If it is determined that no slave terminal has been identified (step S2805: NO) or that transfer to the identified slave terminal cannot be performed (step S2806: NO), the general master terminal goes to step S2808.

The general master terminal identifies a slave terminal that has the SHARED area available for storing the transfer data, among the slave terminals in the same group (step S2808). The general master terminal determines whether a slave terminal has been identified (step S2809) and if it is determined that a slave terminal has been identified (step S2809: YES), the general master terminal executes the intra-group load amount analyzing process (step S2810). The intra-group load amount analyzing process (step S2810) is the same process as the intra-group load amount analyzing process (step S1804) and therefore, will not be described in detail. The general master terminal transmits the transfer data to the slave terminal that has the smallest load among the identified slave terminals (step S2811) and returns to step S2802.

If it is determined that no slave terminal has been identified (step S2809: NO), the general master terminal goes to step S2812. The general master terminal transmits to the group master terminal, migration request notification for the transfer object defined as the process and data that has a dependence relationship with the transfer data (step S2812) and returns to step S2802. Although the group master terminal defined as the transmission destination of the migration request may be any group master terminal, for example, the general master terminal may determine the group master terminal, based on the load statuses of the groups.

FIGS. 29, 30, 31, 32, 33, 34, 35, and 36 are flowcharts of an example of a process procedure performed by the group master terminal. First, the group master terminal uses the detecting unit 701#2 to determine whether the occurrence of an event has been detected (step S2901). If it is determined that the occurrence of an event has not been detected (step S2901: NO), the group master terminal returns to step S2901.

If it is determined that an activation request for an app has been detected (step S2901: ACTIVATION REQUEST), the group master terminal goes to step S2902. Steps S2901 to S2918 are the same operations as steps S1801 to S1818, respectively and therefore, will not be described in detail. After the case of NO at step S2917, the group master terminal uses the second scheduler 704#2 to transmit assignment request notification to the general master terminal (step S2919) and returns to step S2901.

Figure 31:
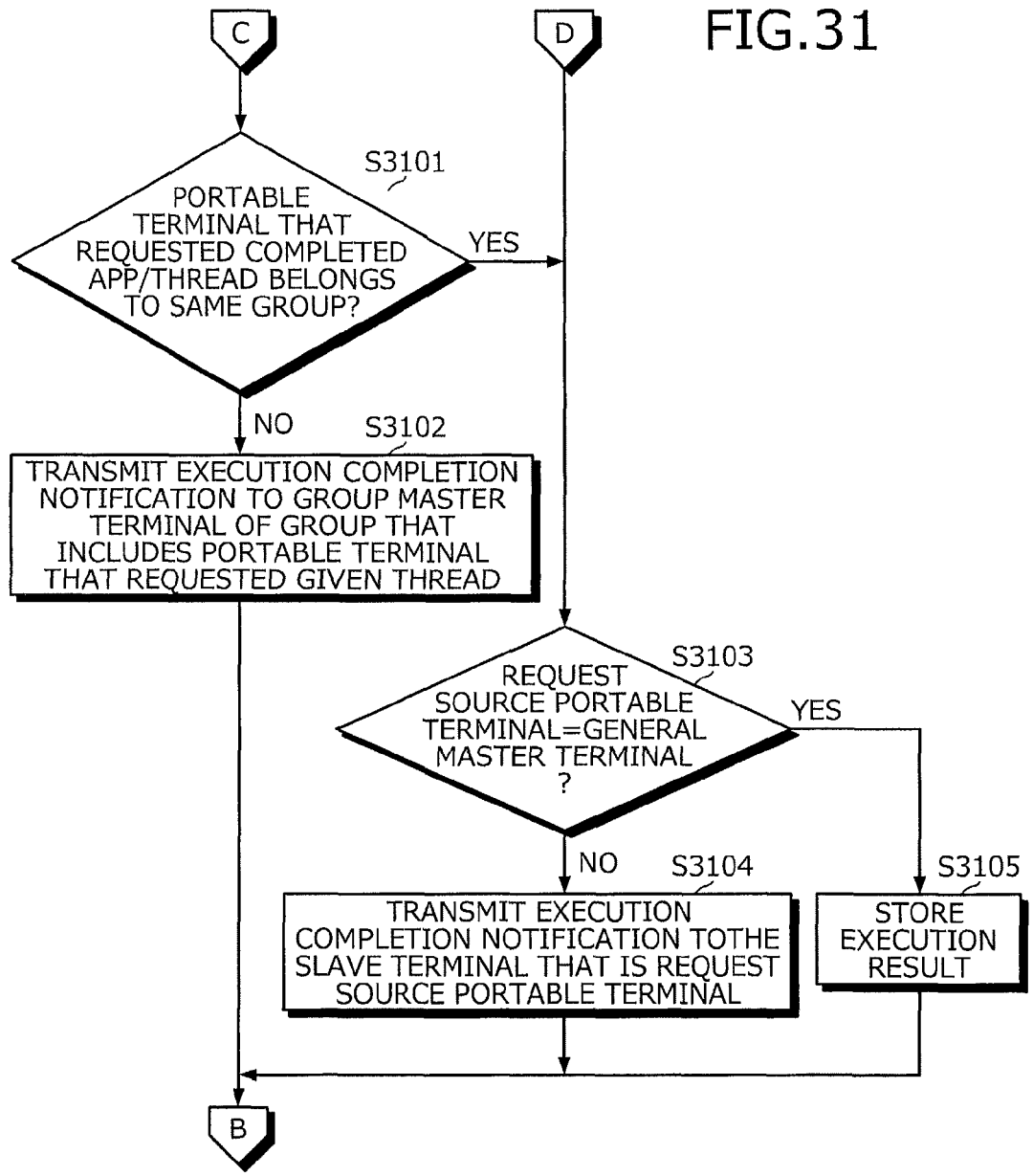

At step S2901, if the group master terminal detects, via the detecting unit 701#2, receipt of execution completion notification from a slave terminal (step S2901: EXECUTION COMPLETION NOTIFICATION FROM SLAVE TERMINAL), the group master terminal goes to step S3101. Step S3101 is depicted in FIG. 31. Steps S3101 to S3105 are the same processes as steps S2101 to S2105 depicted in FIG. 21 and therefore, will not be described in detail.

Figure 32:
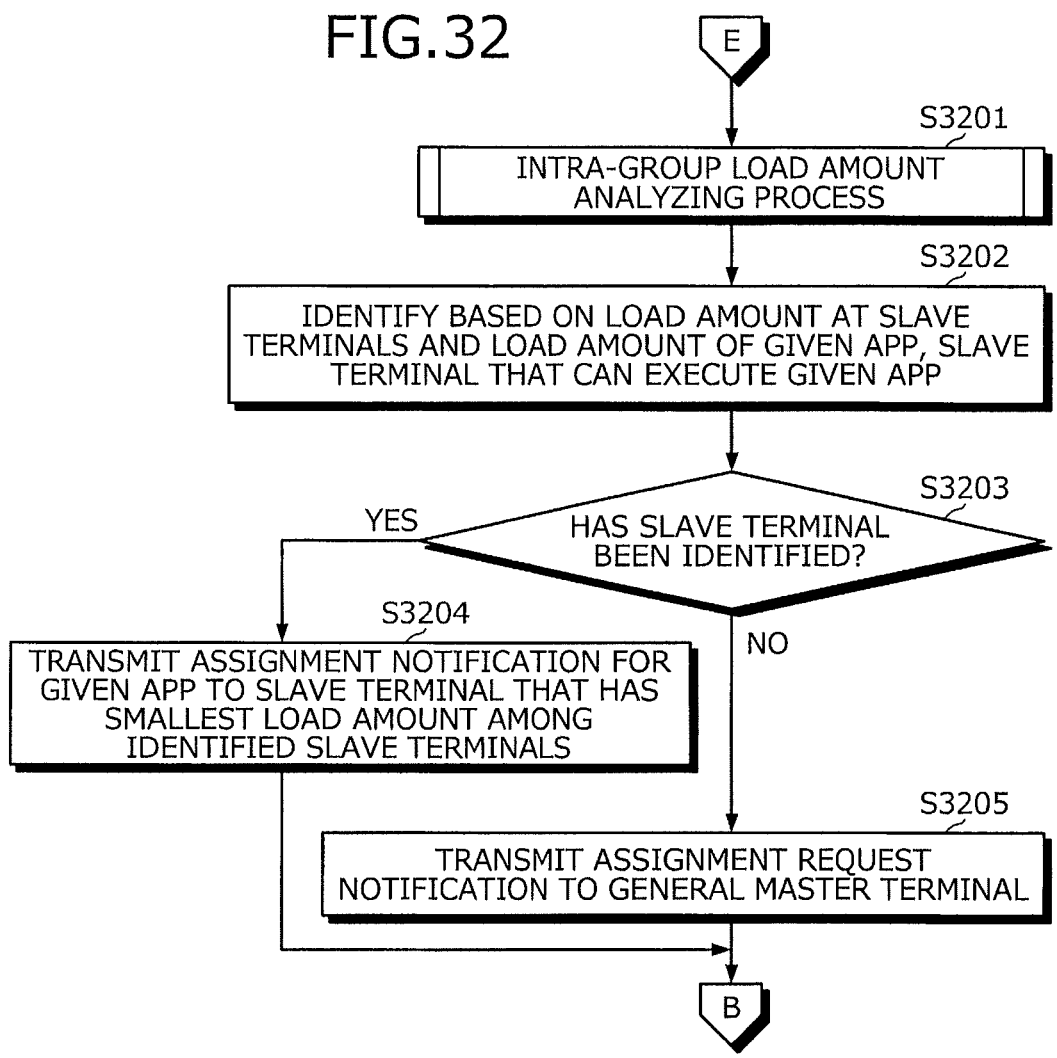

At step S2901, if the group master terminal detects, via the detecting unit 701#2, receipt of the assignment request notification from a slave terminal (step S2901: ASSIGNMENT REQUEST NOTIFICATION FROM SLAVE TERMINAL), the group master terminal goes to step S3201. Step S3201 is depicted in FIG. 32.

Steps S3201 to S3204 are the same operations as steps S2201 to S2204 depicted in FIG. 22 and therefore, will not be described in detail. After the case of NO at step S3203, the group master terminal uses the first scheduler 703#2 to transmit assignment request notification to the general master terminal (step S3205) and returns to step S2901.

Figure 33:
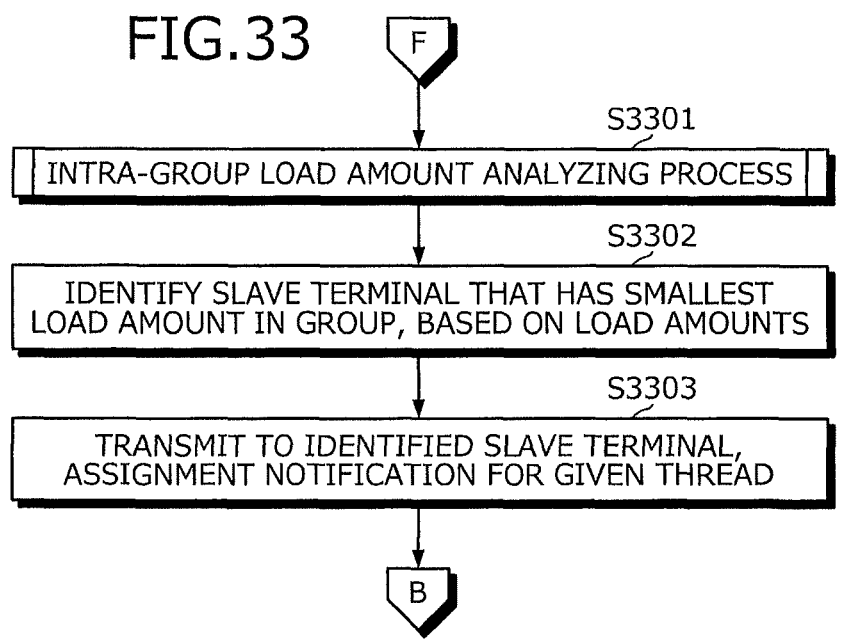
Figure 34:
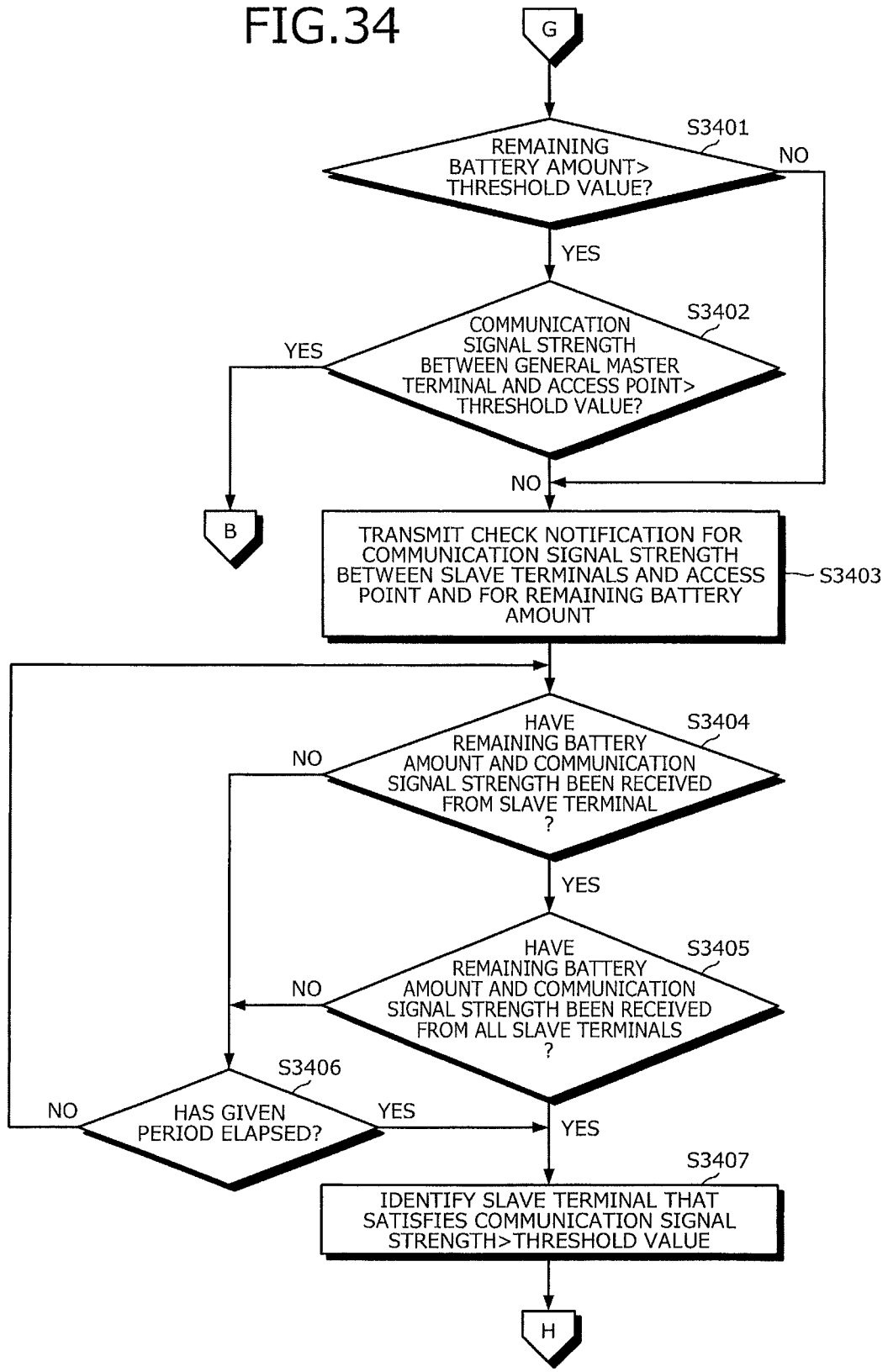
Figure 35:
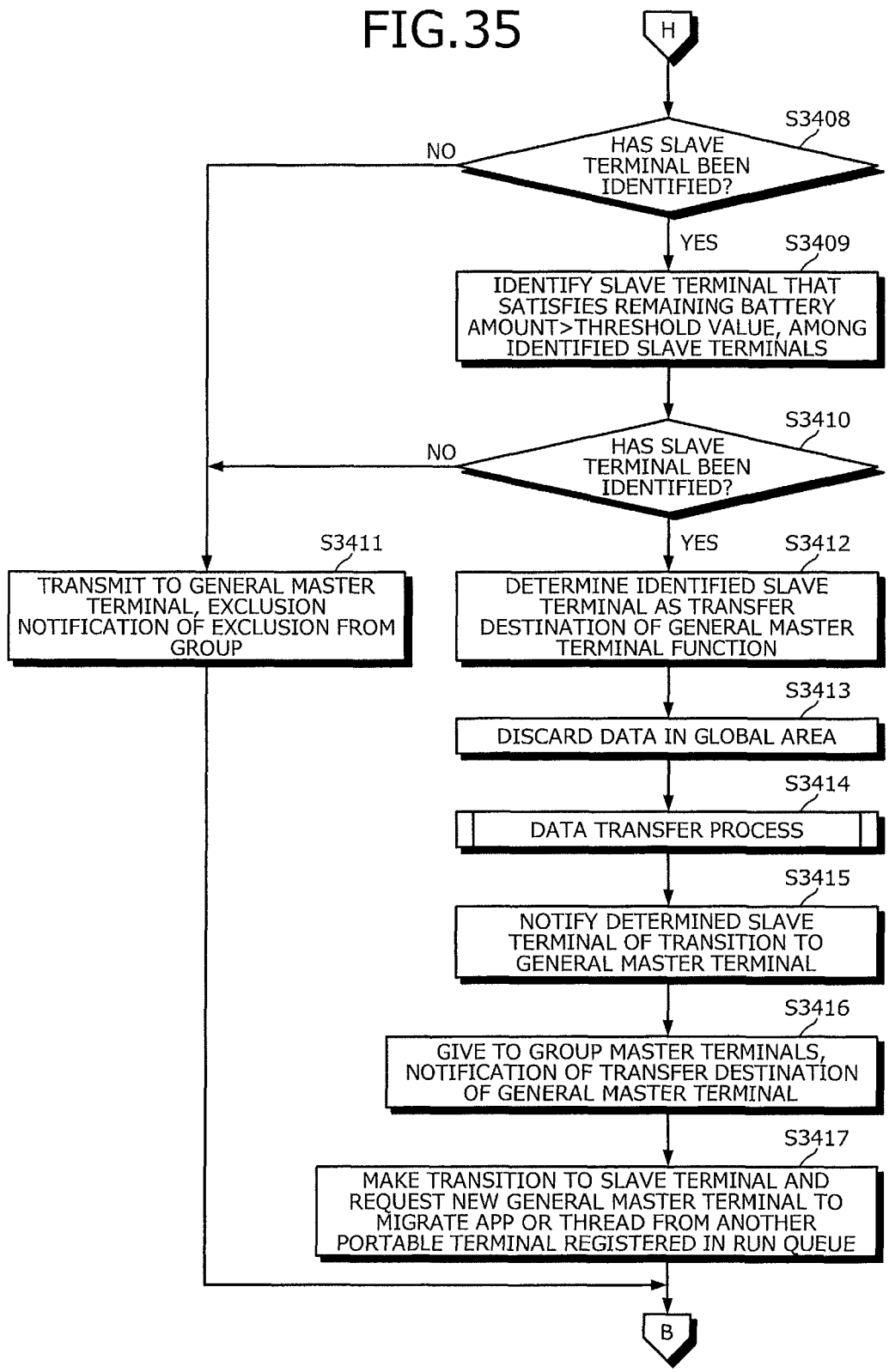
Figure 36:
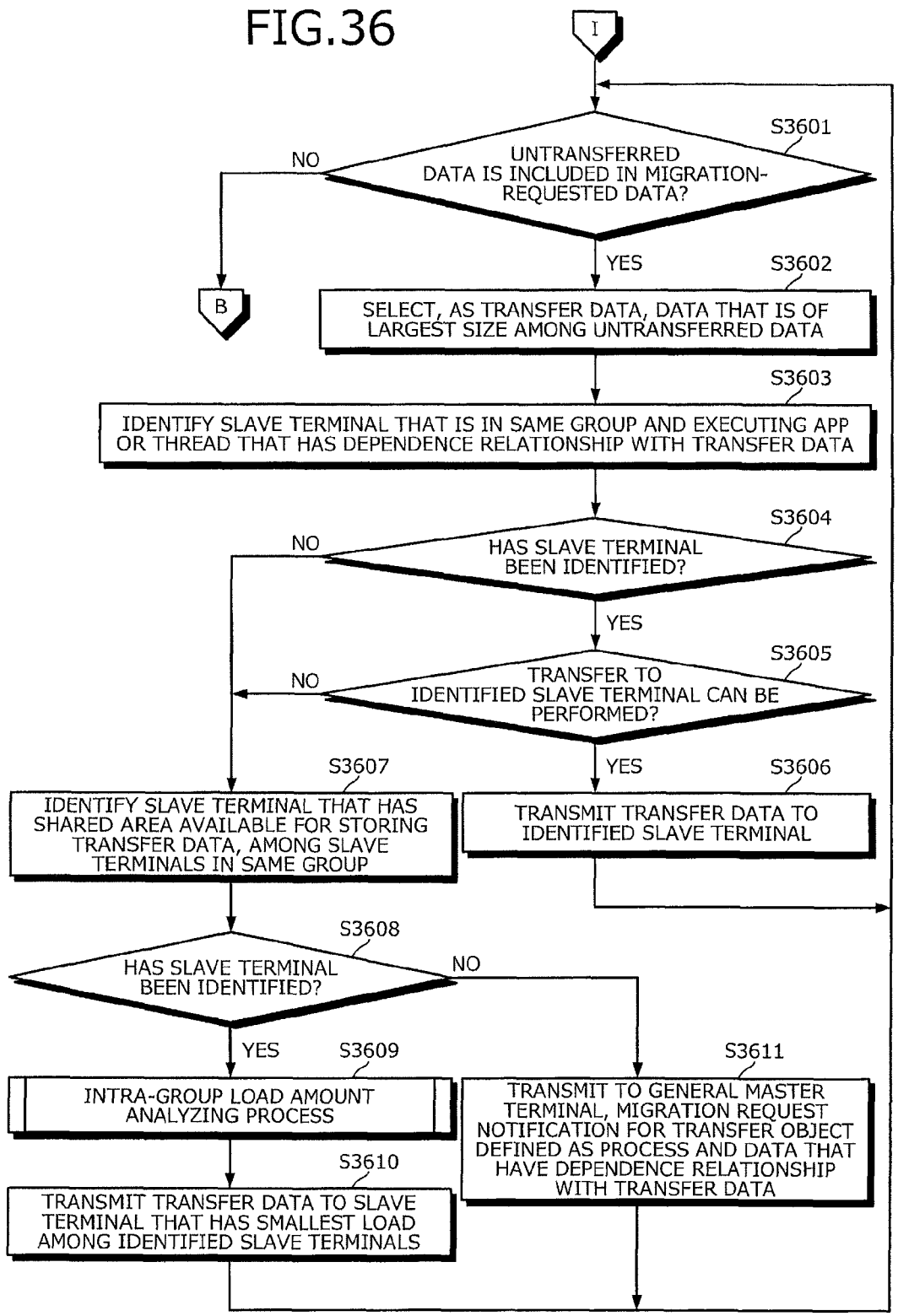

At step S2901, if the group master terminal detects, via the detecting unit 701#2, receipt of assignment request notification from the general master terminal (step S2901: ASSIGNMENT REQUEST NOTIFICATION FROM GENERAL MASTER TERMINAL), the group master terminal goes to step S3301. Step S3301 is depicted in FIG. 33.

The group master terminal uses the load amount analyzing unit 705#2 to execute the intra-group load amount analyzing process (step S3301). The intra-group load amount analyzing process (step S3301) is the same process as the intra-group load amount analyzing process (step S1804) and therefore, will not be described in detail. The group master terminal uses the first scheduler 703#2 to identify the slave terminal that has the smallest load amount in the group, based on the load amounts (step S3302). The group master terminal uses the first scheduler 703#2 to transmit to the identified slave terminal that has the smallest load amount, assignment notification for the given thread (step S3303) and returns to step S2901.

Figure 29:
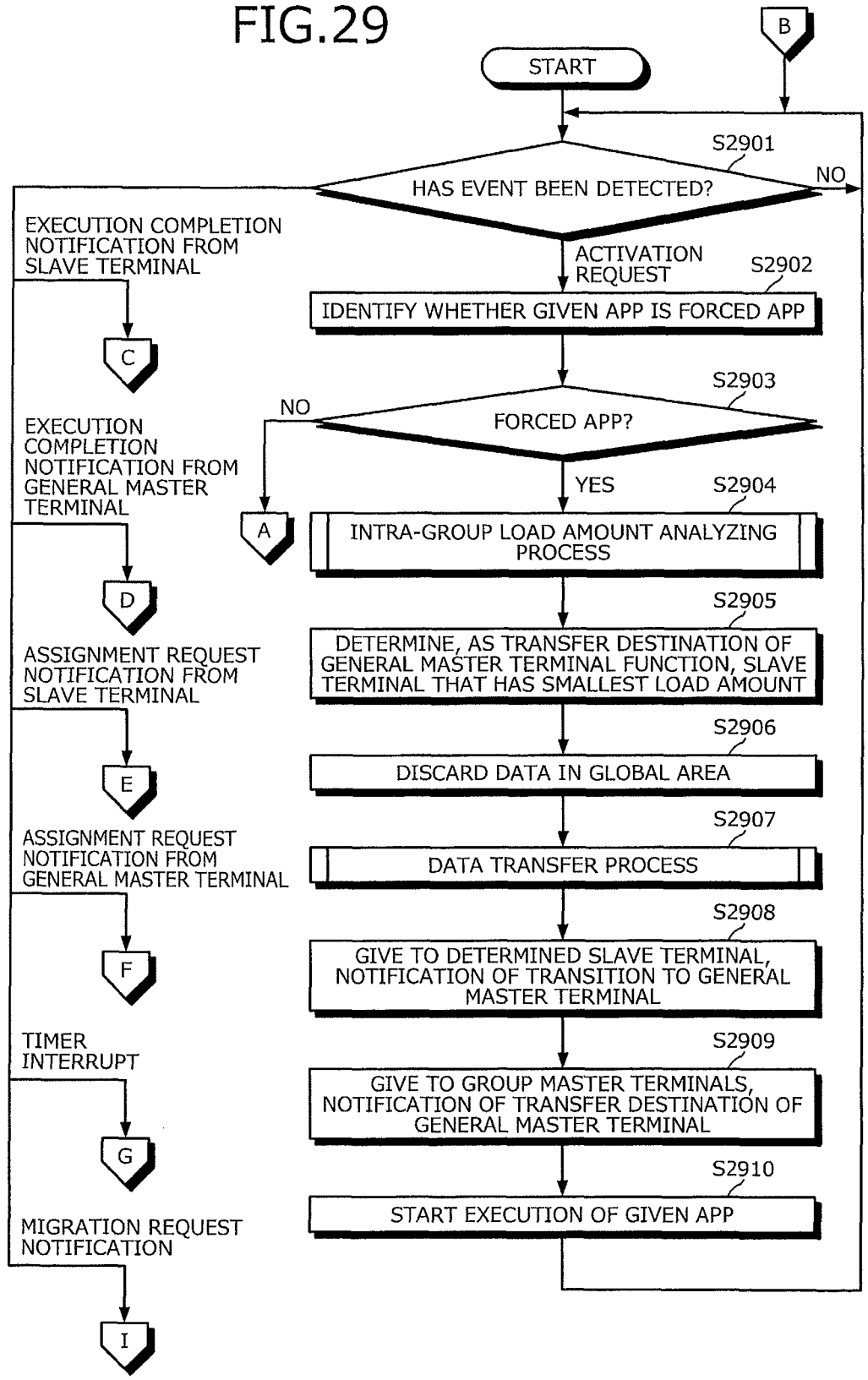
FIGS. 29, 30, 31, 32, 33, 34, 35, and 36 are flowcharts of an example of a process procedure performed by a group master terminal.
Figure 30:
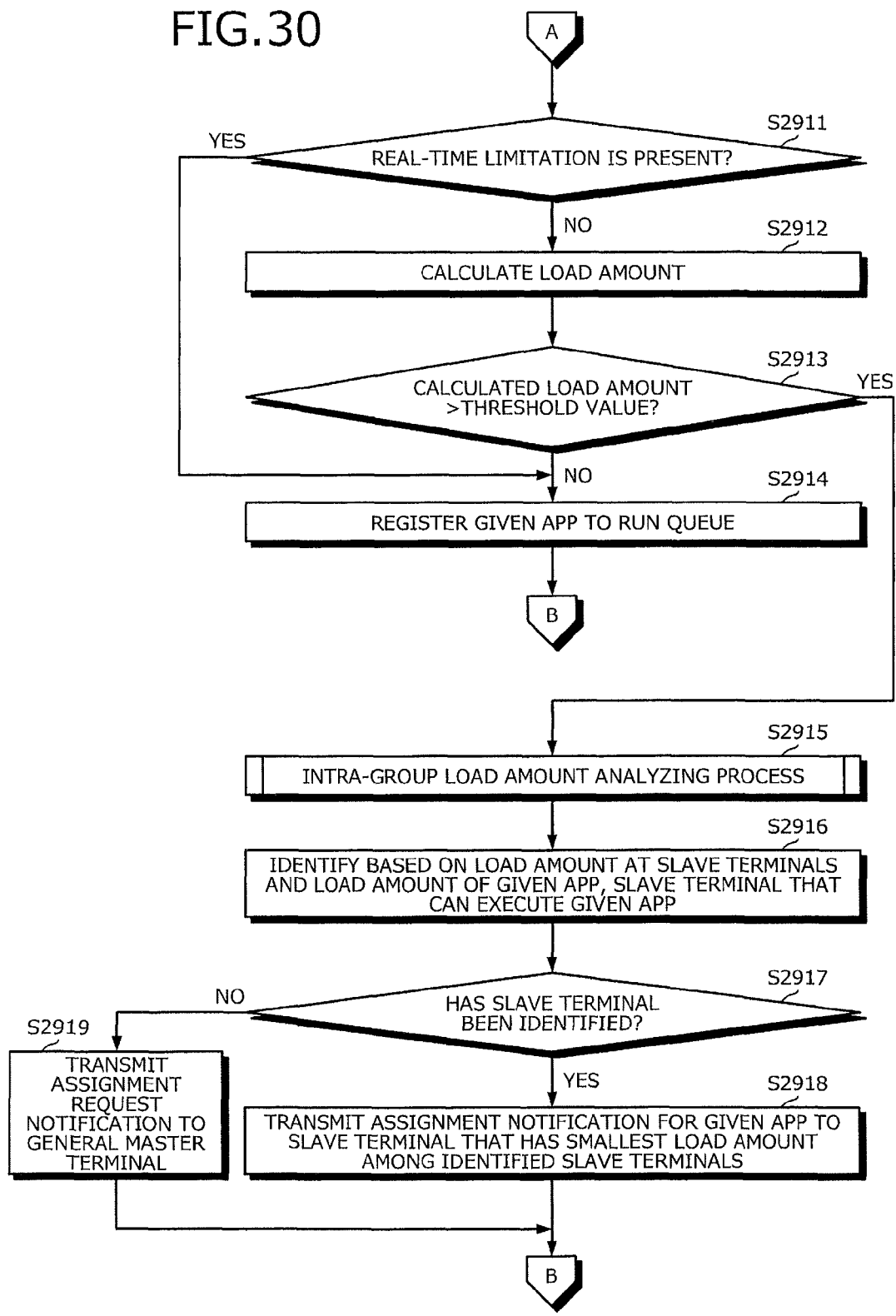

At step S2901 depicted in FIG. 29, if the group master terminal detects, via the detecting unit 701#2, a timer interrupt (step S2901: TIMER INTERRUPT), the group master terminal goes to step S3401 (depicted in FIG. 34). Steps S3401 to S3408 and S3412 to S3417 are the same operations as steps S2301 to S2308 and S2314 to S2319 depicted in FIGS. 23 and 24 and therefore, will not be described in detail.

In the case of NO at step S3408 or NO at step S3410, the group master terminal transmits to the general master terminal, exclusion notification of exclusion from the group (step S3411) and returns to step S2901.

At step S2901 depicted in FIG. 29, if it is determined that migration request notification has been detected (step S2901: MIGRATION REQUEST NOTIFICATION), the group master terminal goes to step S3601 (depicted in FIG. 36). Steps S3601 to S3610 are the same operations as steps S2501 to S2510 depicted in FIG. 25 and therefore will not be described in detail.

After the case of NO at step S3608, the group master terminal uses the first scheduler 703#2 to transmit to the general master terminal, migration request notification for the transfer object defined as the process and data that have a dependence relationship with the transfer data (step S3611). The group master terminal returns to step S3601.

Figure 37:
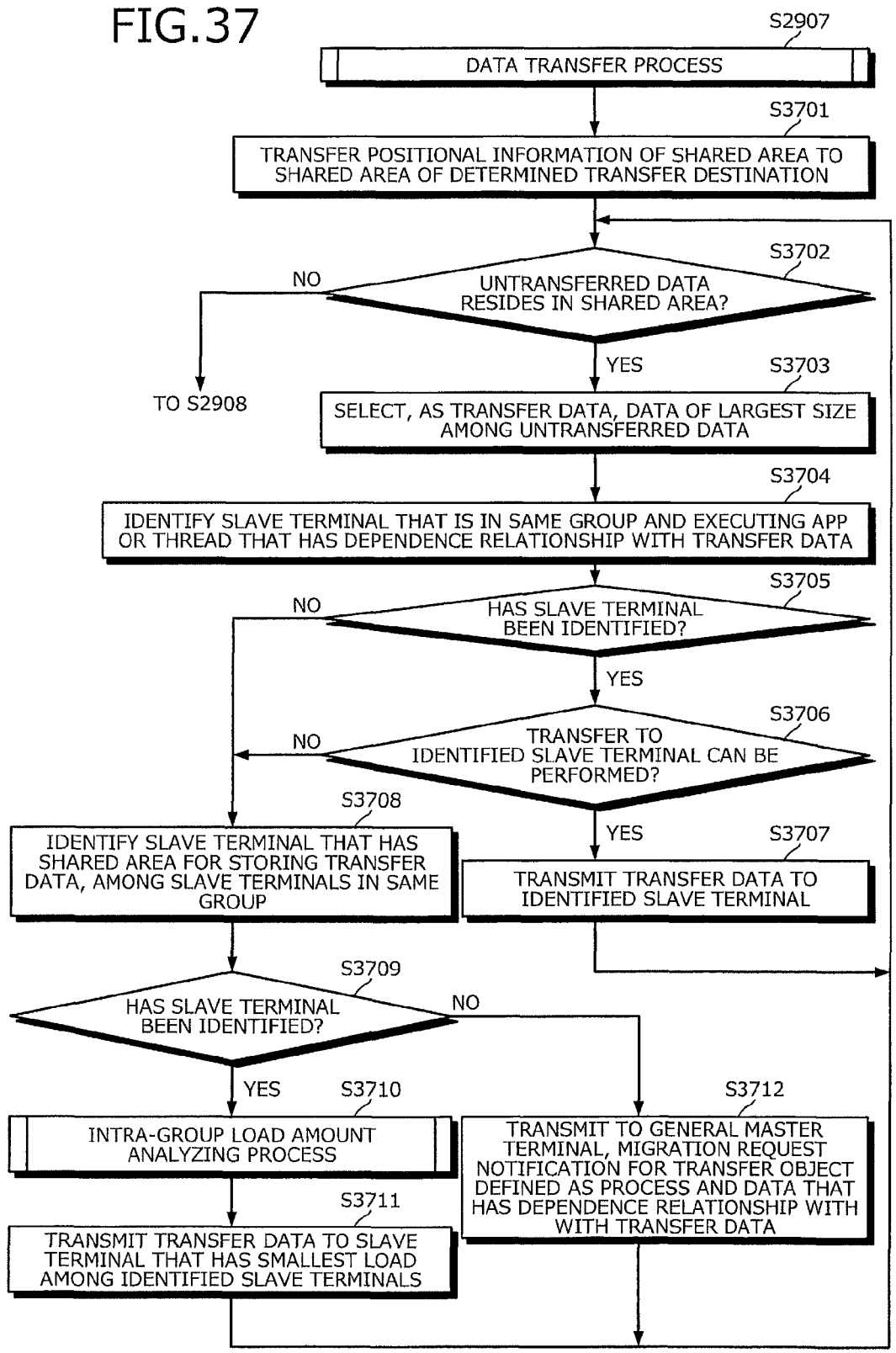
FIG. 37 is a flowchart for explaining in detail a data transfer process (step S2907) depicted in FIG. 29.
Figure 38:
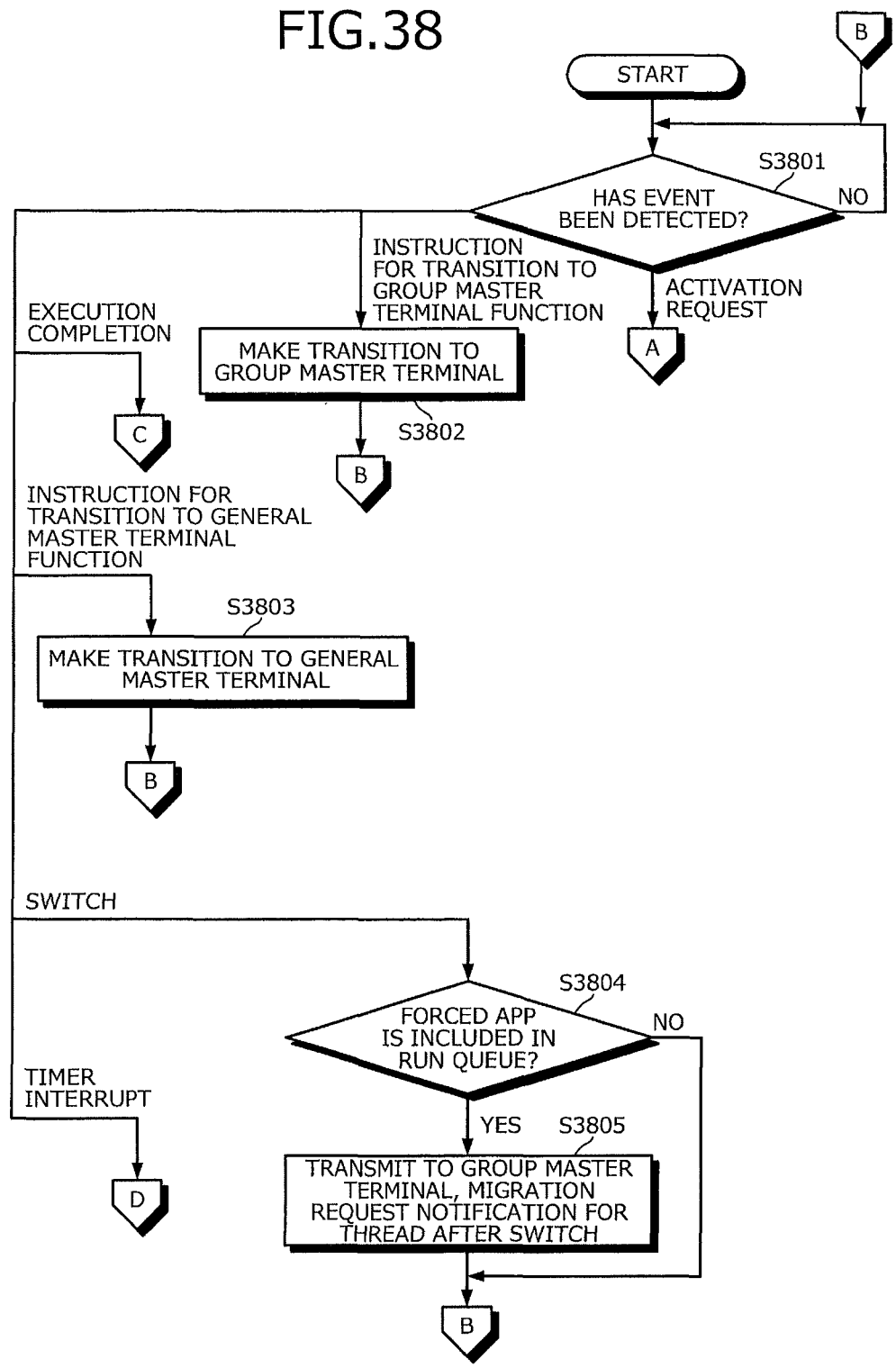

FIG. 37 is a flowchart for explaining the data transfer process (step S2907) depicted in FIG. 29 in detail. Steps S3701 to S3711 are the same operations as steps S2801 to S2811 depicted in FIG. 28 and therefore will not be described in detail. In the case of NO at step S3709, the group master terminal transmits to the general master terminal, migration request notification for the transfer object defined as the process and data that has a dependence relationship with the transfer data (step S3712) and returns to step S3702.

Figure 39:
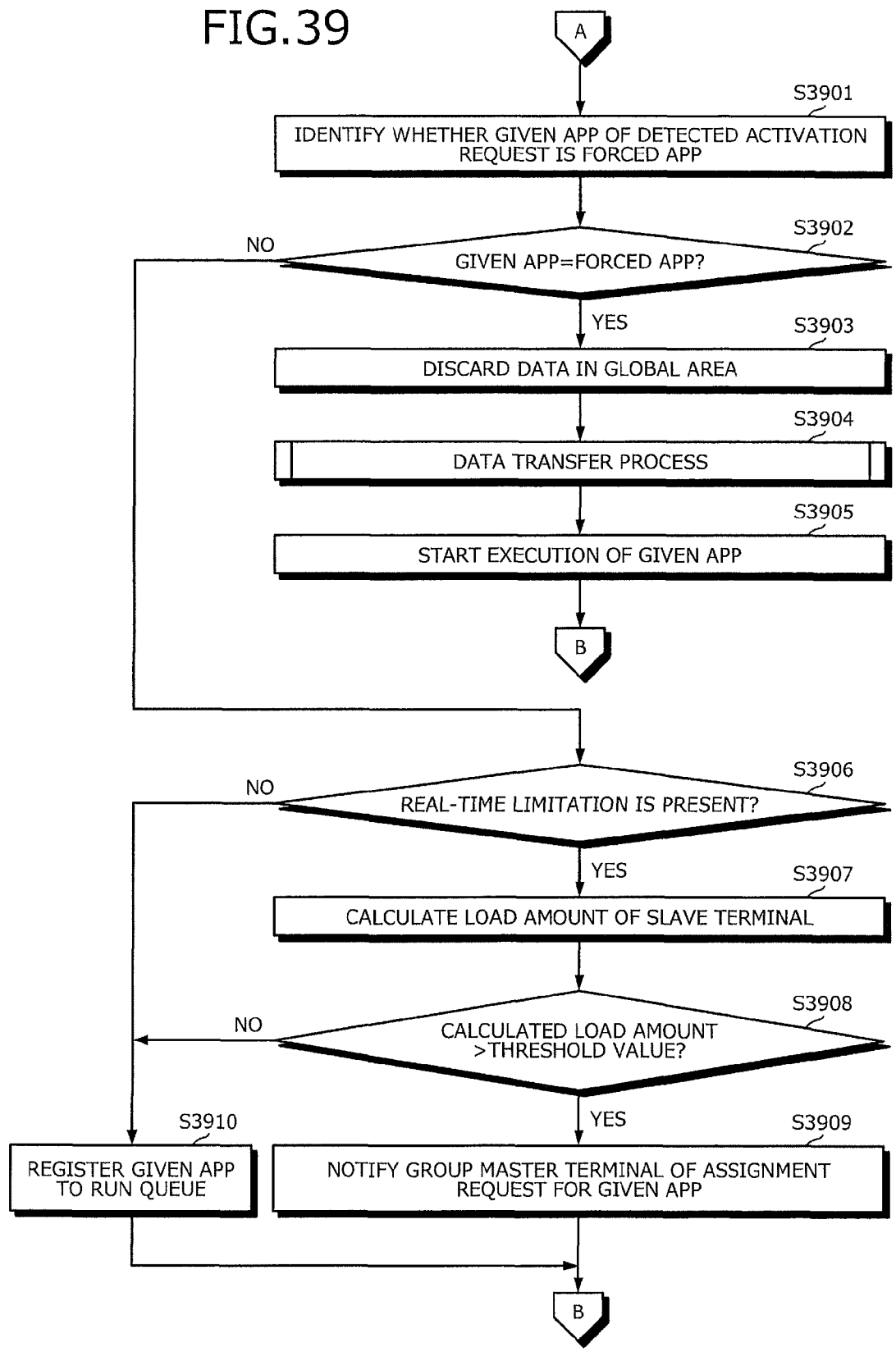
Figure 40:
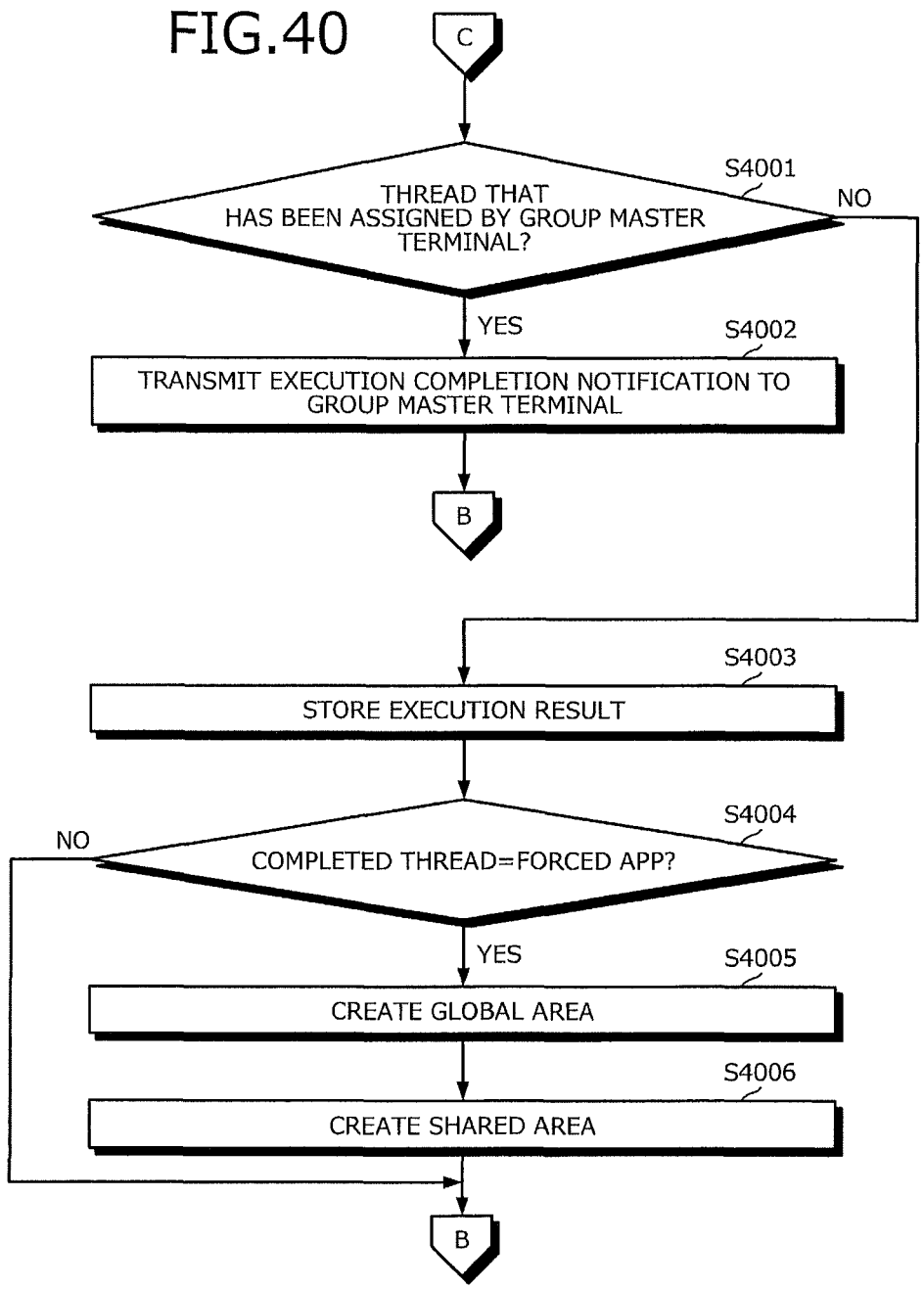

FIGS. 38, 39, 40, 41, and 42 are flowcharts of a process procedure performed by the slave terminal. First, the slave terminal uses the detecting unit 701#3 to determine whether the occurrence of an event has been detected (step S3801). If it is determined that no occurrence of an event has been detected (step S3801: NO), the slave terminal returns to step S3801. If it is determined that the occurrence of an event has been detected (step S3801: ACTIVATION REQUEST), the slave terminal goes to step S3901. Step S3901 is depicted in FIG. 39.

The slave terminal uses the app identifying unit 702#3 to identify whether the given app of the detected activation request is a forced app (step S3901) and determines whether the given app is a forced app (step S3902). If it is determined that the given app is a forced app (step S3902: YES), the slave terminal uses the first scheduler 703#3 to discard data in the GLOBAL area (step S3903) and executes the data transfer process (step S3904). The data transfer process (step S3904) is the same as the data transfer process (step 1807) depicted in FIG. 28 and therefore, will not be described in detail. The slave terminal uses the executing unit 706#3 to start the execution of the given app (step S3905) and returns to step S3801.

On the other hand, if it is determined that the given app is not a forced app (step S3902: NO), the slave terminal determines whether a real-time limitation is present (step S3906). If it is determined that a real-time limitation is present (step S3906: YES), the slave terminal calculates the load amount of the slave terminal (step S3907). The slave terminal determines whether the calculated load amount>the threshold value is satisfied (step S3908).

If it is determined that the calculated load amount>the threshold value is satisfied (step S3908: YES), the slave terminal notifies the group master terminal of an assignment request for the given app (step S3909) and returns to step S3801. If it is determined that no real-time limitation is present (step S3906: NO) or if it is determined that the calculated load amount>the threshold value is not satisfied (step S3908: NO), the slave terminal registers the given app to the run queue 332 (step S3910) and returns to step S3801.

If it is determined, via the detecting unit 701#3 at step S3801, that receipt of an instruction for transition to the group master terminal function has been detected (step S3801: INSTRUCTION FOR TRANSITION TO GROUP MASTER TERMINAL FUNCTION), the slave terminal goes to step S3802. The slave terminal uses the transitioning unit 705#3 to make a transition to the group master terminal (step S3802) and returns to step S3801.

If it is determined, via the detecting unit 701#3 at step S3801, that receipt of an instruction for transition to the general master terminal function has been detected (step S3801: INSTRUCTION FOR TRANSITION TO GENERAL MASTER TERMINAL FUNCTION), the slave terminal goes to step S3803. The slave terminal uses the transitioning unit 705#3 to make a transition to the general master terminal (step S3803) and returns to step S3801.

If it is determined at step S3801 that the completion of execution of an app or a thread has been detected (step S3801: EXECUTION COMPLETION), the slave terminal goes to step S4001. The slave terminal determines whether the thread is a thread that has been assigned by the group master terminal (step S4001). If it is determined that the thread is a thread that has been assigned by the group master terminal (step S4001: YES), the slave terminal transmits execution completion notification to the group master terminal (step S4002) and returns to step S3801.

On the other hand, if it is determined the thread is not a thread that has been assigned by the group master terminal (step S4001: NO), the slave terminal uses the storage unit 708#3 to store the execution result (step S4003). The slave terminal determines whether the completed thread is a forced app (step S4004).

If it is determined that the completed thread is a forced app (step S4004: YES), the slave terminal creates the GLOBAL area (step S4005) and creates the SHARED area (step S4006). If it is determined that the completed thread is not a forced app (step S4004: NO), the slave terminal returns to step S3801.

If it is determined, via the detecting unit 701#3 at step S3801, that a switch has been detected (step S3801: SWITCH), the slave terminal determines whether a forced app is included in the run queue 332 (step S3804). If it is determined that a forced app is included in the run queue 332 (step S3804: YES), the slave terminal transmits to the group master terminal, migration request notification for the thread after the switch (step S3805) and returns to step S3801. If it is determined that no forced app is included in the run queue 332 (step S3804: NO), the slave terminal returns to step S3801.

Figure 41:
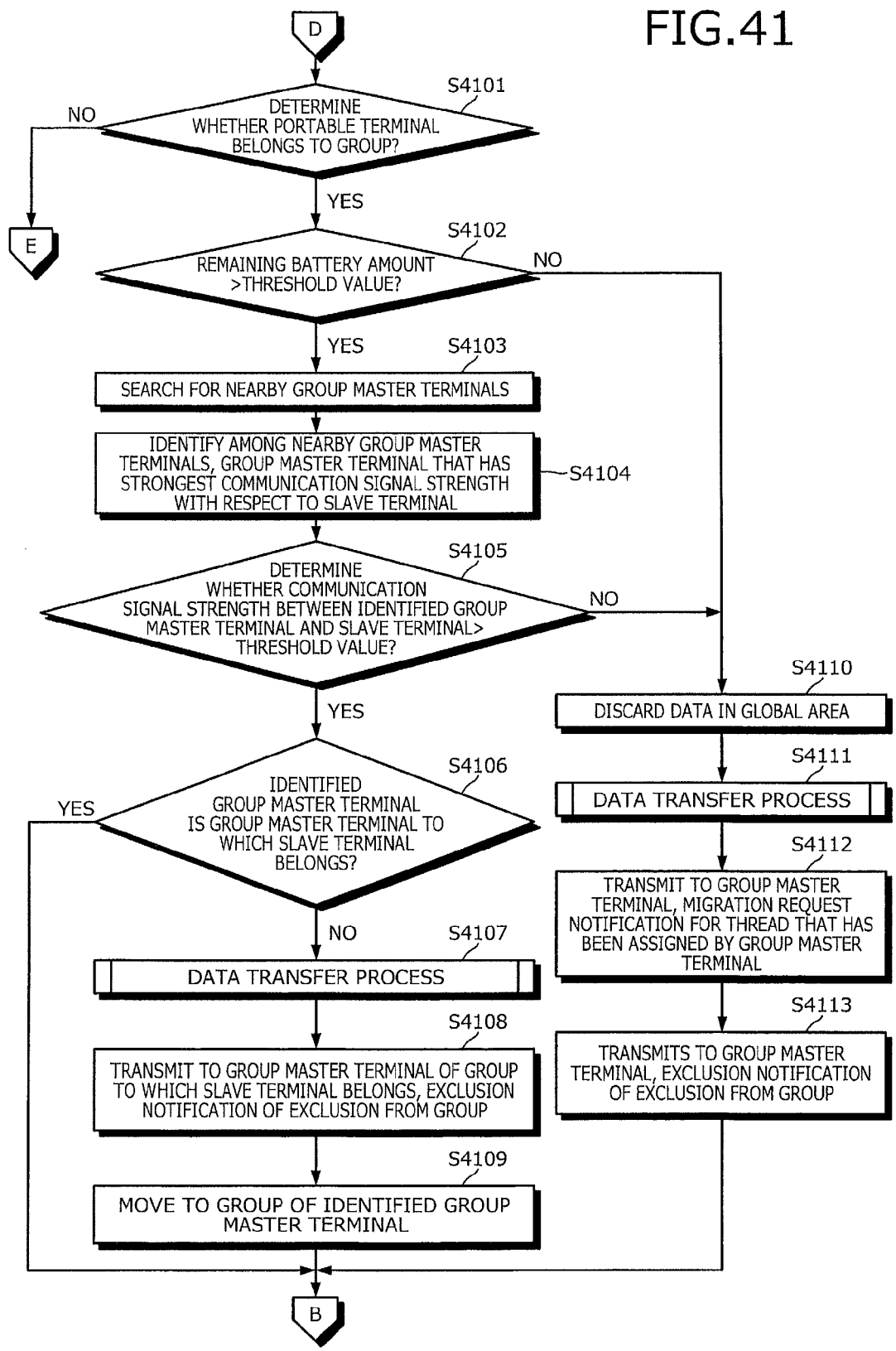

If it is determined, via the detecting unit 701#3 at step S3801, that a timer interrupt has been detected (step S3801: TIMER INTERRUPT), the slave terminal goes to step S4101. Step S4101 is depicted in FIG. 41. The slave terminal determines whether the portable terminal 201 belongs to a group (step S4101) and if it is determined that the portable terminal belongs to a group (step S4101: YES), the slave terminal uses the determining unit 707#3 to determine whether the remaining battery amount>the threshold value is satisfied (step S4102).

If it is determined that the remaining battery amount>the threshold value is satisfied (step S4102: YES), the slave terminal uses the scheduler 703#3 to search for nearby group master terminals (step S4103). The slave terminal uses the scheduler 703#3 to identify among the nearby group master terminals, the group master terminal that has the strongest communication signal strength with respect to the slave terminal (step S4104). The communication signal strength between the group master terminal and the slave is that of wireless LAN communication in the ad-hoc mode.

The slave terminal uses the scheduler 703#3 to determine whether the communication signal strength between the identified group master terminal and the slave terminal>the threshold value is satisfied (step S4105). If it is determined that the communication signal strength between the identified group master terminal and the slave terminal>the threshold value is satisfied (step S4105: YES), the slave terminal determines whether the identified group master terminal is the group master terminal to which the slave terminal belongs (step S4106).

If it is determined that the identified group master terminal is the group master terminal to which the slave terminal belongs (step S4106: YES), the slave terminal returns to step S3801. If it is determined that the identified group master terminal is not the group master terminal to which the slave terminal belongs (step S4106: NO), the slave terminal executes the data transfer process (step S4107). The data transfer process (step S4107) is the same as the data transfer process (step S1807) depicted in FIG. 28 and therefore, will not be described in detail.

The slave terminal transmits to the group master terminal of the group to which the slave terminal 201 belongs, exclusion notification of exclusion from the group (step S4108). The slave terminal uses the scheduler 703#3 to move to the group of the identified group master terminal (step S4109) and returns to step S3801.

If it is determined at step S4102 that the remaining battery amount>the threshold value is not satisfied (step S4102: NO), the slave terminal goes to step S4110. If it is determined at step S4105 that the communication signal strength between the identified group master terminal and the slave terminal>the threshold value is not satisfied (step S4105: NO), the slave terminal goes to step S4110.

The slave terminal uses the scheduler 703#3 to discard data in the GLOBAL area (step S4110) and execute the data transfer process (step S4111). The data transfer process (step S4111) is the same as the data transfer process (step S1807) depicted in FIG. 28 and therefore, will not be described in detail. The slave terminal uses the scheduler 703#3 to transmit to the group master terminal, migration request notification for the thread that has been assigned by the group master terminal (step S4112). The slave terminal transmits to the group master terminal, exclusion notification of exclusion from the group (step S4113) and returns to step S3801.

If it is determined at S4101 that the portable terminal does not belong to a group (step S4101: NO), the slave terminal uses the determining unit 707#3 to determine whether the remaining battery amount>the threshold value is satisfied (step S4114). If it is determined that the remaining battery amount>the threshold value is not satisfied (step S4114: NO), the slave terminal returns to step S3801.

If it is determined that the remaining battery amount>the threshold value is satisfied (step S4114: YES), the slave terminal uses the scheduler 703#3 to search for nearby group master terminals (step S4115). The slave terminal identifies among the nearby group master terminals, the group master terminal that has the strongest communication signal strength with respect to the slave terminal (step S4116) and determines whether the communication signal strength between the identified group master terminal and the slave terminal>the threshold value is satisfied (step S4117).

If it is determined that the communication signal strength between the identified group master terminal and the slave terminal>the threshold value is not satisfied (step S4117: NO), the slave terminal returns to step S3801. If it is determined that the communication signal strength between the identified group master terminal and the slave terminal>the threshold value is satisfied (step S4117: YES), the slave terminal uses the scheduler 703#3 to create the GLOBAL area (step S4118). The slave terminal uses the scheduler 703#3 to create the SHARED area (step S4119), moves to the group of the identified group master terminal (step S4120), and returns to step 3801.

Although all the apparatuses are represented by the portable terminals 201 in the scheduling system 200, configuration is not limited hereto and, for example, the apparatuses may be notebook personal computers, desktop personal computers, or servers. Alternatively, multiple types of apparatuses may be mixed in the scheduling system 200.

As described above, according to the scheduling method and the scheduling system, when a highly-urgent app is activated in a first apparatus having a master function, the master function is transferred to a second apparatus that is in the same group as the first apparatus or in another group. As a result, the scheduling method and the scheduling system can allow the first apparatus to concentrate on the execution of the highly-urgent app and can reduce performance deterioration of the highly-urgent app due to the load of the master function.

When the master function is transferred from the first apparatus to the second apparatus, the first apparatus gives to the apparatuses acting as group masters of groups, notification of the transfer of the master function. As a result, the scheduling system enables each group to manage which apparatus has the master function.

A memory area of a given apparatus is divided into a first area for storing data shared by apparatuses of multiple groups, a second area for data shared among the group to which the given apparatus belongs, and a third area used only by the given apparatus. The scheduling system can store the data shared by multiple groups into the first area, thereby facilitating the management as in the snoop processing of a cache.

In the scheduling system, the second area is handled like distributed shared memory in the same group. An apparatus in the same group is more likely to cause parallel processing of an app or a thread as compared to an apparatus in another group. Moreover, if an app or a thread is subject to the parallel processing, the same data is likely to be used. Therefore, in the scheduling system, the second area can be shared by apparatuses that are in the same group to reduce the memory usage amount in the same group.

When a highly-urgent app is executed, each of the apparatuses deletes data stored in the first area and saves the data stored in the second area into another portable terminal. As a result, the scheduling system can increase the memory area used by the highly-urgent app to reduce performance deterioration of the highly-urgent app.

If an app to be activated is a non-urgent app, when the load amount of the first apparatus exceeds a threshold value, the app to be activated is assigned to the second apparatus in the same group as the first apparatus or in another group. As a result, the scheduling system can reduce performance deterioration of the app to be activated due to a load of a different process being executed in the first apparatus.

The first apparatus selects a group that includes a data processing apparatus having a load amount that is less than or equal to a predetermined value, among multiple groups and transmits a master function transfer notification to the group having the highest communication speed among the selected groups. As a result, the scheduling system can transfer the master function to the group having remaining power and can distribute the load amount in the scheduling system. Thus, the scheduling system can reduce performance deterioration of each app or thread due to a load of another app or another thread.

The first apparatus selects a group that includes a data processing apparatus having a load amount that is less than or equal to a predetermined value, among multiple groups and transmits an assignment request notification to the group having the highest communication speed among the selected groups. As a result, the scheduling system can distribute the load amount in the scheduling system so as not to bias the load toward one group. Therefore, the scheduling system can reduce performance deterioration of each app or thread due to a load of another app or another thread.

When receiving an assignment request notification, the apparatus acting as the group master first searches for an apparatus that has remaining power and is in the same group and, if no apparatus has remaining power, assignment request notification is transmitted to the apparatus acting as the general master. As a result, the scheduling system can distribute the load amount in the scheduling system. Therefore, the scheduling system can reduce performance deterioration of each app or thread due to a load of another app or another thread.

If the apparatuses are portable terminals, communication environment may deteriorate because of the reduction in remaining battery amounts due to battery consumption, or the movement of positions of the portable terminals. Therefore, in the scheduling system, each of the apparatuses regularly monitors the remaining battery amount and the communication environment and, if any one among the remaining battery amount and the communication signal strength falls below a threshold value, the apparatus becomes excluded from the group. As a result, the scheduling system can execute the parallel distributed processing with the apparatuses in a favorable communication environment without battery exhaustion.

If the apparatus executing a process related to the master function has a remaining battery amount that is less than or equal to a threshold value or is in a deteriorated communication environment, the scheduling system determines the transfer destination of the master function based on the remaining battery amount or the level of communication signal strength with a base station. As a result, the scheduling system can allow an apparatus in a favorable communication environment without battery exhaustion to perform the general master terminal function and can prevent interruption of overall control of the scheduling system.

If an app or a thread is transferred, the scheduling system determines an apparatus that has an area available for storing data related to the app or thread as the transfer destination of the app or thread. As a result, performance deterioration of the app or thread due to an insufficient memory area can be alleviated.

If data is transferred, the scheduling system determines an apparatus that is executing a process having a dependence relationship with the data as the transfer destination of the data. As a result, the time consumed for the process having the dependence relationship to read/write data can be reduced and the data can be stored to the memory of an optimal apparatus.

The scheduling method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to an aspect of an embodiment, deterioration of app performance can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduling method comprising:
   determining whether priority of an application to be activated is of a given priority by a first data processing apparatus that is included in a first group of data processing apparatuses, the first data processing apparatus including memory that has a first area that stores data shared between the first group of data processing apparatuses and a second group of data processing apparatuses and a second area that stores data shared between the first group of data processing apparatuses, the first data processing apparatus being assigned to perform an allocation function to determine assignment of processes to the respective data processing apparatuses;
   when the priority of the application is determined to be of the given priority,
      deleting, by the first data processing apparatus, data that is stored in the first area of the first data processing apparatus,
      saving, by the first data processing apparatus, data that is stored in the second area of the first data processing apparatus,
      transferring, by the first data processing apparatus, the allocation function to a second data processing apparatus that is included in any one among the first group of data processing apparatuses and the second group of data processing apparatuses, the second data processing apparatus including memory that has a first area that stores data shared between the first group of data processing apparatuses and the second group of data processing apparatuses and a second area that stores data shared between the second group of data processing apparatuses, and
      executing the application by the first data processing apparatus; and
   when the priority of the application is determined to not the given priority,
      placing, by the first processing apparatus, the application in an execution queue of the first data processing apparatus.

2. The scheduling method according to claim 1, wherein the first group of data processing apparatuses and the second group of data processing apparatuses are among a plurality of groups that each includes at least one data processing apparatus, the method further comprising
   assigning the application to a third data processing apparatus included in any one among the plurality of groups, when the priority of the application is not the given priority and a load amount of the first data processing apparatus exceeds a threshold value.

3. The scheduling method according to claim 1, wherein the first group of data processing apparatuses and the second group of data processing apparatuses are among a plurality of groups that each includes at least one data processing apparatus, the method further comprising
   giving to a predetermined data processing apparatus of each of the plurality of groups, notification of a transfer of the function from the first data processing apparatus to the second data processing apparatus.

4. The scheduling method according to claim 1, wherein the first group of data processing apparatuses and the second group of data processing apparatuses are among a plurality of groups that each includes at least one data processing apparatus, the method further comprising
   selecting from the plurality of groups, groups that include a data processing apparatus that has a load amount that is at most a predetermined value; and
   selecting as the second group and from among the selected groups, a group having a highest communication speed.

5. The scheduling method according to claim 1, wherein the first group of data processing apparatuses and the second group of data processing apparatuses are among a plurality of groups that each includes at least one data processing apparatus, the method further comprising selecting, by the first data processing apparatus, from among the plurality of groups and based on a request for scheduling from one group of the plurality of groups, groups that include a data processing apparatus that has a load amount that is at most a predetermined value; and requesting, by the first data processing apparatus, a group having the highest communication speed among the selected groups to perform the scheduling.

6. The scheduling method according to claim 1, wherein the first group of data processing apparatuses and the second group of data processing apparatuses are among a plurality of groups that each includes at least one data processing apparatus, and the transferring includes transferring the function to a fourth processing apparatus that is included in any one among the plurality of groups, the transferring being performed based on a comparison result of a threshold value and any one among communication signal strength with a base station and a remaining battery amount of the first data processing apparatus.

7. The scheduling method according to claim 1, further comprising excluding the first data processing apparatus from the first group of data processing apparatuses, based on a comparison result of a threshold value and any one among communication signal strength with a base station and a remaining battery amount of the first data processing apparatus.

8. The scheduling method according to claim 1, wherein the first group of data processing apparatuses and the second group of data processing apparatuses are among a plurality of groups that each includes at least one data processing apparatus, the method further comprising analyzing, by the first data processing apparatus, load amounts of the data processing apparatuses in the first group based on a request for scheduling from one data processing apparatus of the first group; and requesting a predetermined data processing apparatus of one group of the plurality of groups to perform the scheduling, the first data processing apparatus requesting the scheduling when the load amounts exceed a threshold value.

9. The scheduling method according to claim 1, further comprising selecting, based on a request for transfer of data from one data processing apparatus of the first group, a data processing apparatus that is to transfer the data, the data processing apparatus being selected based on any one among a remaining battery amount of another data processing apparatus of the first group, communication signal strength with a base station, and a size of an area shared between data processing apparatuses of the first group.

10. The scheduling method according to claim 9, wherein the first group of data processing apparatuses and the second group of data processing apparatuses are among a plurality of groups that each includes at least one data processing apparatus, the method further comprising requesting, based on a dependence relationship between the data and data related to a process executed by a data processing apparatus of the first group, transfer any one among the data and the related data, a data processing apparatus of one group of the plurality of groups being requested to transfer any one among the data and the related data.

11. A scheduling system comprising:

a first data processing apparatus that is included in a first group of data processing apparatuses, the first data processing apparatus including memory that has a first area that stores data shared between the first group of data processing apparatuses and a second group of data processing apparatuses and a second area that stores data shared between the first group of data processing apparatuses, the first data processing apparatus being assigned to perform an allocation function to determine assignment of processes to the respective data processing apparatuses; and a second data processing apparatus that is included in any one among the first group of data processing apparatuses and the second group of data processing apparatuses, the second data processing apparatus including memory that has a first area that stores data shared between the first group of data processing apparatuses and the second group of data processing apparatuses and a second area that stores data shared between the second group of data processing apparatuses, wherein the first data processing apparatus includes a processor that is configured to:

determine whether priority of an application to be activated is of a given priority, when the priority of the application is determined to be of the given priority, delete data that is stored in the first area of the first data processing apparatus, save data that is stored in the second area of the first data processing apparatus, transfer the allocation function to the second data processing apparatus, and execute the application; and when the priority of the application is determined not to be of the given priority, place the application into an execution queue.

12. The scheduling system according to claim 11, wherein the processor is configured to analyze load amounts of data processing apparatuses included in the first group and the second group.

* * * * *